US012571451B2

(12) United States Patent
Kotani

(10) Patent No.: US 12,571,451 B2
(45) Date of Patent: Mar. 10, 2026

(54) SHOCK ABSORBER

(71) Applicant: Hitachi Astemo, Ltd., Ibaraki (JP)

(72) Inventor: Takamasa Kotani, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 392 days.

(21) Appl. No.: 18/024,535

(22) PCT Filed: Sep. 21, 2021

(86) PCT No.: PCT/JP2021/034552
§ 371 (c)(1),
(2) Date: Mar. 3, 2023

(87) PCT Pub. No.: WO2022/085348
PCT Pub. Date: Apr. 28, 2022

(65) Prior Publication Data
US 2023/0341023 A1     Oct. 26, 2023

(30) Foreign Application Priority Data

Oct. 21, 2020    (JP) ................................. 2020-176828

(51) Int. Cl.
*F16F 9/512*        (2006.01)
*F16F 9/19*         (2006.01)
*F16F 9/348*        (2006.01)

(52) U.S. Cl.
CPC ................ *F16F 9/512* (2013.01); *F16F 9/19* (2013.01); *F16F 9/348* (2013.01);
(Continued)

(58) Field of Classification Search
CPC .... F16F 9/504; F16F 9/34; F16F 9/064; F16F 9/512; F16F 9/06; F16F 9/466;
(Continued)

(56) References Cited

U.S. PATENT DOCUMENTS 5,178,242 A * 1/1993 Nakamura .............. F16F 9/468
                                                     188/282.1
10,408,240 B2 * 9/2019 Mori ....................... F15B 15/00

FOREIGN PATENT DOCUMENTS

CN        110475985 A  * 11/2019  ................ F16F 9/19
CN        112081856 A  * 12/2020  ............. B60G 13/08
(Continued)

OTHER PUBLICATIONS

International Search Report received in corresponding International Application No. PCT/JP2021/034552 dated Nov. 2, 2021.
(Continued)

*Primary Examiner* — Robert A. Siconolfi
*Assistant Examiner* — Mahbubur Rashid
(74) *Attorney, Agent, or Firm* — MATTINGLY & MALUR, PC

(57)        ABSTRACT
A shock absorber includes a first passage provided in a piston and through which a working fluid moves from a chamber on an upstream side to a chamber on a downstream side in a cylinder due to movement of the piston, a first damping force generation mechanism provided in the first passage to generate a damping force, a second passage (141) provided in a piston rod (21), and a fixing member fixed to the piston rod (21) to form the second passage (141), and a second damping force generation mechanism provided in the second passage (141) to generate a damping force, in which a throttle member (161) provided in the second damping force generation mechanism, including a plurality of notch parts (171) at substantially regular intervals in a circumferential direction to form a throttle flow path (76) in the second passage due to the notch parts (171), and formed to have a flow path area of the throttle flow path (76) that is constant regardless of an attachment position thereof in the circumferential direction is further provided.

10 Claims, 30 Drawing Sheets

(52) U.S. Cl.
    CPC ....... *F16F 2222/12* (2013.01); *F16F 2228/04* (2013.01); *F16F 2228/066* (2013.01); *F16F 2230/02* (2013.01)

(58) Field of Classification Search
    CPC .... F16F 9/3405; F16F 2228/066; F16F 9/348; F16F 2228/04; F16F 2222/12; F16F 9/48; F16F 9/49; F16F 9/344; F16F 9/346; F16F 9/3482; F16F 9/19; F16F 2230/02
    See application file for complete search history.

(56) References Cited

FOREIGN PATENT DOCUMENTS

| | | | | | |
|---|---|---|---|---|---|
| DE | 4138117 | A | * | 5/1992 | .............. F16F 9/468 |
| JP | H0540635 | U | * | 6/1993 | |
| JP | 2580174 | Y2 | * | 9/1998 | |
| JP | 2598127 | Y2 | * | 8/1999 | |
| JP | 3117014 | B2 | * | 12/2000 | |
| JP | 2014-47875 | A | | 3/2014 | |
| JP | 2014-92181 | A | | 5/2014 | |
| JP | 5619796 | B2 | * | 11/2014 | ............... F16F 9/34 |
| JP | 2018-162805 | A | | 10/2018 | |
| JP | 2019-206971 | A | | 12/2019 | |

OTHER PUBLICATIONS

Written Opinion received in corresponding International Application No. PCT/JP2021/034552 dated Nov. 2, 2021.

* cited by examiner

| | |
|---|---|
| r = 5 | A = 1 |
| n = 2 | $a_e = a_1$ |
| d = 5 | |

| | |
|---|---|
| r = 5 | A = 1 |
| n = 2 | $a_e = a_1$ |
| d = 5 | |

0°

| | |
|---|---|
| r = 5 | A = 2 |
| n = 3 | $a_e = 2a_1$ |
| d = 2. 5 | |

30°

| | |
|---|---|
| r = 5 | A = 2 |
| n = 3 | $a_e = 2a_1$ |
| d = 2. 5 | |

0°

| r = 5 | A = 2 |
|-------|-------|
| n = 6 | $a_e = 2a_1$ |
| d = 0.67 | |

30°

| r = 5 | A = 2 |
|-------|-------|
| n = 6 | $a_e = 2a_1$ |
| d = 0.67 | |

0° r = 5       A = 1
n = 6       $a_e = a_1$
d = 0. 67

30° r = 5       A = 1
n = 6       $a_e = a_1$
d = 0. 67

0°

| | |
|---|---|
| r = 5 | A = 2 |
| n = 4 | $a_e = 2a_1$ |
| d = 1. 46 | |

45°

| | |
|---|---|
| r = 5 | A = 2 |
| n = 4 | $a_e = 2a_1$ |
| d = 1. 46 | |

0°

| | |
|---|---|
| r = 5 | A = 2 |
| n = 5 | $a_e = 2a_1$ |
| d = 0. 95 | |

16°

| | |
|---|---|
| r = 5 | A = 2 |
| n = 5 | $a_e = 2a_1$ |
| d = 0. 95 | |

| | |
|---|---|
| r = 5 | A = 3 |
| n = 6 | $a_e = 3a_1$ |
| d = 0. 67 | |

| | |
|---|---|
| r = 5 | A = 3 |
| n = 6 | $a_e = 3a_1$ |
| d = 0. 67 | |

0°

| | |
|---|---|
| r = 5 | A = 2 |
| n = 6 | $a_e = 4a_1$ |
| d = 2.5 | |

30°

| | |
|---|---|
| r = 5 | A = 2 |
| n = 6 | $a_e = 4a_1$ |
| d = 2.5 | |

SHOCK ABSORBER

TECHNICAL FIELD

The present invention relates to a shock absorber.

Priority is claimed on Japanese Patent Application No. 2020-176828 filed on Oct. 21, 2020, the content of which is incorporated herein by reference.

BACKGROUND ART

A shock absorber in which a notch part is formed on an inner circumferential side of a disc to form a flow path is known (see, for example, Patent Document 1).

CITATION LIST

Patent Document

[Patent Document 1]
Japanese Unexamined Patent Application, First Publication
No. 2019-206971

SUMMARY OF INVENTION

Technical Problem

In shock absorbers, it is required to achieve stabilization in damping force performance.

The present invention provides a shock absorber in which stabilization in damping force performance can be achieved.

Solution to Problem

According to a first aspect of the present invention, a shock absorber includes a first passage provided in a piston and through which a working fluid moves from a chamber on an upstream side to a chamber on a downstream side in a cylinder due to movement of the piston, a first damping force generation mechanism provided in the first passage to generate a damping force, a fixing member fixed to a piston rod, a second passage provided in the piston rod, and a second damping force generation mechanism provided in the second passage to generate a damping force. This shock absorber includes a throttle member provided in the second damping force generation mechanism, having a plurality of notch parts at substantially regular intervals in a circumferential direction to form a throttle flow path in the second passage due to the notch parts, and formed to have a flow path area of the throttle flow path that is constant regardless of an attachment position thereof in the circumferential direction.

According to a second aspect of the present invention, a shock absorber includes a first passage provided in a piston and through which a working fluid moves from a chamber on an upstream side to a chamber on a downstream side in a cylinder due to movement of the piston, a first damping force generation mechanism provided in the first passage to generate a damping force, a fixing member fixed to a piston rod, a second passage provided in the piston rod, and a second damping force generation mechanism provided in the second passage to generate a damping force. The second damping force generation mechanism includes a throttle valve provided on one side of the second passage and having a plurality of notch parts at regular intervals in a circumferential direction. Due to the notch parts, a throttle flow path is formed in the second passage. The number of the notch parts of the throttle valve is expressed as $n=px$ provided that $n$ is the number of the notch parts formed in the throttle valve, $p$ is a natural number larger than 1, and $x$ is a natural number larger than 0. The second passage provided in the piston rod includes a groove part formed by notching an outer circumferential portion of the piston rod. $d=r-r\cdot\cos(360/2p)$ is satisfied provided that $d$ is a depth of the groove part and $r$ is a radius of the piston rod at a position at which the throttle valve is disposed. A minimum effective flow path area of the flow path formed of the throttle valve and the groove part is expressed as $a_e=a_1\cdot A(n/p)$ provided that $a_e$ is a minimum cross-sectional area of the flow path due to all the notch parts of the throttle valve, $a_1$ is a minimum cross-sectional area of the flow path due to one notch part of the throttle valve, and $A$ is the number of grooves of the groove part of the piston rod.

According to a third aspect of the present invention, the shock absorber includes a first passage provided in a piston and through which a working fluid moves from a chamber on an upstream side to a chamber on a downstream side in a cylinder due to movement of the piston, a first damping force generation mechanism provided in the first passage to generate a damping force, a fixing member fixed to a piston rod, a second passage provided in the piston rod, and a second damping force generation mechanism provided in the second passage to generate a damping force. The second damping force generation mechanism includes a throttle valve provided on one side of the second passage and having a plurality of notch parts at regular intervals in a circumferential direction. Due to the notch parts, a throttle flow path is formed in the second passage. The number of the notch parts of the throttle valve is expressed as $n=px$ provided that $n$ is the number of the notch parts formed in the throttle valve, $p$ is a natural number larger than 1, and $x$ is a natural number larger than 0. On a first side of the second passage provided in the piston rod, one or more first openings opening to an outer diameter surface on the piston side are formed. On a second side of the second passage, a second opening that penetrates the inside of the piston rod and opens to the fixing member side is formed. $D=2r\cdot\sin(360/2p)$ provided that $D$ is a diameter of the first opening, and $r$ is a radius of the piston rod at a position at which the throttle valve is disposed. A minimum effective flow path area of the flow path formed of the throttle valve and the first openings is expressed as $a_e=a_1\cdot B(n/p)$ provided that $a_e$ is a minimum cross-sectional area of the flow path due to all the notch parts of the throttle valve, $a_1$ is a minimum cross-sectional area of the flow path due to one notch part of the throttle valve, and $B$ is the number of the first openings.

Advantageous Effects of Invention

According to the shock absorber described above, it is possible to achieve stabilization in damping force performance.

DESCRIPTION OF EMBODIMENTS

First Embodiment

A first embodiment of the present invention will be described with reference to FIGS. 1 to 6. Further, in the following, for convenience of explanation, an upper side in FIGS. 1 to 3, FIG. 7, FIG. 8, FIG. 10, FIG. 11, and FIGS. 21 to 31 will be referred to with "upper," and a lower side in FIGS. 1 to 3, FIG. 7, FIG. 8, FIG. 10, FIG. 11, and FIGS. 21 to 31 will be referred to with "lower".

Figure 1:
FIG. 1 is a front view illustrating a shock absorber according to a first embodiment of the present invention with a part thereof cross-sectioned.

A shock absorber 1 of the first embodiment is used in a vehicle. Specifically, the shock absorber 1 is provided in a suspension device of an automobile. As illustrated in FIG. 1, the shock absorber 1 is a so-called dual-tube type hydraulic shock absorber. The shock absorber 1 includes a cylinder 2 in which an oil fluid (not illustrated) is sealed as a working fluid. The cylinder 2 includes a cylindrical inner cylinder 3, and a bottomed cylindrical outer cylinder 4 having a diameter larger than that of the inner cylinder 3 and concentrically provided to cover the inner cylinder 3. A reservoir chamber 6 is formed between the inner cylinder 3 and the outer cylinder 4. The shock absorber 1 includes a cover 7 that covers an upper opening side of the outer cylinder 4, and a main bracket 8 and a spring seat 9 that are both fixed to an outer circumferential side of the outer cylinder 4.

The outer cylinder 4 is constituted by a cylindrical barrel part 11, and a cylinder bottom part 12 that is integrally formed on a lower side of the barrel part 11 to close a lower portion of the barrel part 11.

The shock absorber 1 includes a piston 18 fitted in the inner cylinder 3 of the cylinder 2 to be slidable. The piston 18 partitions the inside of the inner cylinder 3 into two chambers, a first chamber 19 on an upper side which is a first side, and a second chamber 20 on a lower side which is a second side. An oil fluid is sealed in the first chamber 19 and the second chamber 20 in the inner cylinder 3 as a working fluid. An oil fluid and a gas are sealed in the reservoir chamber 6 between the inner cylinder 3 and the outer cylinder 4 as a working fluid.

The shock absorber 1 includes a piston rod 21 in which one end side is disposed in the inner cylinder 3 of the cylinder 2 to be connected to the piston 18 and the other end side extends to the outside of the cylinder 2. The piston 18 and the piston rod 21 move together. In an extension stroke in which the piston rod 21 increases a protrusion amount thereof from the cylinder 2, the piston 18 moves to the first chamber 19 side. In a compression stroke in which the piston rod 21 reduces a protrusion amount thereof from the cylinder 2, the piston 18 moves to the second chamber 20 side.

A rod guide 22 is fitted to an upper end opening side of the inner cylinder 3 and the outer cylinder 4. A seal member 23 is fitted on an upper side of the outer cylinder 4 which is an outer side of the cylinder 2 with respect to the rod guide 22. A friction member 24 is provided between the rod guide 22 and the seal member 23. The rod guide 22, the seal member 23, and the friction member 24 are all annular. The piston rod 21 is slidably inserted through the inside of the rod guide 22, the friction member 24, and the seal member 23 and extends from the inside of the cylinder 2 to the outside.

The rod guide 22 guides movement of the piston rod 21 by supporting the piston rod 21 to be movable in an axial direction while restricting its movement in a radial direction. An outer circumferential portion of the seal member 23 is in close contact with the outer cylinder 4. An inner circumferential portion of the seal member 23 is in sliding contact with an outer circumferential portion of the piston rod 21 that moves in the axial direction. The seal member 23 prevents the oil fluid in the inner cylinder 3 and the high-pressure gas and the oil fluid of the reservoir chamber 6 in the outer cylinder 4 from leaking to the outside. The friction member 24 is in sliding contact with the outer circumferential portion of the piston rod 21 at its inner circumferential portion to generate frictional resistance on the piston rod 21.

The rod guide 22 has an outer circumferential portion formed in a stepped shape in which an upper portion has a larger diameter than a lower portion. The rod guide 22 is fitted to an inner circumferential portion of an upper end of the inner cylinder 3 at the lower portion with the small diameter. The rod guide 22 is fitted to an inner circumferential portion of an upper portion of the outer cylinder 4 at the upper portion with the large diameter. A base valve 25 which defines the second chamber 20 and the reservoir chamber 6 is installed on the cylinder bottom part 12 of the outer cylinder 4. An inner circumferential portion of a lower end of the inner cylinder 3 is fitted to the base valve 25. An upper end portion of the outer cylinder 4 is swaged inward in the radial direction. This swaged portion and the rod guide 22 sandwich the seal member 23.

The piston rod 21 includes a main shaft part 27 and a mounting shaft part 28 which has a diameter smaller than that of the main shaft part 27. The mounting shaft part 28 is disposed in the cylinder 2 and has the piston 18 and the like attached thereto. An end portion of the main shaft part 27 on the mounting shaft part 28 side is a shaft step part 29 which extends in a direction perpendicular to the axis. A male screw 31 is formed on an outer circumferential portion of the mounting shaft part 28 on a side opposite to the main shaft part 27 in the axial direction.

A stopper member 32, a pair of buffers 33, and a coil spring 34, which are all annular, are provided on the piston rod 21 at a portion of the main shaft part 27 between the piston 18 and the rod guide 22. The stopper member 32 is swaged and fixed to the main shaft part 27 with the piston rod 21 inserted through an inner circumferential side thereof. The buffer 33 on the first side, the coil spring 34, and the buffer 33 on the second side are disposed in order from the stopper member 32 side. The piston rod 21 is inserted through the inside of the pair of buffers 33 and the coil spring 34. The buffers 33 and the coil spring 34 are disposed between the stopper member 32 and the rod guide 22.

In the shock absorber 1, for example, a protruding portion of the piston rod 21 from the cylinder 2 is disposed on an upper portion to be supported by a vehicle body, and the main bracket 8 on the cylinder 2 side is disposed on a lower portion to be connected to a wheel side. Conversely, the cylinder 2 side may be supported by the vehicle body, and the piston rod 21 may be connected to the wheel side.

Figure 2:
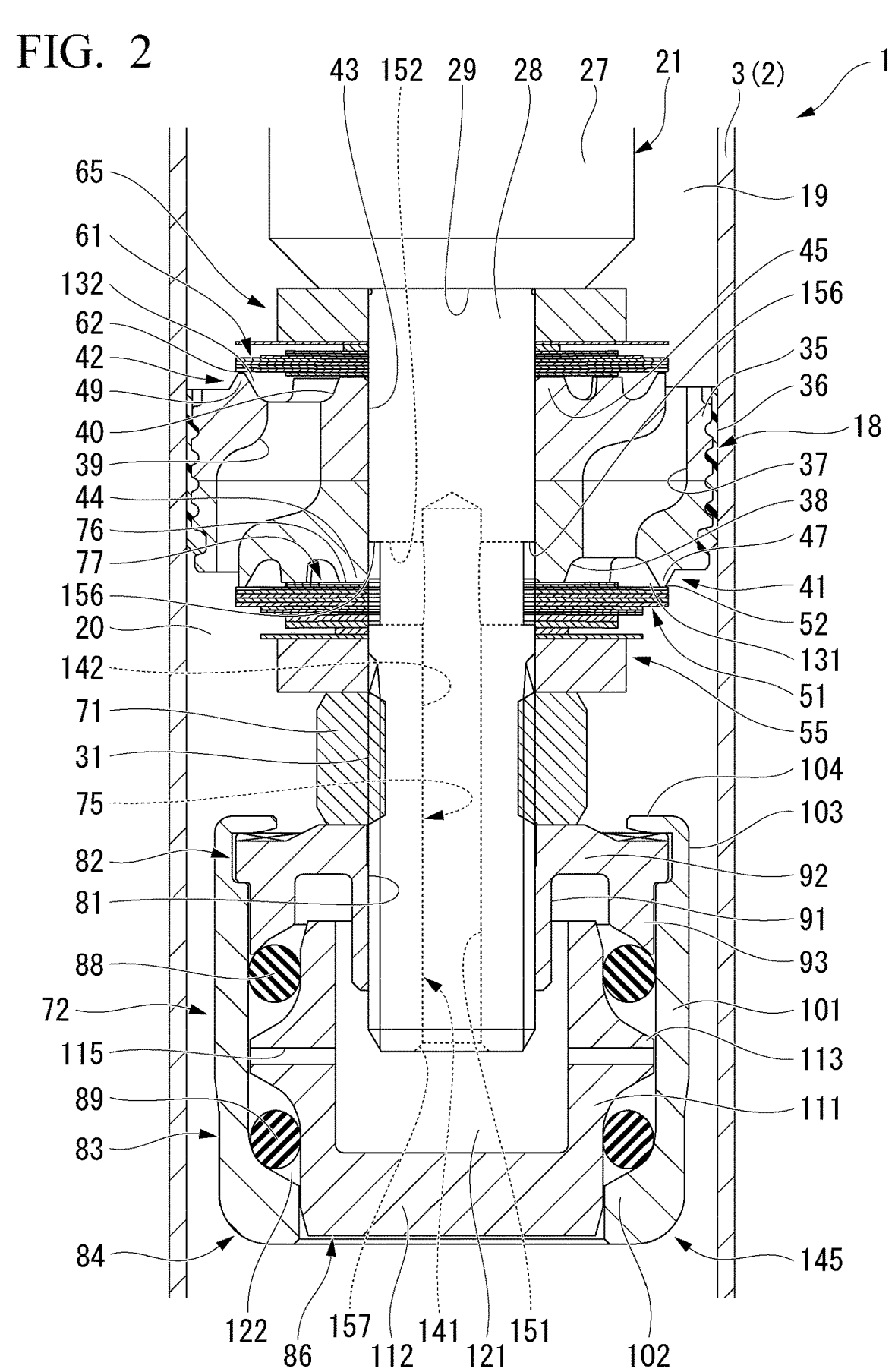
FIG. 2 is a partial cross-sectional view illustrating the vicinity of a piston of the shock absorber according to the first embodiment of the present invention.

As illustrated in FIG. 2, the piston 18 is constituted by a piston main body 35 made of a metal and an annular slide member 36 made of a synthetic resin. The piston main body 35 is fitted on the mounting shaft part 28 of the piston rod 21. The slide member 36 is integrally mounted on an outer circumferential surface of the piston main body 35 to slide inside of the inner cylinder 3.

The piston main body 35 has a plurality of passage holes 37 (only one is illustrated in FIG. 2 because it is a cross section) that allow communication between the first chamber 19 and the second chamber 20, and a plurality of passage holes 39 (only one is illustrated in FIG. 2 because it is a cross section) that allow communication between the first chamber 19 and the second chamber 20. The plurality of passage holes 37 are formed with a uniform pitch with the passage holes 39 interposed therebetween in a circumferential direction and constitute one half of the passage holes 37 and 39 in number. The plurality of passage holes 37 on the first chamber 19 side open outward in the radial direction, and those on the second chamber 20 side open inward in the radial direction. The piston main body 35 includes an annular recessed part 38 having an annular shape. The annular recessed part 38 allows openings of the plurality of passage holes 37 on the second chamber 20 side to communicate with each other.

A first damping force generation mechanism 41 is provided in the passage holes 37 and the annular recessed part 38. The first damping force generation mechanism 41 opens and closes passages in the passage holes 37 and the annular recessed part 38 to generate a damping force. The first damping force generation mechanism 41 is disposed on the second chamber 20 side, which is one end side of the piston 18 in the axial direction, and is attached to the piston rod 21. When the first damping force generation mechanism 41 is disposed on the second chamber 20 side, the passages formed inside the plurality of passage holes 37 and the annular recessed part 38 serve as a passage through which the oil fluid as a working fluid flows from the first chamber 19 on the first side toward the second chamber 20 on the second side when the piston 18 moves to the first chamber 19 side, that is, during an extension stroke. The first damping force generation mechanism 41 provided for the passages in the passage holes 37 and the annular recessed part 38 serves as an extension-side damping force generation mechanism that generates a damping force by suppressing a flow of the oil fluid through the extension-side passages in the passage holes 37 and the annular recessed part 38.

The passage holes 39 constituting the remaining half of the passage holes 37 and 39 are formed with a uniform pitch with the passage holes 37 interposed therebetween in the circumferential direction. The plurality of passage holes 39 on the second chamber 20 side open outward in the radial direction, and those on the first chamber 19 side open inward in the radial direction. The piston main body 35 includes an annular recessed part 40 that allows openings of the plurality of passage holes 39 on the first chamber 19 side to communicate with each other.

A first damping force generation mechanism 42 is provided in the passage holes 39 and the annular recessed part 40. The first damping force generation mechanism 42 opens and closes passages in the passage holes 39 and the annular recessed part 40 to generate a damping force. The first damping force generation mechanism 42 is disposed on the first chamber 19 side, which is the other end side of the piston 18 in the axial direction, and is attached to the piston rod 21. When the first damping force generation mechanism 42 is disposed on the first chamber 19 side, the passages formed inside the plurality of passage holes 39 and the annular recessed part 40 serve as a passage through which the oil fluid flows from the second chamber 20 toward the first chamber 19 when the piston 18 moves to the second chamber 20 side, that is, during a compression stroke. The first damping force generation mechanism 42 provided for the passages in the passage holes 39 and the annular recessed part 40 serves as a compression-side damping force generation mechanism that generates a damping force by suppressing a flow of the oil fluid through the compression-side passages in the passage holes 39 and the annular recessed part 40.

As described above, the passages in the plurality of passage holes 37 and the annular recessed part 38 and the passages in the plurality of passage holes 39 and the annular recessed part 40 allow the first chamber 19 and the second chamber 20 to communicate with each other so that the oil fluid serving as a working fluid flows therebetween by movement of the piston 18. Thereby, the oil fluid passes through the passages in the passage holes 37 and the annular recessed part 38 when the piston rod 21 and the piston 18 move to the extension side. The oil fluid passes through the passages in the passage holes 39 and the annular recessed part 40 when the piston rod 21 and the piston 18 move to the compression side.

The piston main body 35 has substantially a disc shape. A fitting hole 43 is formed at a center of the piston main body 35 in the radial direction. The fitting hole 43 penetrates in the axial direction so that the mounting shaft part 28 of the piston rod 21 is fitted therein. A portion between the fitting hole 43 and the annular recessed part 38 at an end portion of the piston main body 35 on the second chamber 20 side in the axial direction is an annular inner seat part 44. A portion between the fitting hole 43 and the annular recessed part 40 at an end portion of the piston main body 35 on the first chamber 19 side in the axial direction is an annular inner seat part 45.

At an end portion of the piston main body 35 on the second chamber 20 side in the axial direction, an annular valve seat part 47, which is a part of the first damping force generation mechanism 41, is formed on a radially outer side of the annular recessed part 38. The annular recessed part 38 is provided between the inner seat part 44 and the valve seat part 47. The annular recessed part 38 has an annular shape. Also, at an end portion of the piston main body 35 on the first chamber 19 side in the axial direction, an annular valve seat part 49, which is a part of the first damping force generation mechanism 42, is formed on a radially outer side of the annular recessed part 40. The annular recessed part 40 is provided between the inner seat part 45 and the valve seat part 49. The annular recessed part 40 has an annular shape. In the piston main body 35, openings of the plurality of compression-side passage holes 39 on the second chamber 20 side are disposed on a side of the valve seat part 47 opposite to the fitting hole 43 in the radial direction. Openings of the plurality of extension-side passage holes 37 on the first chamber 19 side are disposed on a side of the valve seat part 49 opposite to the fitting hole 43 in the radial direction of the piston main body 35.

A disc valve 51 is provided on the second chamber 20 side of the piston 18. The disc valve 51, together with the valve seat part 47 of the piston 18, constitutes the extension-side first damping force generation mechanism 41. The disc valve 51 is constituted by stacking a plurality of discs having a bored disc shape. The mounting shaft part 28 is fitted inside the disc valve 51. The disc valve 51 closes the passages in the plurality of passage holes 37 and the annular recessed part 38 by coming into contact with the valve seat part 47. The disc valve 51 opens the passages in the plurality of passage holes 37 and the annular recessed part 38 by separating from the valve seat part 47. A fixed orifice 52 is formed in the disc valve 51. The fixed orifice 52 allows the passages in the plurality of passage holes 37 and the annular recessed part 38 to communicate with the second chamber 20 even when it is in contact with the valve seat part 47.

An annular deformation suppression part 55 is provided on a side of the disc valve 51 opposite to the piston 18. The deformation suppression part 55 suppresses deformation of the disc valve 51 in an opening direction by coming into contact with the disc valve 51. The mounting shaft part 28 is provided to be fitted to an inner side of the deformation suppression part 55. The deformation suppression part 55 is also constituted by stacking a plurality of discs having a bored disc shape. The mounting shaft part 28 is fitted to the inner side of the deformation suppression part 55.

A disc valve 61 is provided on the first chamber 19 side of the piston 18. The disc valve 61, together with the valve seat part 49 of the piston 18, constitutes the compression-side first damping force generation mechanism 42. The disc valve 61 is constituted by stacking a plurality of discs having a bored disc shape. The mounting shaft part 28 is fitted to an inner side of the disc valve 61. The disc valve 61 closes the passages in the passage holes 39 and the annular recessed part 40 by coming into contact with the valve seat part 49. The disc valve 61 opens the passages in the passage holes 39 and the annular recessed part 40 by separating from the valve seat part 49. A fixed orifice 62 is formed in the disc valve 61. The fixed orifice 62 allows the passages in the plurality of passage holes 39 and the annular recessed part 40 to communicate with the first chamber 19 even when it is in contact with the valve seat part 49.

An annular deformation suppression part 65 is provided on a side of the disc valve 61 opposite to the piston 18. The deformation suppression part 65 suppresses deformation of the disc valve 61 in an opening direction by coming into contact with the disc valve 61.

The deformation suppression part 65 is also constituted by stacking a plurality of discs having a bored disc shape. The mounting shaft part 28 is fitted to an inner side of the deformation suppression part 65. The deformation suppression part 65 is provided between the shaft step part 29 of the piston rod and the disc valve 61.

A nut 71 is provided on a side of the deformation suppression part 55 opposite to the disc valve 51 in the axial direction. The nut 71 is screwed onto a male screw 31 of the mounting shaft part 28. A frequency sensitive part 72 is provided on a side of the nut 71 opposite to the deformation suppression part 55 in the axial direction. The frequency sensitive part 72 is also screwed onto the male screw 31 of the mounting shaft part 28.

A rod passage 75 communicating with the frequency sensitive part 72 is formed in the mounting shaft part 28 of the piston rod 21. A throttle flow path forming part 77 is provided between the piston 18 and the extension-side disc valve 51. The throttle flow path forming part 77 has a throttle flow path 76 that allows the passages in the plurality of passage holes 37 and the annular recessed part 38 of the piston 18 to communicate with the rod passage 75 of the piston rod 21.

The frequency sensitive part 72 is constituted by a housing 84 (fixing member), a free piston 86, and an O-ring 88 and an O-ring 89 which are elastic bodies. The housing 84 is constituted by a lid member 82 in which a female screw 81 that is screwed onto the male screw 31 of the mounting shaft part 28 is formed, and a substantially cylindrical housing main body 83 attached to the lid member 82 so that one end opening side thereof is closed. The free piston 86 is slidably fitted and inserted into the housing 84. The O-ring 88 and the O-ring 89 are interposed between housing 84 and free piston 86. The housing 84 is screwed onto the male screw 31 of the mounting shaft part 28 to be fixed to the piston rod 21.

The lid member 82 includes a substantially cylindrical lid inner cylindrical part 91, a disc-shaped lid base plate part 92 extending radially outward from an end portion of the lid inner cylindrical part 91 in the axial direction, and a lid outer cylindrical part 93 extending from an outer circumferential side of the lid base plate part 92 to the same side as the lid inner cylindrical part 91 in the axial direction. The female screw 81 described above is formed on an inner circumferential portion of the lid inner cylindrical part 91.

The housing main body 83 includes a cylindrical main body part 101, and an inner annular protrusion 102 protruding inward in the radial direction from one end of the main body part 101 in the axial direction. The housing main body 83 includes an extension part 103 and an engaging part 104.

The extension part 103 extends from an end portion of the main body part 101 on a side opposite to the inner annular protrusion 102 in the axial direction. The extension part 103 is thinner than the main body part 101. The engaging part 104 extends inward in the radial direction from an end portion of the extension part 103 on a side opposite to the main body part 101 in the axial direction. The lid base plate part 92 of the lid member 82 is fitted to the extension part 103 of the housing main body 83 before the engaging part 104 is formed, the engaging part 104 is formed by swaging, and thereby the housing main body 83 and the lid member 82 are integrated to form the housing 84.

The free piston 86 includes a substantially cylindrical piston cylindrical part 111, a piston closing plate part 112, and an annular outer annular protrusion 113. The piston closing plate part 112 closes one end of the piston cylindrical part 111 in the axial direction. The outer annular protrusion 113 protrudes radially outward from a center of the piston cylindrical part 111 in the axial direction. A plurality of passage holes 115 are formed at a central position of the outer annular protrusion 113 in the axial direction at intervals in a circumferential direction of the free piston 86. The passage holes 115 penetrate the piston cylindrical part 111 and the outer annular protrusion 113 in the radial direction. The free piston 86 is slidably fitted and inserted in the housing 84 to be slidable in the axial direction.

The O-ring 88 is provided between the outer annular protrusion 113 of the free piston 86 and the lid outer cylindrical part 93 of the lid member 82. The O-ring 89 is provided between the outer annular protrusion 113 of the free piston 86 and the inner annular protrusion 102 of the housing main body 83. When the free piston 86 moves to the lid member 82 side in the axial direction with respect to the housing 84, the outer annular protrusion 113 thereof sandwiches the O-ring 88 with the lid outer cylindrical part 93 of the lid member 82 to elastically deform it. When the free piston 86 moves to a side opposite to the lid member 82 in the axial direction with respect to the housing 84, the outer annular protrusion 113 thereof sandwiches the O-ring 89 with the inner annular protrusion 102 of the housing main body 83 to elastically deform it.

The frequency sensitive part 72 includes a variable chamber 121 between the lid member 82 and a portion mainly on an inner side of the free piston 86. The variable chamber 121 communicates with the first chamber 19 via the rod passage 75 of the piston rod 21, the throttle flow path 76 of the throttle flow path forming part 77, the passages in the annular recessed part 38 and the plurality of passage holes 37 of the piston 18. The variable chamber 121 includes passages in the passage holes 115 of the free piston 86, and a chamber surrounded by the housing 84 communicating with the passages in the passage holes 115, an outer circumferential portion of the free piston 86, and the O-rings 88 and 89. The frequency sensitive part 72 includes a variable chamber 122 between the O-ring 89 and the inner annular protrusion 102 of the housing main body 83. The variable chamber 122 communicates with the second chamber 20. A volume of the variable chamber 121 increases when the free piston 86 moves in a direction away from the lid base plate part 92. The volume of the variable chamber 121 is reduced when the free piston 86 moves in a direction toward the lid base plate part 92. Communication between the variable chamber 121 and the variable chamber 122 is blocked by the O-ring 89.

When the disc valve 51 is separated and open from the valve seat part 47 of the piston 18, the oil fluid from the passages in the plurality of passage holes 37 and the annular recessed part 38 is caused to flow into the second chamber 20. The passages in the plurality of passage holes 37 and the annular recessed part 38 of the piston 18 and a passage between the disc valve 51 and the valve seat part 47 constitute a first passage 131. The first passage 131 is provided in the piston 18. The first passage 131 serves as an extension-side passage through which the oil fluid as a working fluid moves from the first chamber 19 on an upstream side toward the second chamber 20 on a downstream side in the cylinder 2 when the piston 18 moves to the first chamber 19 side, that is, during the extension stroke. The extension-side first damping force generation mechanism 41 including the valve seat part 47 and the disc valve 51 is provided in the first passage 131. The first damping force generation mechanism 41 generates a damping force by opening and closing the first passage 131 with the disc valve 51 to suppress a flow of the oil fluid. The extension-side first damping force generation mechanism 41 includes the fixed orifice 52.

When the disc valve 61 is separated and open from the valve seat part 49 of the piston 18, the oil fluid from the passages in the plurality of passage holes 39 and the annular recessed part 40 is caused to flow into the first chamber 19. The passages in the plurality of passage holes 39 and the annular recessed part 40 and a passage between the disc valve 61 and the valve seat part 49 constitute a first passage 132. This first passage 132 is provided in the piston 18. The first passage 132 serves as a compression-side passage through which the oil fluid as a working fluid moves from the second chamber on an upstream side toward the first chamber 19 on the second side that is on a downstream side in the cylinder 2 when the piston 18 moves to the second chamber 20 side, that is, during the compression stroke. The compression-side first damping force generation mechanism 42 including the valve seat part 49 and the disc valve 61 is provided in the first passage 132. The first damping force generation mechanism 42 generates a damping force by opening and closing the first passage 132 with the disc valve 61 to suppress a flow of the oil fluid. The compression-side first damping force generation mechanism 42 includes the fixed orifice 62.

In the shock absorber 1, the passages in the plurality of passage holes 37 and the annular recessed part 38 of the piston 18, the throttle flow path 76 of the throttle flow path forming part 77, the rod passage 75 of the piston rod 21, the variable chamber 121, and the variable chamber 122 constitute a second passage 141 that is parallel to the first passages 131 and 132. The passages in the passage holes 37 and the annular recessed part 38 that constitute the second passage 141 are common to the passages in the passage holes 37 and the annular recessed part 38 that constitute the first passage 131. The throttle flow path 76 of the throttle flow path forming part 77, the rod passage 75 of the piston rod 21, the variable chamber 121, and the variable chamber 122 are provided in parallel. The second passage 141 is parallel to the first passage 132 as a whole. In the second passage 141, the throttle flow path 76 of the throttle flow path forming part 77, the rod passage 75 of the piston rod 21, the variable chamber 121, and the variable chamber 122 serve as a parallel passage 142 that is parallel to the first passages 131 and 132.

The second passage 141 includes the rod passage 75 of the piston rod 21. The second passage 141 is provided in the piston rod 21. The parallel passage 142 and the frequency sensitive part 72 are provided in the second passage 141. The parallel passage 142 and the frequency sensitive part 72 constitute a second damping force generation mechanism 145 that generates a damping force in cooperation with the first damping force generation mechanisms 41 and 42. The second damping force generation mechanism 145 includes the throttle flow path 76 and the frequency sensitive part 72. The housing 84 is fixed to the piston rod 21 to form the variable chambers 121 and 122 that are a part of the second passage 141.

An operation of the frequency sensitive part 72 is as follows.

That is, in the extension stroke in which a piston frequency is low, at the beginning of the stroke, a volume of the oil fluid entering the variable chamber 121 from the first chamber 19 through the second passage 141 is large, and an amount of movement of the free piston 86 with respect to the housing 84 is large. Therefore, the free piston 86 elastically deforms the O-ring 89 between the outer annular protrusion 113 and the inner annular protrusion 102 of the housing main body 83 and stops. Then, it becomes a state in which the oil fluid is not introduced into the variable chamber 121 thereafter. Thereby, the oil fluid from the first chamber 19 flows from the first passage 132 to the second chamber 20 via the extension-side first damping force generation mechanism 41. At that time, the first damping force generation mechanism 41 generates a damping force.

In the extension stroke in which the piston frequency is high, a volume of the oil fluid entering the variable chamber 121 from the first chamber 19 through the second passage 141 is small, and an amount of movement of the free piston 86 with respect to the housing 84 is small. Therefore, the oil fluid flowing out from the first chamber 19 can be absorbed by the variable chamber 121. Thereby, an amount of the oil fluid flowing from the first chamber 19 to the second chamber 20 via the extension-side first damping force generation mechanism 41 reduces. Therefore, the first damping force generation mechanism 41 generates a softer damping force than that when the piston frequency is low.

In the compression stroke in which the piston frequency is low, at the beginning of the stroke, the free piston 86 largely moves with respect to the housing 84 due to a pressure in the second chamber 20, elastically deforms the O-ring 88 between the outer annular protrusion 113 and the lid outer cylindrical part 93 of the lid member 82, and stops. Then, it becomes a state in which the free piston 86 does not move with respect to the housing 84 thereafter. Thereby, the oil fluid from the second chamber 20 flows from the first passage 132 to the first chamber 19 via the compression-side first damping force generation mechanism 42. At that time, the first damping force generation mechanism 42 generates a damping force.

In the compression stroke in which the piston frequency is high, an amount of movement of the free piston 86 with respect to the housing 84 is small. Therefore, an increase in pressure of the second chamber 20 can be absorbed by the movement of the free piston 86 with respect to the housing 84. Thereby, an amount of the oil fluid flowing from the second chamber 20 to the first chamber 19 via the compression-side first damping force generation mechanism 42 reduces. Therefore, the first damping force generation mechanism 42 generates a softer damping force than that when the piston frequency is low.

As illustrated in FIG. 1, the above-described base valve 25 is provided between the cylinder bottom part 12 of the outer cylinder 4 and the inner cylinder 3. The base valve 25 includes a base valve member 191 that partitions the lower chamber 20 and the reservoir chamber 6, a disc valve 192 provided on a lower side of the base valve member 191, that is, on the reservoir chamber 6 side, a disc valve 193 provided on an upper side of the base valve member 191, that is, on the lower chamber 20 side, and an attachment pin 194 that attaches the disc valve 192 and the disc valve 193 to the base valve member 191.

The base valve member 191 has an annular shape through which the attachment pin 194 is inserted at a center in the radial direction. A plurality of passage holes 195 and a plurality of passage holes 196 are formed in the base valve member 191. The passage holes 195 allow the oil fluid to flow between the lower chamber 20 and the reservoir chamber 6. The passage holes 196 allow the oil fluid to flow between the lower chamber 20 and the reservoir chamber 6 on an outer side of the passage holes 195 in the radial direction of the base valve member 191. The disc valve 192 on the reservoir chamber 6 side restricts a flow of the oil fluid from the reservoir chamber 6 to the lower chamber 20 through the passage holes 195 while allowing a flow of the oil fluid from the lower chamber 20 to the reservoir chamber 6 through the passage holes 195. The disc valve 193 restricts a flow of the oil fluid from the lower chamber 20 to the reservoir chamber 6 through the passage holes 196 while allowing a flow of the oil fluid from the reservoir chamber 6 to the lower chamber 20 through the passage holes 196.

The disc valve 192, together with the base valve member 191, constitutes a compression-side damping valve mechanism 197. The damping valve mechanism 197 opens in the compression stroke of the shock absorber 1 to cause the oil fluid to flow from the lower chamber 20 to the reservoir chamber 6 and generate a damping force. The disc valve 193, together with the base valve member 191, constitutes a suction valve mechanism 198. The suction valve mechanism 198 opens in the extension stroke of the shock absorber 1 to cause the oil fluid to flow from the reservoir chamber 6 in the lower chamber 20. Further, the suction valve mechanism 198 performs a function of causing the oil fluid to flow from the reservoir chamber 6 to the lower chamber 20 substantially without generating a damping force so that a shortage of the oil fluid caused mainly due to extension of the piston rod 21 from the cylinder 2 is supplemented.

As illustrated in FIG. 2, in the first embodiment, the rod passage 75 is formed of an axial hole 151 and a radial hole 152 formed in the mounting shaft part 28 of the piston rod 21. The axial hole 151 extends linearly in the axial direction of the mounting shaft part 28. The axial hole 151 is formed at a central position in the radial direction of the mounting shaft part 28. The axial hole 151 has a circular cross-sectional shape in a direction perpendicular to its axis. The axial hole 151 is formed from an end surface of the mounting shaft part 28 on a side opposite to the main shaft part 27 in the axial direction to a predetermined position short of the main shaft part 27. The rod passage 75 opens to the variable chamber 121 at the axial hole 151.

The radial hole 152 extends linearly in the radial direction of the mounting shaft part 28. The radial hole 152 is formed at an intermediate position in the axial direction of the mounting shaft part 28 and at a central position in the radial direction of the mounting shaft part 28. The radial hole 152 is perpendicular to the axial hole 151. The radial hole 152 communicates with the axial hole 151. The radial hole 152 penetrates the mounting shaft part 28 in the radial direction. The radial hole 152 is formed between the male screw 31 and the shaft step part 29 in the axial direction of the mounting shaft part 28. The radial hole 152 overlaps both the piston 18 and the disc valve 51 in position. The radial hole 152 has a circular cross-sectional shape in a direction perpendicular to its axis. The rod passage 75 opens to an outer diameter side of the mounting shaft part 28 of the piston rod 21 at the radial hole 152.

Therefore, the rod passage 75 of the second passage 141 provided in the piston rod 21 includes a plurality of, specifically two, first openings 156 formed on the first side and opening to an outer diameter surface on the piston 18 side, and a second opening 157 formed on the second side, penetrating the inside of the piston rod 21, and opening to the housing 84 side. The first openings 156 are disposed at regular intervals in a circumferential direction of the piston rod 21.

Figure 3:
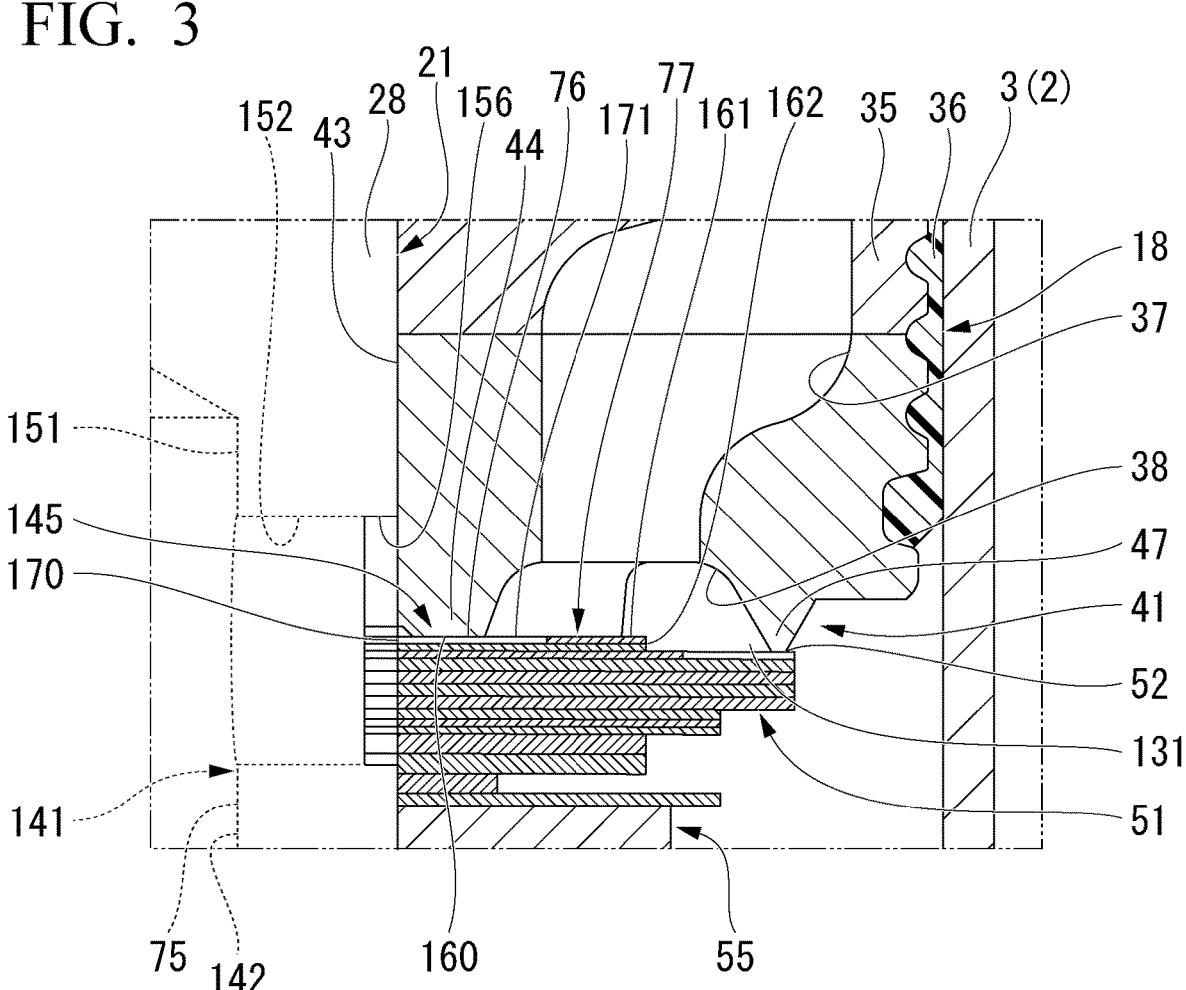
FIG. 3 is a partial cross-sectional view of a main part of the shock absorber according to the first embodiment of the present invention.

As illustrated in FIG. 3, the throttle flow path forming part 77 includes a throttle disc 161 (throttle member, throttle valve) and a disc 162. The throttle disc 161 is fitted on the mounting shaft part 28 of the piston rod 21 and is in contact with a distal end surface 160 of the inner seat part 44 of the piston 18. The disc 162 is fitted on the mounting shaft part 28 of the piston rod 21 and is in contact with the throttle disc 161 on a side opposite to the inner seat part 44 in the axial direction (thickness direction). The disc 162 is in contact with the disc valve 51 at a side opposite to the throttle disc 161 in the axial direction (thickness direction). The distal end surface 160 of the inner seat part 44 is a flat surface extending perpendicular to the axis of the mounting shaft part 28. The distal end surface 160 has a constant inner diameter over the entire circumference, a constant outer diameter over the entire circumference, and a constant radial width over the entire circumference.

Both the throttle disc 161 and the disc 162 have a bored disc shape fitted on the mounting shaft part 28. A notch part 171 is formed in the throttle disc 161. The notch part 171 extends radially outward from an inner circumferential end edge portion 170 fitted on the mounting shaft part 28 to a predetermined intermediate position in the radial direction. The throttle disc 161 has a constant outer diameter over the entire circumference. A plurality of notch parts 171 having the same shape are formed in the throttle disc 161 at regular intervals in the circumferential direction. All the notch parts 171 extend to an outer side of the distal end surface 160 of the inner seat part 44 in the radial direction of the throttle disc 161. Therefore, the distal end surface 160 of the inner seat part 44 covers and closes a part of each notch part 171 on an inner side in the radial direction of the throttle disc 161 from a side opposite to the disc 162 in the axial direction for all the notch parts 171 of the throttle disc 161. For all the notch parts 171, the throttle disc 161 allows a part of each notch part 171 on an outer side in the radial direction of the throttle disc 161 to communicate with the passages in the annular recessed part 38 and the plurality of passage holes 37 of the piston 18. In other words, the throttle disc 161 allows a part of each notch part 171 on an outer side in the radial direction of the throttle disc 161 to communicate with the first passage 131 for all the notch parts 171.

The disc 162 has a constant inner diameter over the entire circumference, a constant outer diameter over the entire circumference, and a constant radial width over the entire circumference. The disc 162 has an inner diameter equal to a minimum inner diameter of the throttle disc 161 and an outer diameter equal to an outer diameter of the throttle disc 161. Therefore, the disc 162 covers and closes each notch part 171 in its entirety from a side opposite to the inner seat part 44 in the axial direction for all the notch parts 171 of the throttle disc 161.

The throttle disc 161 forming the throttle flow path 76 together with the inner seat part 44 and the disc 162 is provided in the second damping force generation mechanism 145 including the throttle flow path 76. The throttle disc 161 includes the plurality of notch parts 171 at substantially regular intervals in the circumferential direction. The throttle disc 161 is a throttle valve that forms the throttle flow path 76 in the parallel passage 142 of the second passage 141 due to the notch parts 171. The throttle disc 161 is provided on the piston 18 side which is one side of the second passage 141 with respect to the housing 84 illustrated in FIG. 2.

As illustrated in FIG. 3, a central position of the throttle disc 161 is aligned with a central position of the radial hole 152 in the axial direction of the mounting shaft part 28 of the piston rod 21. Therefore, a central position of the throttle flow path 76 is aligned with a central position of a passage in the radial hole 152 of the rod passage 75 in the axial direction of the mounting shaft part 28 of the piston rod 21. The throttle flow path 76 communicates with the rod passage 75 as illustrated also in FIG. 4.

Figure 4:
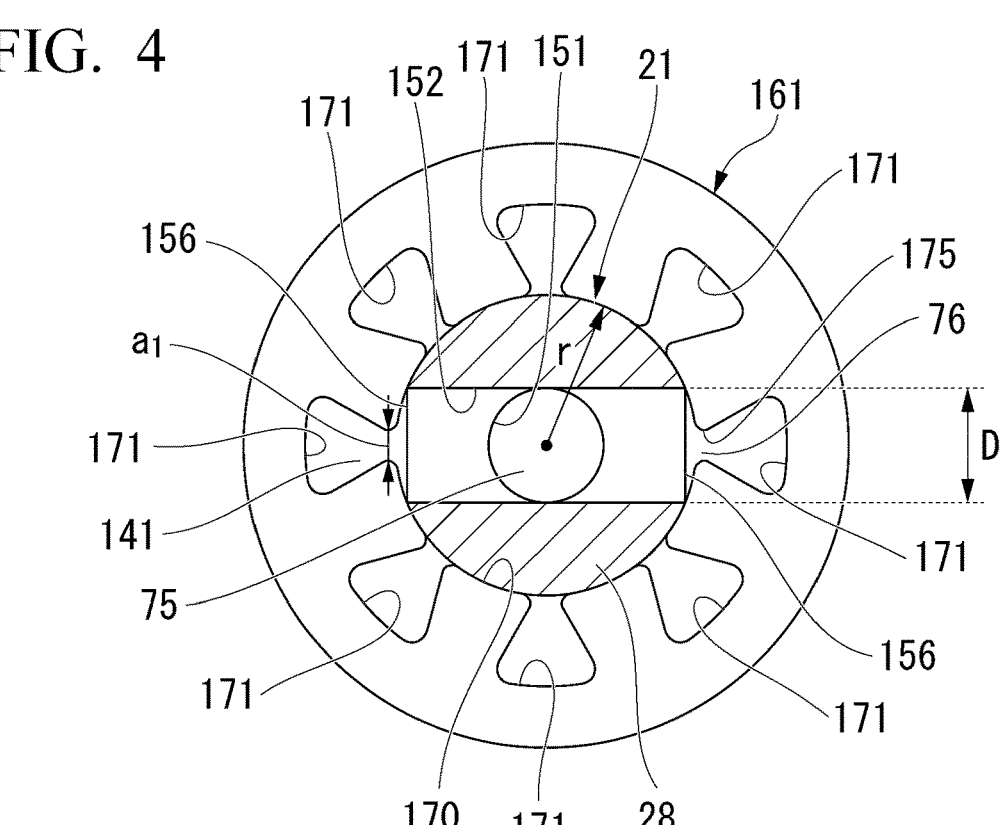
FIG. 4 is a cross-sectional view of a throttle disc and a piston rod of the shock absorber according to the first embodiment of the present invention.
Figure 5:
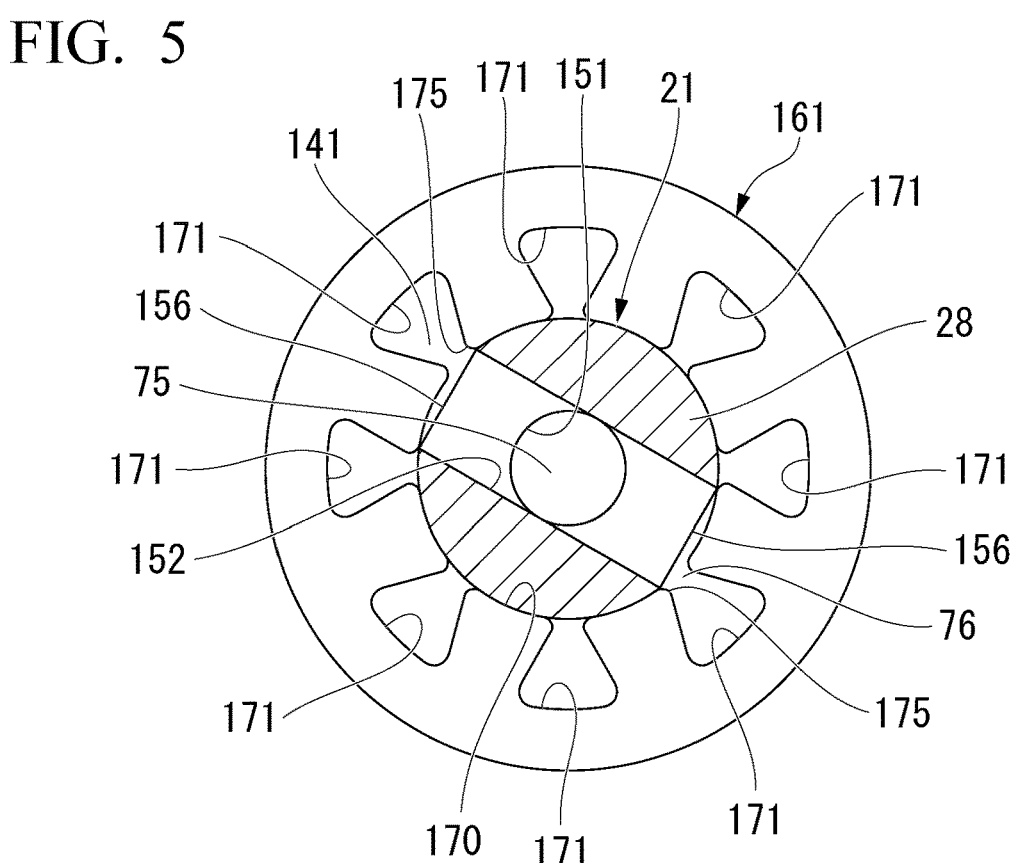
FIG. 5 is a cross-sectional view of the throttle disc and the piston rod of the shock absorber according to the first embodiment of the present invention.
Figure 6:
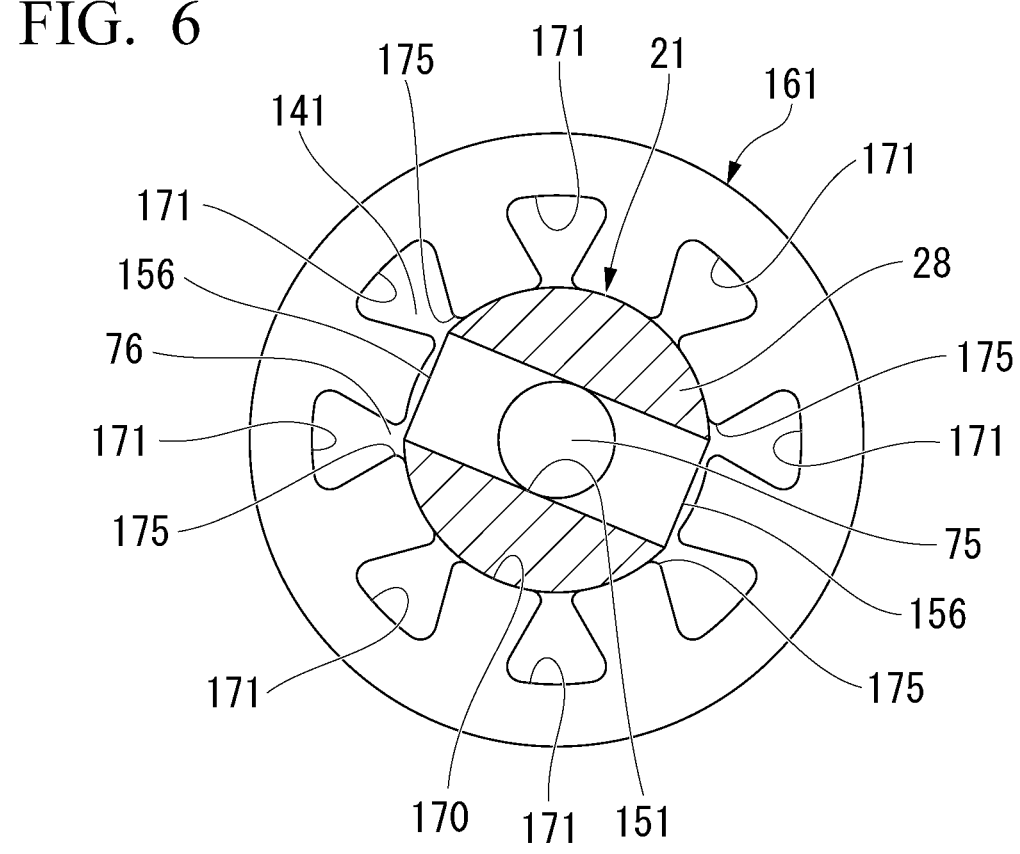
FIG. 6 is a cross-sectional view of the throttle disc and the piston rod of the shock absorber according to the first embodiment of the present invention.

As illustrated in FIGS. 4 to 6, the throttle disc 161 is formed to have a flow path area of the throttle flow path 76 that is constant regardless of its attachment position in the circumferential direction with respect to the mounting shaft part 28 of the piston rod 21.

As illustrated in FIGS. 4 to 6, the plurality of, specifically eight, notch parts 171 formed in the throttle disc 161 have the same shape. These notch parts 171 are provided at regular intervals in the circumferential direction of the throttle disc 161.

The plurality of notch parts 171 each have a notch shape in which an outer circumferential side of the throttle disc 161 in the radial direction is wider than an inner circumferential side thereof. Each of the notch parts 171 has a mirror-symmetrical shape in the circumferential direction of the throttle disc 161. The notch part 171 has substantially a shape in which an apex side of an isosceles triangle is notched.

The notch part 171 has a minimum cross-sectional area part 175 on an inner circumferential side. The minimum cross-sectional area part 175 has a minimum flow path cross-sectional area due to a minimum width in the circumferential direction of the throttle disc 161. One end portion of the minimum cross-sectional area part 175 in the axial direction (thickness direction) of the throttle disc 161 is covered with the distal end surface 160 at a radially inner end position of the distal end surface 160 of the inner seat part 44 illustrated in FIG. 3. The other end portion of the minimum cross-sectional area part 175 in the axial direction (thickness direction) of the throttle disc 161 is covered with the disc 162 at a radially intermediate position of the disc 162. Therefore, the minimum cross-sectional area part 175 is a portion in which a flow path cross-sectional area of the throttle flow path 76 is minimized.

Here, setting of each part when the throttle valve such as the throttle disc 161 of the first embodiment is formed so that the flow path area of the throttle flow path is constant regardless of its attachment position in the circumferential direction with respect to the piston rod will be described.

A shock absorber in the following description includes a cylinder in which a working fluid is sealed, a piston provided in the cylinder to be movable and partitioning the inside of the cylinder into a first chamber and a second chamber, a piston rod connected to the piston and extending to the outside of the cylinder, a first passage provided in the piston and through which the working fluid moves from a chamber on an upstream side to a chamber on a downstream side in the cylinder due to movement of the piston, a first damping force generation mechanism provided in the first passage to generate a damping force, a second passage provided in the piston rod, a fixing member fixed to the piston rod to form the second passage, and a second damping force generation mechanism provided in the second passage to generate a damping force.

In this shock absorber, the second damping force generation mechanism includes a throttle valve. The throttle valve is provided on one side of the second passage formed to include a fixing member. The throttle valve includes a plurality of notch parts at regular intervals in a circumferential direction. The throttle valve forms a throttle flow path in the second passage due to the notch parts.

In such a shock absorber, the number of notch parts in the throttle valve is expressed as $n=px$ provided that n is the number of the notch parts formed in the throttle valve, p is a natural number larger than 1, and x is a natural number larger than 0.

Then, the second passage provided in the piston rod includes one or more first openings formed on the first side and opening to an outer diameter surface on the piston side, and a second opening formed on the second side, penetrating the inside of the piston rod, and opening to the fixing member side. In a case of a plurality of first openings, the first openings are equally spaced in the circumferential direction of the piston rod.

In this case, $D=2r \cdot \sin(360/2p)$ is satisfied provided that D is a diameter of the first opening, and r is a radius of the piston rod at a position at which the throttle valve is disposed.

Then, a minimum effective flow path area of the flow path formed of the throttle valve and the first openings is set so that $a_e = a_1 \cdot B(n/p)$ provided that $a_e$ is a minimum cross-sectional area of the flow path due to all the notch parts of the throttle valve, $a_1$ is a minimum cross-sectional area of the flow path due to one notch part of the throttle valve, and B is the number of the first openings.

The throttle valve whose shape is set in this way has a flow path area of the throttle flow path that is constant regardless of its attachment position in the circumferential direction with respect to the piston rod.

The above-described setting is applied to the configuration of the first embodiment.

The shock absorber 1 includes the cylinder 2 in which a working fluid is sealed, the piston 18 provided in the cylinder 2 to be movable and partitioning the inside of the cylinder 2 into the first chamber 19 and the second chamber 20, the piston rod 21 connected to the piston 18 and extending to the outside of the cylinder 2, the first passages 131 and 132 provided in the piston 18 and through which the working fluid moves from a chamber on an upstream side to a chamber on a downstream side in the cylinder 2 due to movement of the piston 18, the first damping force generation mechanisms 41 and 42 provided in the first passages 131 and 132 to generate a damping force, the second passage 141 provided in the piston rod 21, the housing 84 fixed to the piston rod 21 to form the second passage 141, and the second damping force generation mechanism 145 provided in the second passage 141 to generate a damping force.

In the shock absorber 1, the second damping force generation mechanism 145 includes the throttle disc 161. The throttle disc 161 is provided on one side of the second passage 141 formed to include the housing 84. The throttle disc 161 includes the plurality of notch parts 171 at regular intervals in the circumferential direction. The throttle disc 161 forms the throttle flow path 76 in the second passage 141 due to the notch parts 171.

In such a shock absorber 1, the number of the notch parts 171 in the throttle disc 161 can be expressed as n=px provided that n is set to 8 which is the number of the notch parts 171 formed in the throttle disc 161, p is a natural number larger than 1, and x is a natural number larger than 0.

Then, the second passage 141 provided in the piston rod 21 includes two first openings 156 formed on the first side and opening to an outer diameter surface on the piston 18 side, and the second opening 157 formed on the second side, penetrating the inside of the piston rod 21, and opening to the housing 84 side.

In this case, $D=2r \cdot \sin(360/2p)$ is satisfied provided that D is a diameter of the first opening 156, and r is a radius of the mounting shaft part 28 of the piston rod 21 at a position at which the throttle disc 161 is disposed.

Then, a minimum effective flow path area of the flow path formed of the throttle disc 161 and the first opening 156 is set so that $a_e=a_1 \cdot B(n/p)$ provided that $a_e$ is a minimum cross-sectional area of the flow path due to all the notch parts 171 of the throttle disc 161, $a_1$ is a minimum cross-sectional area of the flow path, that is, a cross-sectional area of the minimum cross-sectional area part 175 due to one notch part 171 of the throttle disc 161, and B is set to 2 which is the number of the first openings 156.

Here, in the shock absorber 1 of the first embodiment, at least a part of the notch parts 171 of the throttle disc 161 is closed by the mounting shaft part 28 and at least a part of the notch parts 171 thereof is open at the first predetermined position as illustrated in FIG. 4. Also, as illustrated in FIGS. 5 and 6, at the second predetermined position which is a different rotation position from the first predetermined position, at least a part of the notch parts 171 that has been closed by the mounting shaft part 28 at the first predetermined position is open, and at least a part of the notch parts 171 that has been open at the first predetermined position is closed.

In the shock absorber disclosed in Patent Document 1, a notch part is formed on an inner circumferential side of a disc to form a flow path. In the shock absorber with such a configuration, an amount of communication between the flow path provided in the disc and the passage provided in the piston rod may vary depending on a position of the disc in a rotational direction (circumferential direction) with respect to the piston rod. Then, there is a likelihood that a variation will occur in damping force performance depending on products. On the other hand, shock absorbers are required to achieve stabilization in damping force performance.

On the other hand, in the shock absorber 1 of the first embodiment, the throttle disc 161 is formed so that a flow path area of the throttle flow path 76 is constant regardless of its attachment position in the circumferential direction with respect to the piston rod 21 by setting a shape thereof on the basis of the setting method described above. Therefore, regardless of a position of the throttle disc 161 in the rotational direction (circumferential direction) with respect to the piston rod 21, an amount of communication between the throttle flow path 76 provided in the throttle disc 161 and the rod passage 75 provided in the piston rod 21 can be made constant. Therefore, it is possible to suppress variations in damping force performance depending on products. Therefore, stabilization in damping force performance can be achieved.

Also, in the throttle disc 161, at least a part of the notch parts 171 is closed and at least a part of the notch parts 171 is open at the first predetermined position, and at least a part of the notch parts 171 that has been closed at the first predetermined position is open and at least a part of the notch parts 171 that has been open at the first predetermined position is closed at the second predetermined position which is a different rotation position from the first predetermined position. Therefore, the structure has a likelihood that an amount of communication between the throttle flow path 76 provided in the throttle disc 161 and the rod passage 75 provided in the piston rod 21 will vary depending on a position of the throttle disc 161 in a rotational direction (circumferential direction) with respect to the piston rod 21. For such a structure, the throttle disc 161 is formed so that a flow path area of the throttle flow path 76 is made constant regardless of its attachment position in the circumferential direction with respect to the piston rod 21 by setting a shape thereof on the basis of the setting method described above. Therefore, stabilization in damping force performance can be achieved.

Also, the second passage 141 provided in the piston rod 21 includes the plurality of first openings 156 formed on the first side and opening to an outer diameter surface on the piston 18 side, and the second opening 157 formed on the second side, penetrating the inside of the piston rod 21, and opening to the housing 84 side. Therefore, a shape of the throttle disc 161 can be set so that a flow path area of the throttle flow path 76 is constant regardless of its attachment position in the circumferential direction with respect to the piston rod 21 by the setting method described above. Therefore, stabilization in damping force performance can be achieved.

Also, since the notch part 171 has a notch shape in which an outer circumferential side is wider than an inner circumferential side, a main pressure loss portion can be made to be the vicinity of a contact part between the throttle disc 161 and the piston rod 21, and an influence of a conduit length can be reduced.

Second Embodiment

Next, a second embodiment will be described mainly on the basis of FIGS. 7 to 9, focusing on differences from the first embodiment. Further, parts common to those in the first embodiment will be denoted by the same terms and the same reference signs.

Figure 7:
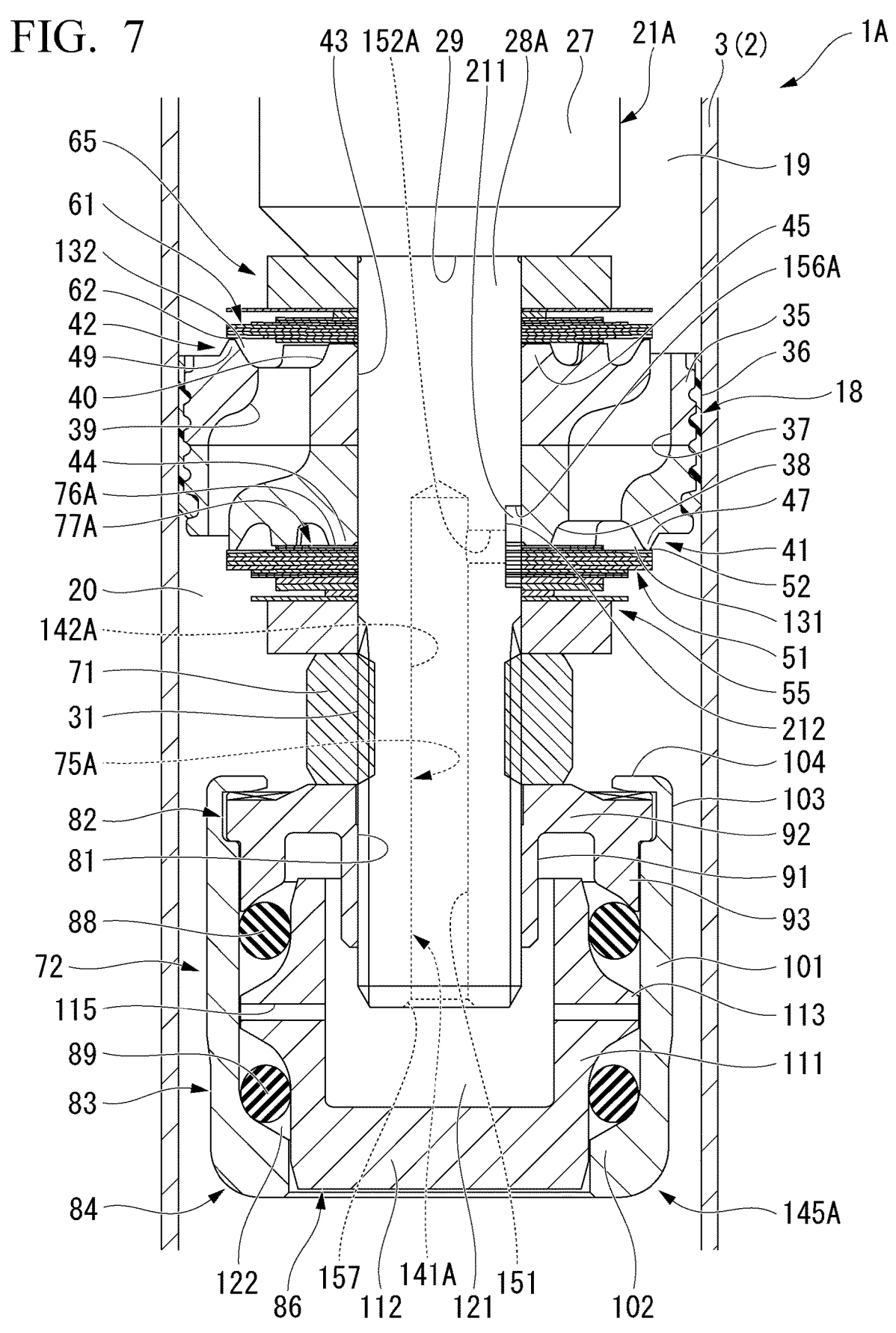
FIG. 7 is a partial cross-sectional view illustrating the vicinity of a piston of a shock absorber according to a second embodiment of the present invention.

As illustrated in FIG. 7, in the shock absorber 1A of the second embodiment, a piston rod 21A is partially different from the piston rod 21. Specifically, a mounting shaft part 28A is partially different from the mounting shaft part 28. The mounting shaft part 28A differs from the mounting shaft part 28 in that a rod passage 75A that is partially different from the rod passage 75 is provided.

The rod passage 75A is formed by an axial hole 151, a radial hole 152A, and a groove part 211 which are formed in the mounting shaft part 28A. The axial hole 151 is the same as that in the first embodiment.

The radial hole 152A extends linearly in a radial direction of the mounting shaft part 28A. The radial hole 152A is formed at an intermediate position in an axial direction of the mounting shaft part 28A and at a central position in the radial direction of the mounting shaft part 28A. The radial hole 152A does not penetrate the mounting shaft part 28A in the radial direction, and extends only to one side in the radial direction from the axial hole 151. The radial hole 152A is perpendicular to the axial hole 151 and communicates with the axial hole 151. The radial hole 152A is formed between a male screw 31 and a shaft step part 29 in the axial direction of the mounting shaft part 28A. The radial hole 152A overlaps both the piston 18 and the disc valve 51 in position. The radial hole 152A has a circular cross-sectional shape in a direction perpendicular to its axis.

The groove part 211 has a shape in which an outer circumferential portion of the mounting shaft part 28A is notched to form a planar bottom surface 212 parallel to a central axis of the mounting shaft part 28A. The groove part 211 is aligned with the radial hole 152A in circumferential position of the mounting shaft part 28A. The groove part 211 is aligned with the radial hole 152A in position in the axial direction of the mounting shaft part 28A. In other words, the radial hole 152A is formed at a central position of the bottom surface 212 in the circumferential direction of the mounting shaft part 28A and at a central position of the bottom surface 212 in the axial direction of the mounting shaft part 28A. The rod passage 75A opens to an outer diameter side of the mounting shaft part 28A of the piston rod 21A at the groove part 211. Therefore, in the rod passage 75A provided in the piston rod 21A, one first opening 156A opening to an outer diameter surface on the piston 18A side is formed by the groove part 211.

Figure 8:
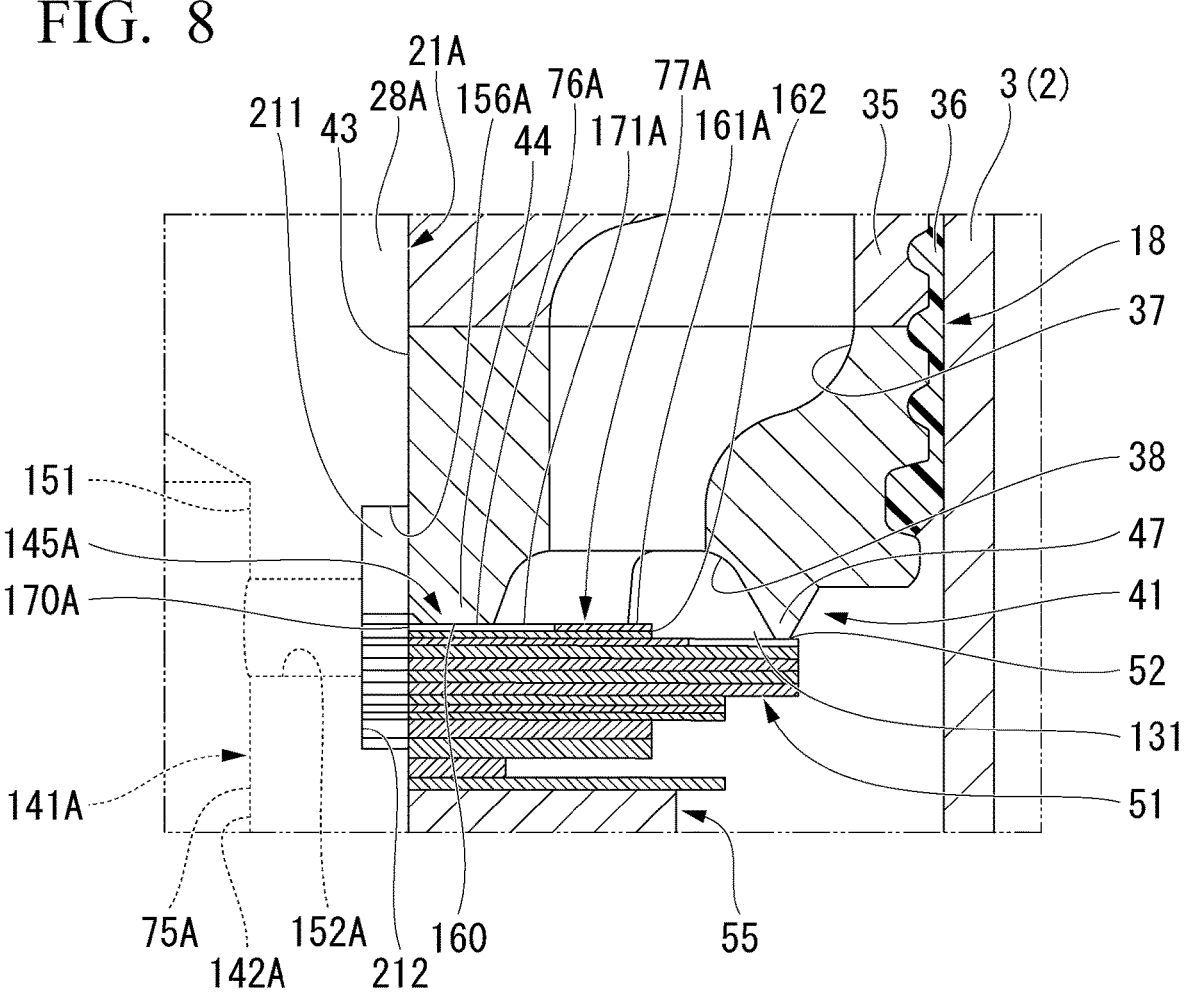
FIG. 8 is a partial cross-sectional view of a main part of the shock absorber according to the second embodiment of the present invention.

In the shock absorber 1A of the second embodiment, a throttle flow path forming part 77A is partially different from the throttle flow path forming part 77, and a throttle flow path 76A is partially different from the throttle flow path 76 as illustrated in FIG. 8. The throttle flow path forming part 77A forming the throttle flow path 76A includes a throttle disc 161A (throttle member, throttle valve) fitted on the mounting shaft part 28A of the piston rod 21A and in contact with a distal end surface 160 of an inner seat part 44 of the piston 18, and a disc 162 similar to that of the first embodiment.

The throttle disc 161A also has a bored disc shape. A notch part 171A extending radially outward from an inner circumferential end edge portion 170A fitted on the mounting shaft part 28A to a predetermined intermediate position in the radial direction is formed in the throttle disc 161A. The throttle disc 161A has a constant outer diameter over the entire circumference and is the same as an outer diameter of the disc 162. A plurality of notch parts 171A having the same shape are formed in the throttle disc 161A at regular intervals in the circumferential direction. All the notch parts 171A extend to an outer side of the distal end surface 160 of the inner seat part 44 in the radial direction of the throttle disc 161A. Therefore, the distal end surface 160 of the inner seat part 44 covers and closes a part of each notch part 171A on an inner side in the radial direction of the throttle disc 161A from a side opposite to the disc 162 in the axial direction for all the notch parts 171A of the throttle disc 161A. For all the notch parts 171A, the throttle disc 161A allows a part of each notch part 171A on an outer side in the radial direction of the throttle disc 161A to communicate with a passage in an annular recessed part 38 of the piston 18. In other words, the throttle disc 161A allows a part of each notch part 171A on an outer side in the radial direction of the throttle disc 161A to communicate with a first passage 131 for all the notch parts 171A. A minimum inner diameter of the throttle disc 161A is the same as an inner diameter of the disc 162.

The throttle disc 161A overlaps the groove part 211 in position in the axial direction of the mounting shaft part 28A of the piston rod 21A. Therefore, the throttle flow path 76A overlaps a passage in the groove part 211 of the rod passage 75A in position in the axial direction of the mounting shaft part 28A. As illustrated also in FIG. 9, the throttle flow path 76A communicates with the rod passage 75A.

In the shock absorber 1A, as illustrated in FIG. 7, passages in a plurality of passage holes 37 and the annular recessed part 38 of the piston 18, the throttle flow path 76A of the throttle flow path forming part 77A, the rod passage 75A of the piston rod 21A, a variable chamber 121, and a variable chamber 122 constitute a second passage 141A that is parallel to the first passages 131 and 132. In the second passage 141A, the throttle flow path 76A of the throttle flow path forming part 77A, the rod passage 75A of the piston rod 21A, the variable chamber 121, and the variable chamber 122 serve as a parallel passage 142A that is parallel to the first passages 131 and 132 similarly to the parallel passage 142.

The second passage 141A includes the rod passage 75A of the piston rod 21A. The second passage 141A is provided in the piston rod 21A. The parallel passage 142A and a frequency sensitive part 72 are provided in the second passage 141A. The parallel passage 142A and the frequency sensitive part 72 constitute a second damping force generation mechanism 145A that generates a damping force in cooperation with the first damping force generation mechanisms 41 and 42. The second damping force generation mechanism 145A includes the throttle flow path 76A and the frequency sensitive part 72.

The throttle disc 161A, together with the inner seat part 44 and the disc 162, forms the throttle flow path 76A. The throttle disc 161A is provided in the second damping force generation mechanism 145A including the throttle flow path 76A.

The throttle disc 161A includes the plurality of notch parts 171A at substantially regular intervals in the circumferential direction. The throttle disc 161A is a throttle valve that forms the throttle flow path 76A in the parallel passage 142A of the second passage 141A due to the notch parts 171A. The throttle disc 161A is provided on the piston 18 side which is one side of the second passage 141A with respect to a housing 84.

The throttle disc 161A is formed to have a flow path area of the throttle flow path 76A that is constant regardless of its attachment position in the circumferential direction with respect to the mounting shaft part 28A of the piston rod 21A.

Figure 9:
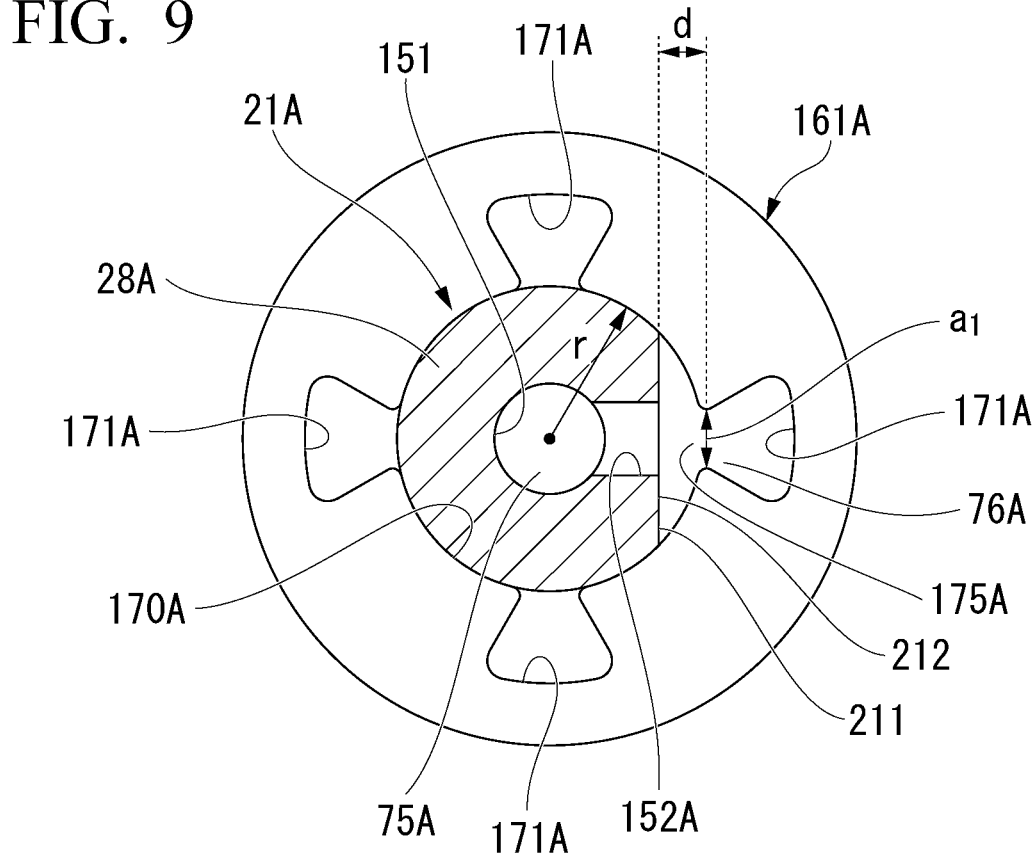
FIG. 9 is a cross-sectional view of a throttle disc and a piston rod of the shock absorber according to the second embodiment of the present invention.

As illustrated in FIG. 9, for example, the plurality of, specifically four, notch parts 171A formed in the throttle disc 161A have the same shape. The notch parts 171A are provided at regular intervals in the circumferential direction of the throttle disc 161A. Each of the plurality of notch parts 171A has a notch shape in which an outer circumferential side of the throttle disc 161A is wider than an inner circumferential side thereof. Each of the notch parts 171A has a mirror-symmetrical shape in the circumferential direction of the throttle disc 161A. The notch part 171A has substantially a shape in which an apex side of an isosceles triangle is notched.

The notch part 171A includes a minimum cross-sectional area part 175A on an inner circumferential side. The minimum cross-sectional area part 175A has a minimum flow path cross-sectional area due to a minimum width in the circumferential direction of the throttle disc 161A. One end portion of the minimum cross-sectional area part 175A in the axial direction (thickness direction) of the throttle disc 161A is covered with the distal end surface 160 at a radially inner end position of the distal end surface 160 of the inner seat part 44 illustrated in FIG. 8. The other end portion of the minimum cross-sectional area part 175A in the axial direction (thickness direction) of the throttle disc 161A is covered with the disc 162 at a radially intermediate position of the disc 162. Therefore, the minimum cross-sectional area part 175A is a portion in which the flow path cross-sectional area of the throttle flow path 76A is minimized.

Setting of each part when a throttle valve such as the throttle disc 161A of the second embodiment is formed to have a flow path area of the throttle flow path that is constant regardless of its attachment position in the circumferential direction with respect to the piston rod will be described.

In the following description, a shock absorber includes a cylinder in which a working fluid is sealed, a piston provided in the cylinder to be movable and partitioning the inside of the cylinder into a first chamber and a second chamber, a piston rod connected to the piston and extending to the outside of the cylinder, a first passage provided in the piston and through which the working fluid moves from a chamber on an upstream side to a chamber on a downstream side in the cylinder due to movement of the piston, a first damping force generation mechanism provided in the first passage to generate a damping force, a second passage provided in the piston rod, a fixing member fixed to the piston rod to form the second passage, and a second damping force generation mechanism provided in the second passage to generate a damping force.

In this shock absorber, the second damping force generation mechanism includes a throttle valve. The throttle valve is provided on one side of the second passage formed to include a fixing member. The throttle valve includes a plurality of notch parts at regular intervals in a circumferential direction. The throttle valve forms a throttle flow path in the second passage due to the notch parts.

In such a shock absorber, the number of the notch parts in the throttle valve is expressed as n=px provided that n is the number of the notch parts formed in the throttle valve, p is a natural number larger than 1, and x is a natural number larger than 0.

The second passage provided in the piston rod includes the groove part formed by notching an outer circumferential portion of the piston rod. In a case of a plurality of groove parts, the groove parts are equally spaced in the circumferential direction of the piston rod.

In this case, $d=r-r\cdot\cos(360/2p)$ is satisfied provided that d is a depth of the groove part, and r is a radius of the piston rod at a position at which the throttle valve is disposed.

Then, a minimum effective flow path area of the flow path formed of the throttle valve and the groove part is set so that $a_e=a_1\cdot A(n/p)$ provided that $a_e$ is a minimum cross-sectional area of the flow path due to all the notch parts of the throttle valve, $a_1$ is a minimum cross-sectional area of the flow path due to one notch part of the throttle valve, and A is the number of grooves of the groove part of the piston rod.

The throttle valve whose shape is set in this way has a flow path area of the throttle flow path that is constant regardless of its attachment position in the circumferential direction with respect to the piston rod.

The above-described setting is applied to the configuration of the second embodiment.

The shock absorber 1A includes the second passage 141A provided in the piston rod 21A, and the second damping force generation mechanism 145A provided in the second passage 141A to generate a damping force in cooperation with the first damping force generation mechanisms 41 and 42.

In the shock absorber 1A, the second damping force generation mechanism 145A includes the throttle disc 161A. The throttle disc 161A is provided on one side of the second passage 141A provided to include the housing 84. The throttle disc 161A includes the plurality of notch parts 171A at regular intervals in the circumferential direction. The throttle disc 161A forms the throttle flow path 76A in the second passage 141A due to the notch parts 171A.

In such a shock absorber 1A, the number of the notch parts 171A in the throttle disc 161A can be expressed as n=px provided that n is set to 4 which is the number of the notch parts 171A formed in the throttle disc 161A, p is a natural number larger than 1, and x is a natural number larger than 0.

Then, the second passage 141A provided in the piston rod 21A includes the groove part 211 formed by notching an outer circumferential portion of the piston rod 21A.

In this case, $d=r-r\cdot\cos(360/2p)$ is satisfied provided that d is a depth of the groove part 211, and r is a radius of the mounting shaft part 28A of the piston rod 21A at a position at which the throttle disc 161A is disposed.

Then, a minimum effective flow path area of the flow path formed of the throttle disc 161A and the groove part 211 is set so that $a_e=a_1\cdot A(n/p)$ provided that $a_e$ is a minimum cross-sectional area of the flow path due to all the notch parts 171A of the throttle disc 161A, $a_1$ is a minimum cross-sectional area of the flow path, that is, the minimum cross-sectional area part 175A, due to one notch part 171A of the throttle disc 161A, and A is set to 1 that is the number of grooves of the groove part 211 of the piston rod 21A.

The throttle disc 161A whose shape is set in this way has a flow path area of the throttle flow path 76A that is constant regardless of its attachment position in the circumferential direction with respect to the piston rod 21A.

Here, also in the shock absorber 1A of the second embodiment, at least a part of the notch parts 171A of the throttle disc 161A is closed by the mounting shaft part 28A and at least a part of the notch parts 171A thereof is open at a first predetermined position. Also, at a second predetermined position which is a different rotation position from the first predetermined position, at least a part of the notch parts 171A that has been closed by the mounting shaft part 28A at the first predetermined position is open, and at least a part of the notch parts 171A that has been open at the first predetermined position is closed.

In the shock absorber 1A of the second embodiment, the throttle disc 161A is formed so that the flow path area of the throttle flow path 76A is constant regardless of its attachment position in the circumferential direction with respect to the piston rod 21A by setting a shape thereof on the basis of the setting method described above. Therefore, regardless of a position of the throttle disc 161A in the rotational direction (circumferential direction) with respect to the piston rod 21A, an amount of communication between the throttle flow path 76A provided in the throttle disc 161A and the rod passage 75A provided in the piston rod 21A can be made constant. Therefore, it is possible to suppress variations in damping force performance depending on products. Therefore, stabilization in damping force performance can be achieved.

In the throttle disc 161A, at least a part of the notch parts 171A is closed and at least a part of the notch parts 171A is open at the first predetermined position. In the throttle disc 161A, at the second predetermined position which is a different rotation position from the first predetermined position, at least a part of the notch parts 171A that has been closed at the first predetermined position is open and at least a part of the notch parts 171A that has been open at the first predetermined position is closed. Therefore, the structure has a likelihood that an amount of communication between the throttle flow path 76A provided in the throttle disc 161A and the rod passage 75A provided in the piston rod 21A will vary depending on a position of the throttle disc 161A in a rotational direction (circumferential direction) with respect to the piston rod 21A. In such a structure, the throttle disc 161A is formed so that the flow path area of the throttle flow path 76A is constant regardless of its attachment position in the circumferential direction with respect to the piston rod 21A by setting a shape thereof on the basis of the setting method described above. Therefore, stabilization in damping force performance can be achieved.

Also, the second passage 141A provided in the piston rod 21A is provided in the groove part 211 formed by notching an outer circumferential portion of the piston rod 21A. Therefore, a shape of the throttle disc 161A can be set so that the flow path area of the throttle flow path 76A is constant regardless of its attachment position in the circumferential direction with respect to the piston rod 21A by the setting method described above. Therefore, stabilization in damping force performance can be achieved.

Third Embodiment

Next, a third embodiment will be described mainly on the basis of FIGS. 10 to 20B, focusing on differences from the second embodiment. Further, parts common to those in the second embodiment will be denoted by the same terms and the same reference signs.

Figure 10:
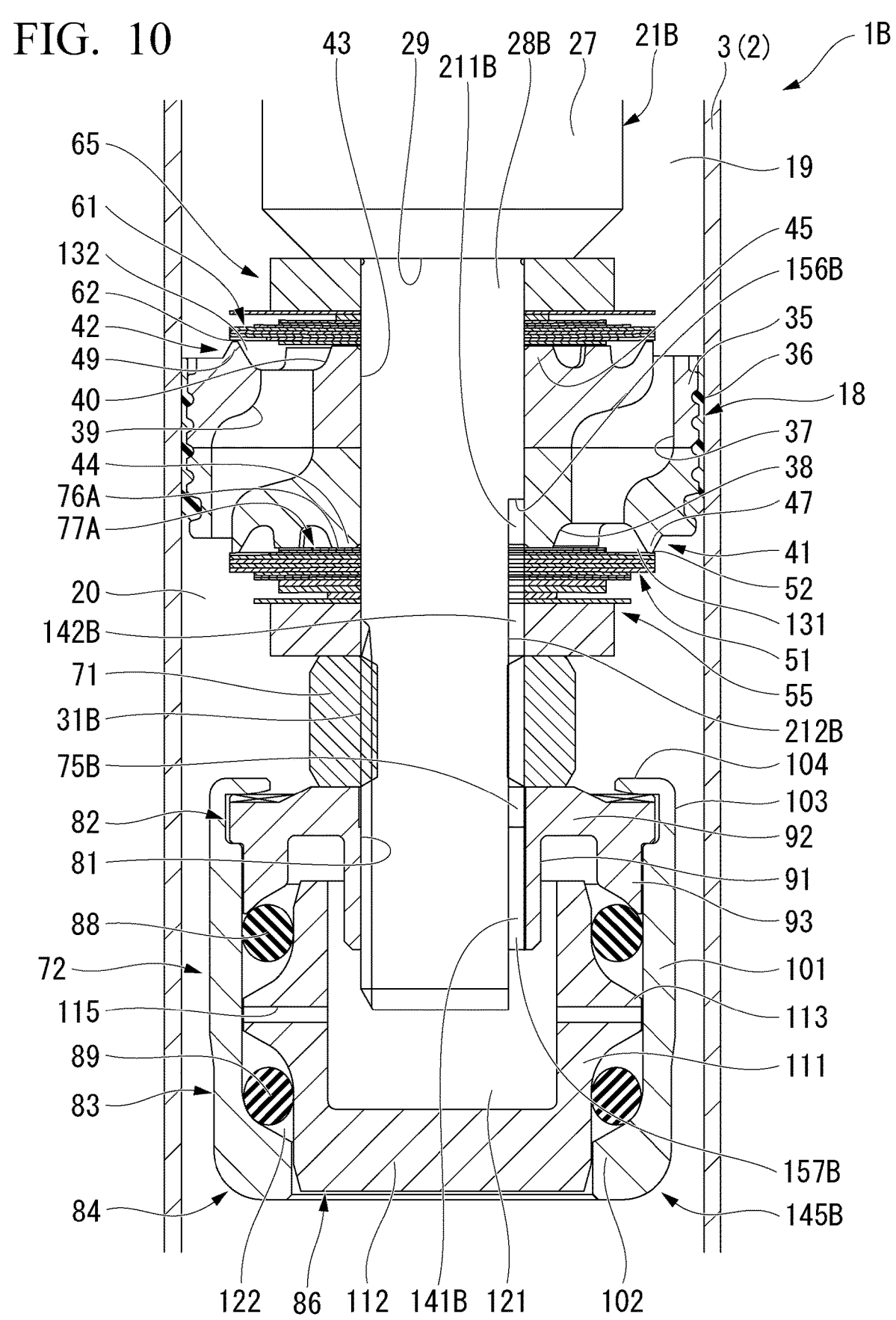
FIG. 10 is a partial cross-sectional view illustrating the vicinity of a piston of a shock absorber according to a third embodiment of the present invention.

As illustrated in FIG. 10, in a shock absorber 1B of the third embodiment, a piston rod 21B is partially different from the piston rod 21A. Specifically, a mounting shaft part 28B is partially different from the mounting shaft part 28A. The mounting shaft part 28B differs from the mounting shaft part 28A in that a rod passage 75B that is partially different from the rod passage 75A is provided.

The axial hole 151 and the radial hole 152A are not formed in the mounting shaft part 28B. The rod passage 75B is formed by a groove part 211B. The groove part 211B has a shape in which an outer circumferential portion of the mounting shaft part 28B is notched to form a planar bottom surface 212B parallel to a central axis of the mounting shaft part 28B. The groove part 211B is formed from a position overlapping a piston 18 in an axial direction of the mounting shaft part 28B to an end portion of the mounting shaft part 28B on a side opposite to a main shaft part 27. Therefore, a male screw 31B has a shape in which a part of the male screw 31 is notched.

The rod passage 75B opens to an outer diameter side of the mounting shaft part 28B of the piston rod 21B in the groove part 211B. In the rod passage 75B provided in the piston rod 21B, a first opening 156B opening to an outer diameter surface on the piston 18 side and a second opening 157B opening to an end portion on a housing 84 side in the axial direction are formed by the groove part 211B.

Figure 11:
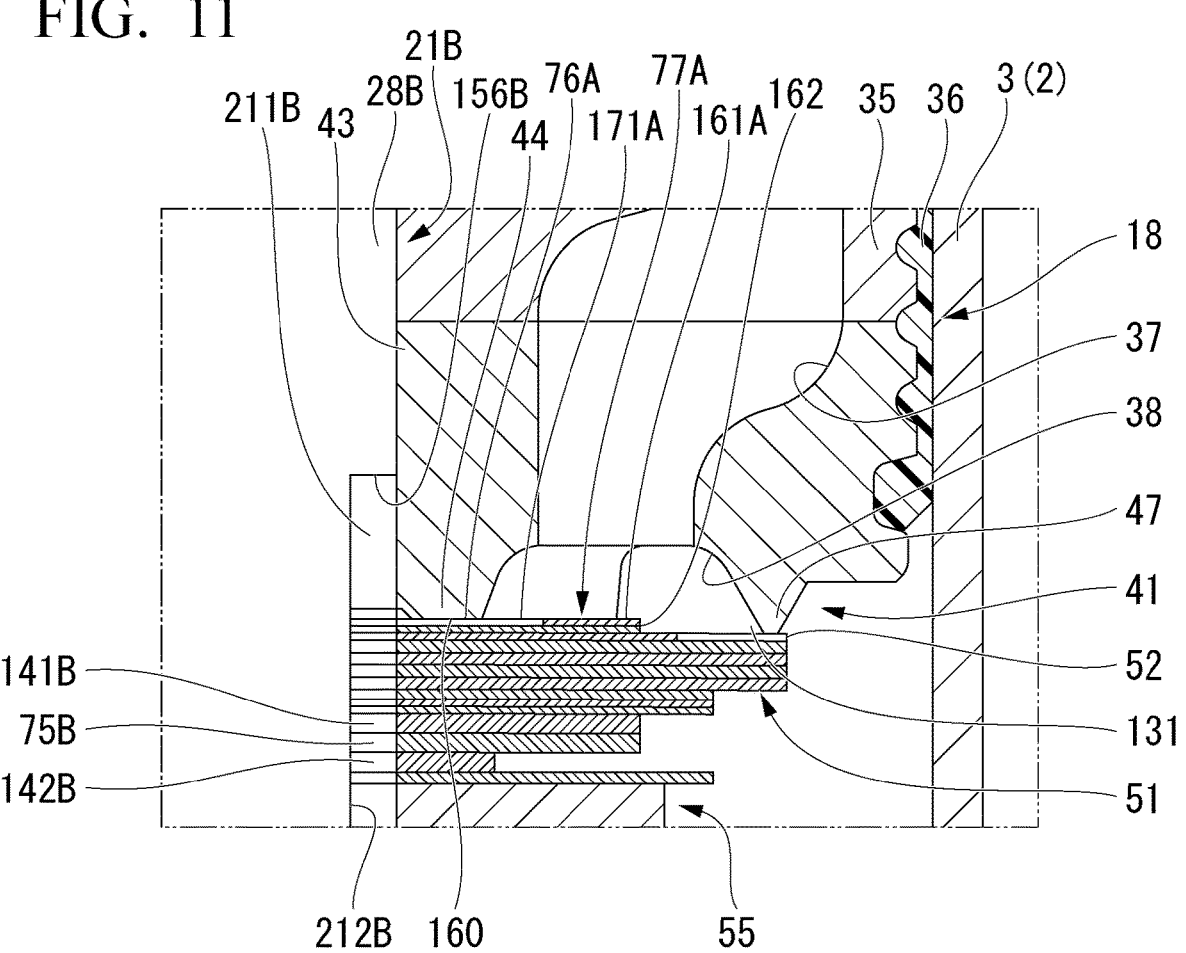
FIG. 11 is a partial cross-sectional view of a main part of the shock absorber according to the third embodiment of the present invention.

As illustrated in FIG. 11, the shock absorber 1B of the third embodiment includes a throttle flow path forming part 77A formed of a throttle disc 161A and a disc 162 similar to those of the second embodiment. Therefore, the shock absorber 1B of the third embodiment has a throttle flow path 76A similar to that of the second embodiment.

The throttle disc 161A overlaps the groove part 211B in position in the axial direction of the mounting shaft part 28B of the piston rod 21B. The throttle flow path 76A overlaps a passage in the groove part 211B of the rod passage 75B in position in the axial direction of the mounting shaft part 28B. The throttle flow path 76A communicates with the rod passage 75B as illustrated also in FIG. 12.

In the shock absorber 1B, as illustrated in FIG. 11, passages in a plurality of passage holes 37 and an annular recessed part 38 of the piston 18, the throttle flow path 76A of the throttle flow path forming part 77A, the rod passage 75B of the piston rod 21B, and a variable chamber 121 and a variable chamber 122 illustrated in FIG. 10 constitute a second passage 141B that is parallel to first passages 131 and 132. In the second passage 141B, the throttle flow path 76A of the throttle flow path forming part 77A, the rod passage 75B of the piston rod 21B, the variable chamber 121, and the variable chamber 122 serve as a parallel passage 142B that is parallel to the first passages 131 and 132 similarly to the parallel passage 142A.

The second passage 141B includes the rod passage 75B of the piston rod 21B. The second passage 141B is provided in the piston rod 21B. The parallel passage 142B and a frequency sensitive part 72 are provided in the second passage 141B. The parallel passage 142B and the frequency sensitive part 72 constitute a second damping force generation mechanism 145B that generates a damping force in cooperation with first damping force generation mechanisms 41 and 42. The second damping force generation mechanism 145B includes the throttle flow path 76A and the frequency sensitive part 72.

The throttle disc 161A, together with an inner seat part 44 and the disc 162, forms the throttle flow path 76A. The throttle disc 161A is provided in the second damping force generation mechanism 145B including the throttle flow path 76A. The throttle disc 161A is a throttle valve that forms the throttle flow path 76A in the parallel passage 142B of the second passage 141B due to the notch parts 171A. The throttle disc 161A is provided on the piston 18 side which is one side of the second passage 141B with respect to the housing 84.

Figure 12:
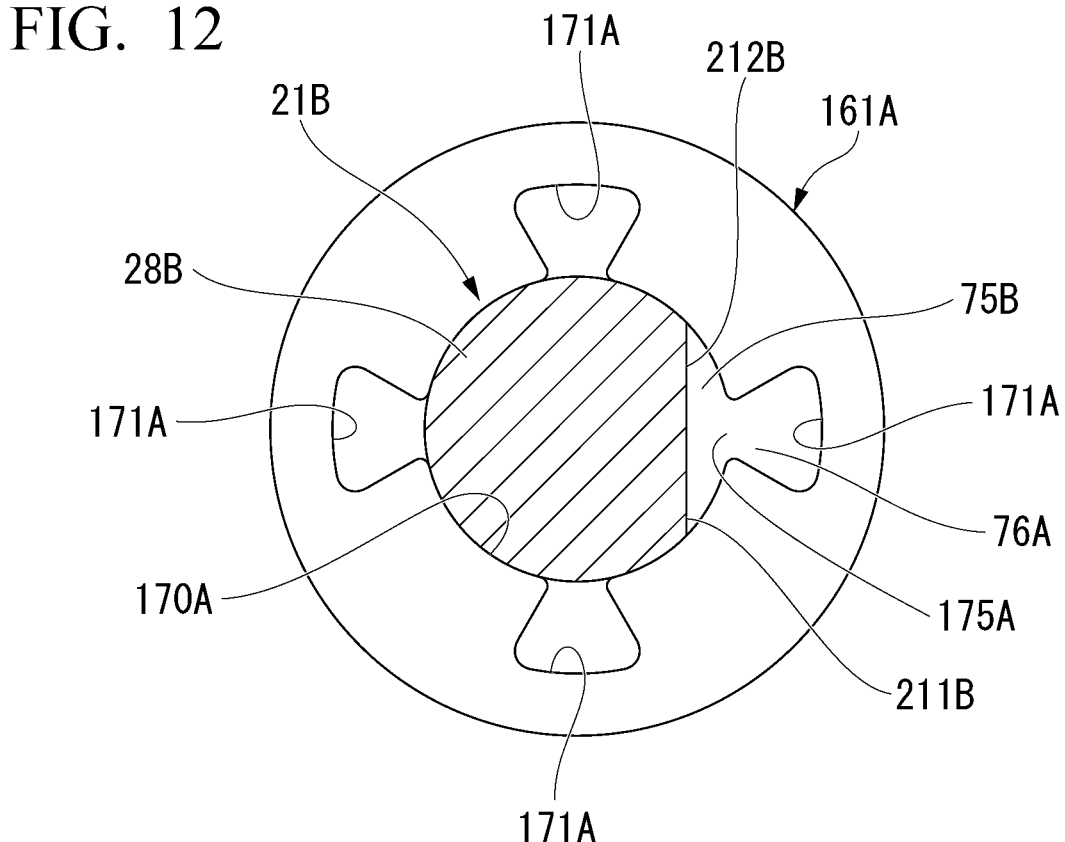
FIG. 12 is a cross-sectional view of a throttle disc and a piston rod of the shock absorber according to the third embodiment of the present invention.

Similarly to the second embodiment, the throttle disc 161A is formed to have a flow path area of the throttle flow path 76A that is constant regardless of its attachment position in a circumferential direction with respect to the mounting shaft part 28B of the piston rod 21B. As illustrated in FIG. 12, in the throttle disc 161A, at least a part of the notch parts 171A is closed and at least a part of the notch parts 171A is open at a first predetermined position. At a second predetermined position which is a different rotation position from the first predetermined position, at least a part of the notch parts 171A that has been closed at the first predetermined position is open and at least a part of the notch parts 171A that has been open at the first predetermined position is closed.

Figure 13A:
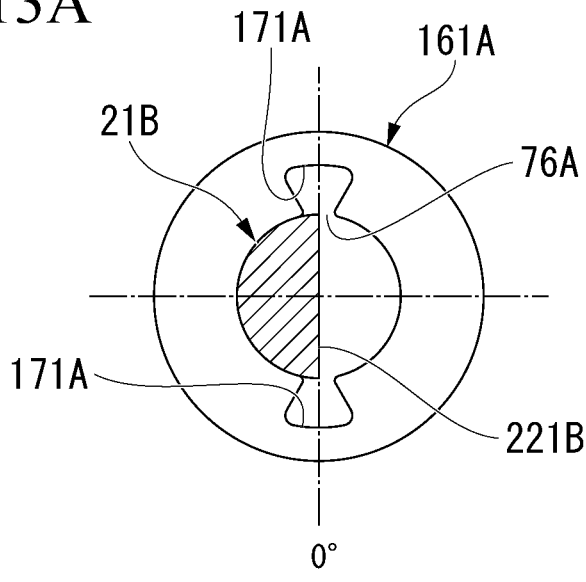
FIG. 13A is a cross-sectional view illustrating still another example of the combination of the throttle disc and the piston rod of the shock absorber according to the third embodiment of the present invention.
Figure 13B:
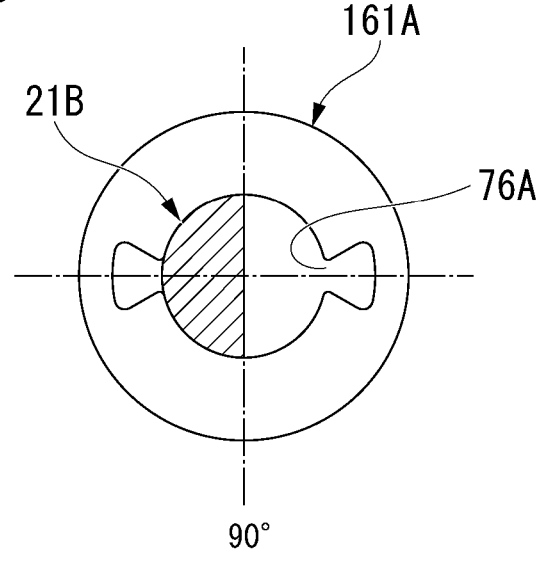
FIG. 13B is a cross-sectional view illustrating yet another example of the combination of the throttle disc and the piston rod of the shock absorber according to the third embodiment of the present invention.

As illustrated in FIGS. 13A and 13B, at a position at which the throttle disc 161A is disposed, a radius r of the piston rod 21B is set as r=5, the number A of grooves of the groove part 221B of the piston rod 21B is set as A=1, the number n of notch parts 171A formed in the throttle disc 161A is set as n=2, and a depth d of the groove part 221B is set as d=5. At this time, a minimum cross-sectional area $a_e$ of the flow path due to all the notch parts 171A of the throttle disc 161A is equal to a minimum cross-sectional area $a_1$ of the flow path due to one notch part 171A of the throttle disc 161A. When an attachment position of the throttle disc 161A in the circumferential direction with respect to the piston rod 21B is the first predetermined position illustrated in FIG. 13A, this is referred to as, for example, 0°. A position rotated by 90° with respect to the first predetermined position is referred to as the second predetermined position illustrated in FIG. 13B. Then, the throttle disc 161A has a flow path area of the throttle flow path 76A that is constant regardless of its attachment position in the circumferential direction with respect to the piston rod 21B. In this case, in the throttle flow path 76A formed of the notch parts 171A, the closed flow path area is the same as the open flow path area.

Figure 14A:
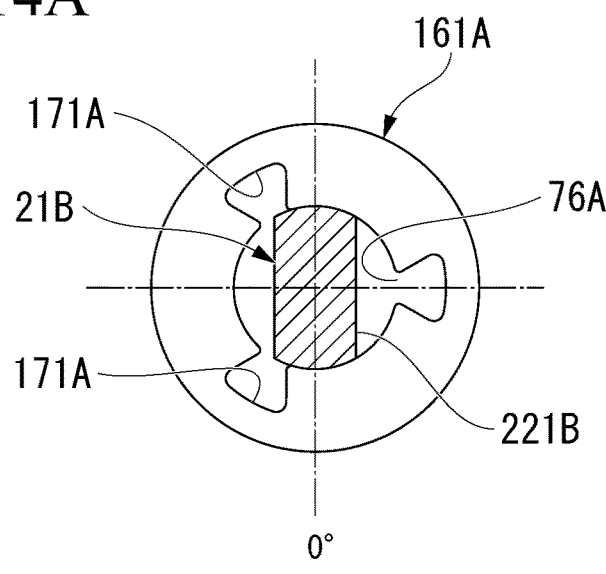
FIG. 14A is a cross-sectional view illustrating yet another example of the combination of the throttle disc and the piston rod of the shock absorber according to the third embodiment of the present invention.
Figure 14B:
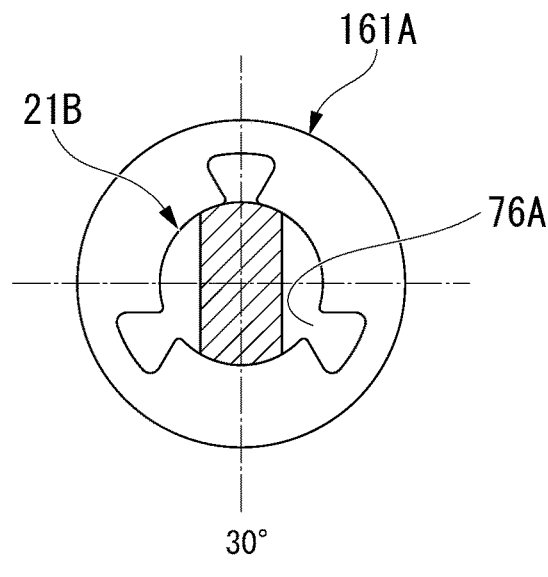
FIG. 14B is a cross-sectional view illustrating yet another example of the combination of the throttle disc and the piston rod of the shock absorber according to the third embodiment of the present invention.

As illustrated in FIGS. 14A and 14B, setting is made such that r=5, A=2, n=3, and d=2.5. At this time, $a_e=2a_1$. When the attachment position of the throttle disc 161A in the circumferential direction with respect to the piston rod 21B is the first predetermined position illustrated in FIG. 14A, this is referred to as, for example, 0°. A position rotated by 30° with respect to the first predetermined position is referred to as the second predetermined position illustrated in FIG. 14B. Then, the throttle disc 161A has a flow path area of the throttle flow path 76A that is constant regardless of its attachment position in the circumferential direction with respect to the piston rod 21B. In this case, in the throttle flow path 76A formed of the notch parts 171A, a ratio between the closed flow path area and the open flow path area is 1:2.

Figure 15A:
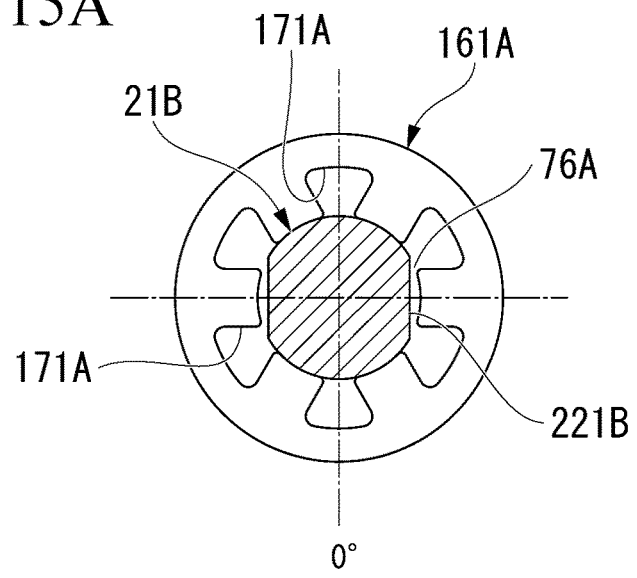
FIG. 15A is a cross-sectional view illustrating yet another example of the combination of the throttle disc and the piston rod of the shock absorber according to the third embodiment of the present invention.
Figure 15B:
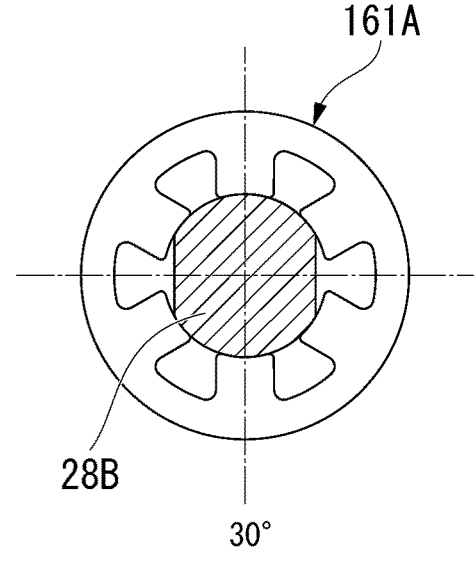
FIG. 15B is a cross-sectional view illustrating yet another example of the combination of the throttle disc and the piston rod of the shock absorber according to the third embodiment of the present invention.

As illustrated in FIGS. 15A and 15B, setting is made such that r=5, A=2, n=6, and d=0.67. At this time, $a_e=2a_1$. When the attachment position of the throttle disc 161A in the circumferential direction with respect to the piston rod 21B is the first predetermined position illustrated in FIG. 15A, this is referred to as, for example, 0°. A position rotated by 30° with respect to the first predetermined position is referred to as the second predetermined position illustrated in FIG. 15B. Then, the throttle disc 161A has a flow path area of the throttle flow path 76A that is constant regardless of its attachment position in the circumferential direction with respect to the mounting shaft part 28B of the piston rod 21B. In this case, in the throttle flow path 76A formed of the notch parts 171A, a ratio between the closed flow path area and the open flow path area is 2:1.

Figure 16A:
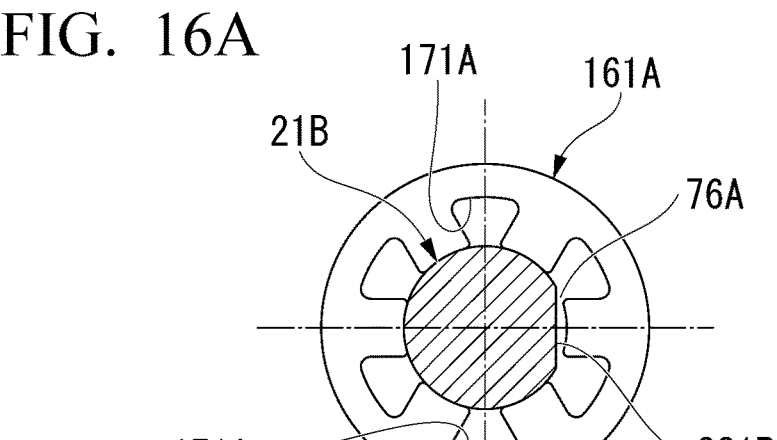
FIG. 16A is a cross-sectional view illustrating yet another example of the combination of the throttle disc and the piston rod of the shock absorber according to the third embodiment of the present invention.
Figure 16B:
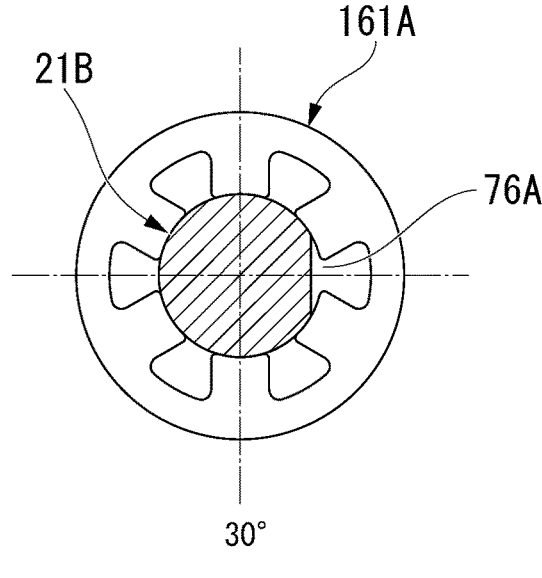
FIG. 16B is a cross-sectional view illustrating yet another example of the combination of the throttle disc and the piston rod of the shock absorber according to the third embodiment of the present invention.

As illustrated in FIGS. 16A and 16B, setting is made such that r=5, A=1, n=6, and d=0.67. At this time, $a_e=a_1$. When the attachment position of the throttle disc 161A in the circumferential direction with respect to the piston rod 21B is the first predetermined position illustrated in FIG. 16A, this is referred to as, for example, 0°. A position rotated by 30° with respect to the first predetermined position is referred to as the second predetermined position illustrated in FIG. 16B. Then, the throttle disc 161A has a flow path area of the throttle flow path 76A that is constant regardless of its attachment position in the circumferential direction with respect to the mounting shaft part 28B of the piston rod 21B. In this case, in the throttle flow path 76A formed of the notch parts 171A, a ratio between the closed flow path area and the open flow path area is 5:1.

Figure 17A:
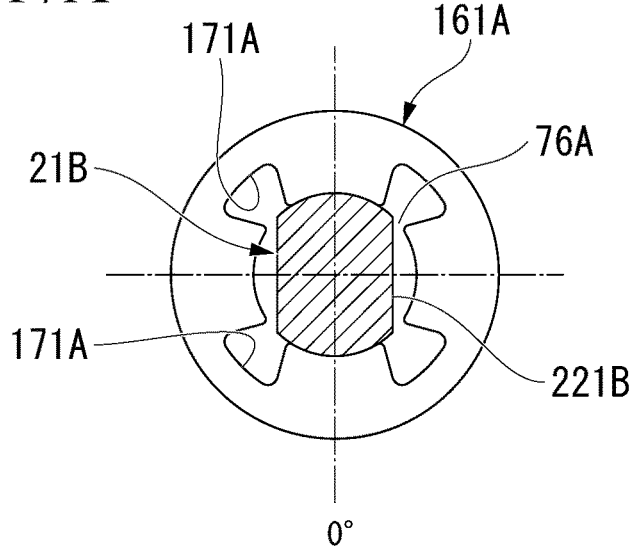
FIG. 17A is a cross-sectional view illustrating yet another example of the combination of the throttle disc and the piston rod of the shock absorber according to the third embodiment of the present invention.
Figure 17B:
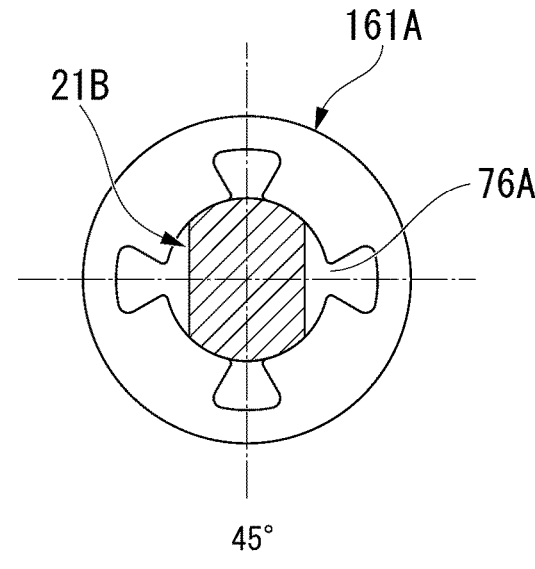
FIG. 17B is a cross-sectional view illustrating yet another example of the combination of the throttle disc and the piston rod of the shock absorber according to the third embodiment of the present invention.

As illustrated in FIGS. 17A and 17B, setting is made such that r=5, A=2, n=4, and d=1.46. At this time, $a_e=2a_1$. When the attachment position of the throttle disc 161A in the circumferential direction with respect to the piston rod 21B is the first predetermined position illustrated in FIG. 17A, this is referred to as, for example, 0°. A position rotated by 45° with respect to the first predetermined position is referred to as the second predetermined position illustrated in FIG. 17B. Then, the throttle disc 161A has a flow path area of the throttle flow path 76A that is constant regardless of its attachment position in the circumferential direction with respect to the mounting shaft part 28B of the piston rod 21B. In this case, in the throttle flow path 76A formed of the notch parts 171A, the closed flow path area is the same as the open flow path area.

Figure 18A:
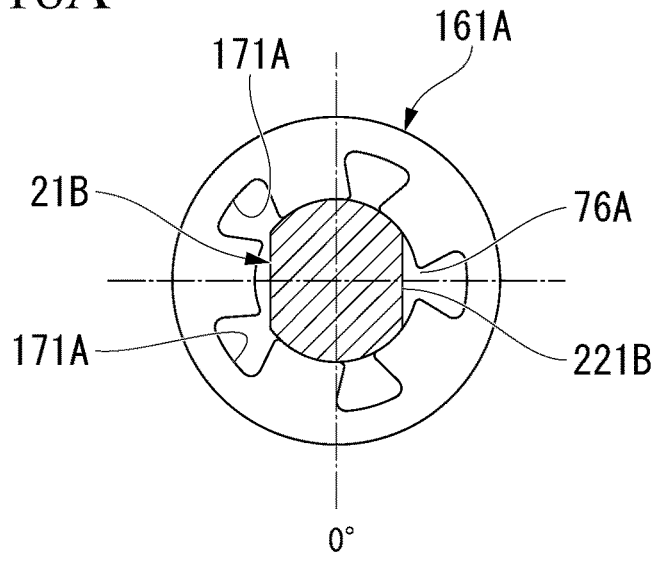
FIG. 18A is a cross-sectional view illustrating yet another example of the combination of the throttle disc and the piston rod of the shock absorber according to the third embodiment of the present invention.
Figure 18B:
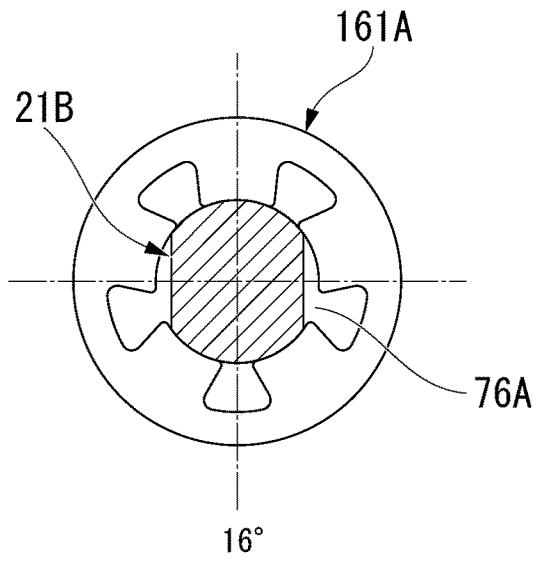
FIG. 18B is a cross-sectional view illustrating yet another example of the combination of the throttle disc and the piston rod of the shock absorber according to the third embodiment of the present invention.

As illustrated in FIGS. 18A and 18B, setting is made such that r=5, A=2, n=5, and d=0.95. At this time, $a_e=2a_1$. When the attachment position of the throttle disc 161A in the circumferential direction with respect to the piston rod 21B is the first predetermined position illustrated in FIG. 18A, this is referred to as, for example, 0°. A position rotated by 16° with respect to the first predetermined position is referred to as the second predetermined position illustrated in FIG. 18B. Then, the throttle disc 161A has a flow path area of the throttle flow path 76A that is constant regardless of its attachment position in the circumferential direction with respect to the mounting shaft part 28B of the piston rod 21B. In this case, in the throttle flow path 76A formed of the notch parts 171A, a ratio between the closed flow path area and the open flow path area is 3:2.

Figure 19A:
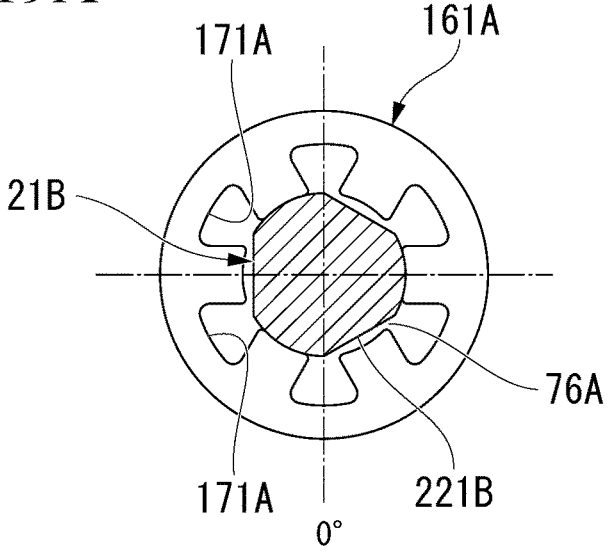
FIG. 19A is a cross-sectional view illustrating yet another example of the combination of the throttle disc and the piston rod of the shock absorber according to the third embodiment of the present invention.
Figure 19B:
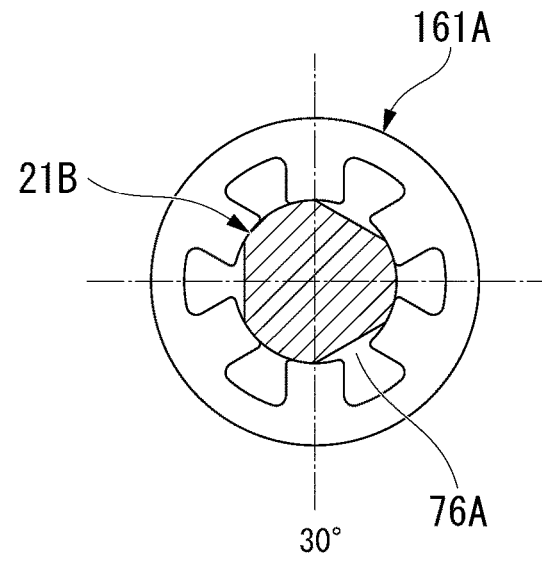
FIG. 19B is a cross-sectional view illustrating yet another example of the combination of the throttle disc and the piston rod of the shock absorber according to the third embodiment of the present invention.

As illustrated in FIGS. 19A and 19B, setting is made such that r=5, A=3, n=6, and d=0.67. At this time, $a_e=3a_1$. When the attachment position of the throttle disc 161A in the circumferential direction with respect to the piston rod 21B is the first predetermined position illustrated in FIG. 19A, this is referred to as, for example, 0°. A position rotated by 30° with respect to the first predetermined position is referred to as the second predetermined position illustrated in FIG. 19B. Then, the throttle disc 161A has a flow path area of the throttle flow path 76A that is constant regardless of its attachment position in the circumferential direction with respect to the mounting shaft part 28B of the piston rod 21B. In this case, in the throttle flow path 76A formed of the notch parts 171A, the closed flow path area is the same as the open flow path area.

Figure 20A:
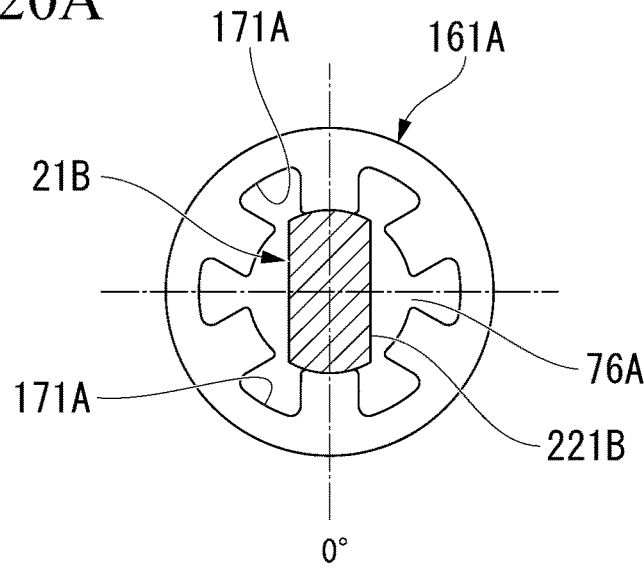
FIG. 20A is a cross-sectional view illustrating yet another example of the combination of the throttle disc and the piston rod of the shock absorber according to the third embodiment of the present invention.
Figure 20B:
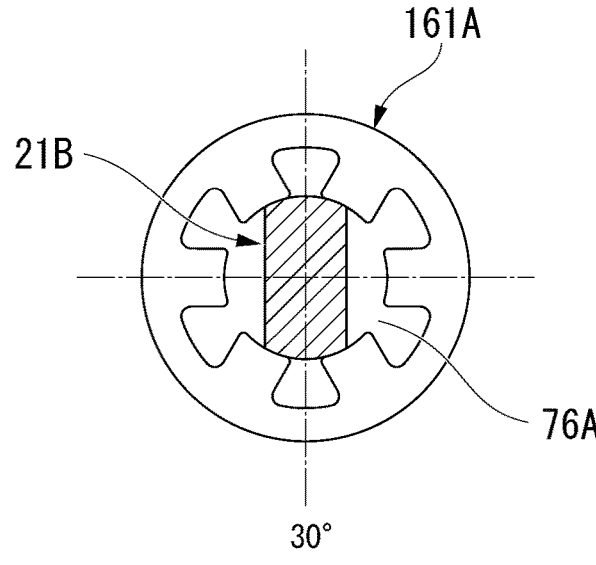
FIG. 20B is a cross-sectional view illustrating yet another example of the combination of the throttle disc and the piston rod of the shock absorber according to the third embodiment of the present invention.

As illustrated in FIGS. 20A and 20B, setting is made such that r=5, A=2, n=6, and d=2.5. At this time, $a_e=4a_1$. When the attachment position of the throttle disc 161A in the circumferential direction with respect to the piston rod 21B is the first predetermined position illustrated in FIG. 20A, this is referred to as, for example, 0°. A position rotated by 30° with respect to the first predetermined position is referred to as the second predetermined position illustrated in FIG. 20B. Then, the throttle disc 161A has a flow path area of the throttle flow path 76A that is constant regardless of its attachment position in the circumferential direction with respect to the mounting shaft part 28B of the piston rod 21B. In this case, in the throttle flow path 76A formed of the notch parts 171A, a ratio between the closed flow path area and the open flow path area is 1:2.

In the examples illustrated also in FIGS. 13A to 20B, in the throttle disc 161A, at least a part of the notch parts 171A is closed and at least a part of the notch parts 171A is open at the first predetermined position. At the second predetermined position which is a different rotation position from the first predetermined position, at least a part of the notch parts 171A that has been closed at the first predetermined position is open and at least a part of the notch parts 171A that has been open at the first predetermined position is closed.

Fourth Embodiment

Next, a fourth embodiment will be described mainly on the basis of FIGS. 21 to 22, focusing on differences from the third embodiment. Further, parts common to those in the third embodiment will be denoted by the same terms and the same reference signs.

Figure 21:
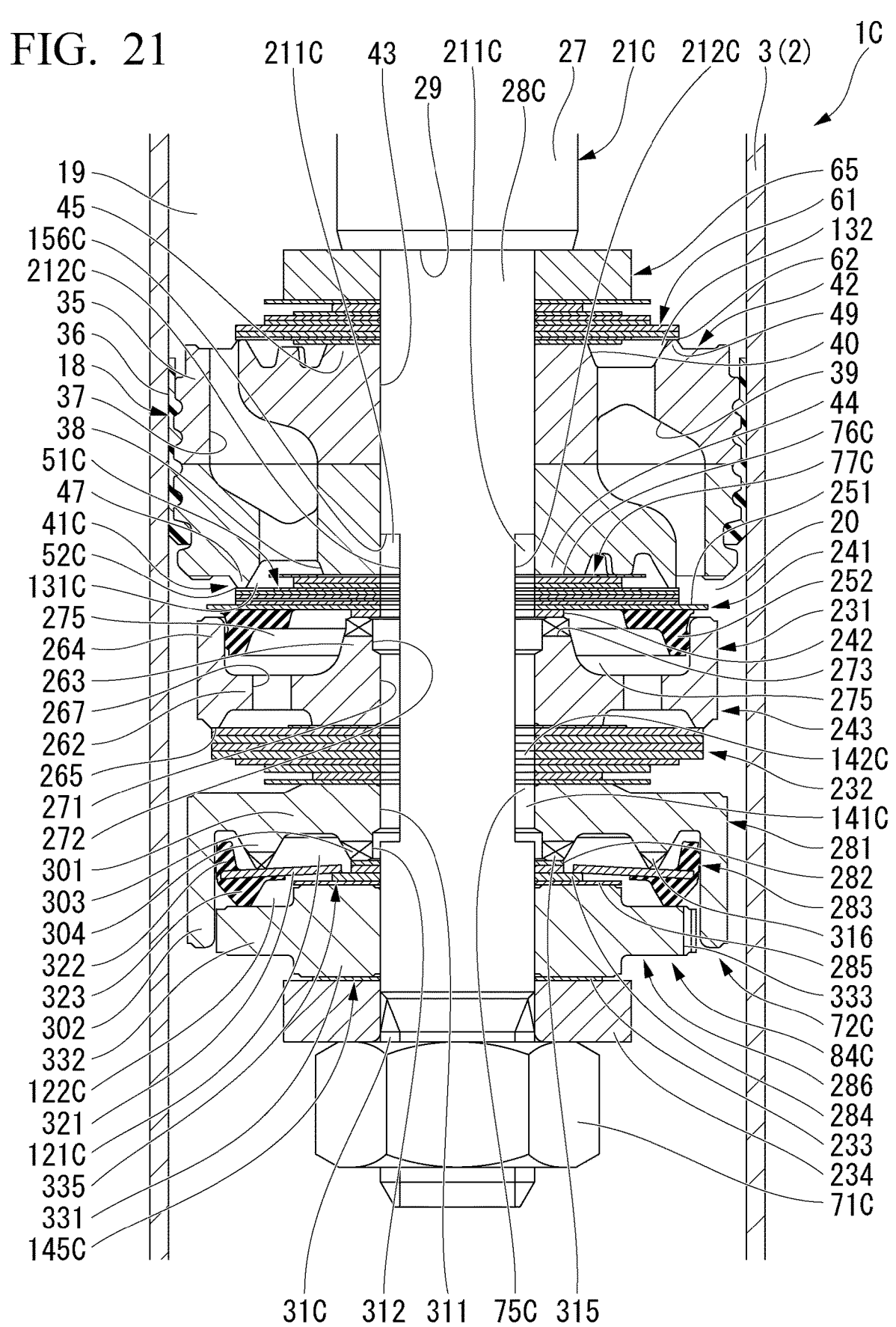
FIG. 21 is a partial cross-sectional view illustrating the vicinity of a piston of a shock absorber according to a fourth embodiment of the present invention.

As illustrated in FIG. 21, in a shock absorber 1C of the fourth embodiment, a piston rod 21C is partially different from the piston rod 21B. Specifically, a mounting shaft part 28C is partially different from the mounting shaft part 28B. The mounting shaft part 28C differs from the mounting shaft part 28B in that a rod passage 75C that is partially different from the rod passage 75B is provided.

The rod passage 75C is formed of a plurality of, specifically two, groove parts 211C having the same shape. The groove parts 211C each have a shape in which an outer circumferential portion of the mounting shaft part 28C is notched to form a planar bottom surface 212C parallel to a central axis of the mounting shaft part 28C. The bottom surfaces 212C of the two groove parts 211C are disposed parallel to each other. The groove parts 211C are each formed from a position overlapping a piston 18 in an axial direction of the mounting shaft part 28C to a predetermined intermediate position on a side opposite to a main shaft part 27 with respect to the position described above. The two groove parts 211C are formed in a range on a shaft step part 29 side from a male screw 31C provided on an outer circumferential portion of an end portion of the mounting shaft part 28C on a side opposite to the main shaft part 27 to be aligned with the position in the axial direction of the mounting shaft part 28C.

The rod passage 75C opens to an outer diameter side of the mounting shaft part 28C of the piston rod 21C at the groove part 211C. In the rod passage 75C provided in the piston rod 21C, an opening 156C opening to an outer diameter surface on the piston 18 side is formed by the groove part 211C.

In the shock absorber 1C of the fourth embodiment, a deformation suppression part 65 similar to that of the third embodiment, a disc valve 61, and the piston 18 are provided on the mounting shaft part 28C in order from the shaft step part 29 side. A throttle flow path forming part 77C, a disc valve 51C, a back pressure applying part 231, a hard valve 232, a frequency sensitive part 72C, a disc 233, a washer 234, and a nut 71C are provided on the mounting shaft part 28C on a side opposite to the disc valve 61 in the axial direction of the piston 18 in order from the piston 18 side.

The throttle flow path forming part 77C includes a throttle flow path 76C. The throttle flow path 76C allows passages in a plurality of passage holes 37 and an annular recessed part 38 of the piston 18 to communicate with the rod passage 75C of the piston rod 21C.

The disc valve 51C, together with a valve seat part 47, constitutes an extension-side first damping force generation mechanism 41C. The disc valve 51C is constituted by stacking a plurality of discs. The mounting shaft part 28C is fitted to an inner side of the disc valve 51C. The disc valve 51C closes the passages in the plurality of passage holes 37 and the annular recessed part 38 by coming into contact with the valve seat part 47, and opens the passages in the plurality of passage holes 37 and the annular recessed part 38 by separating from the valve seat part 47. A fixed orifice 52C is formed in the disc valve 51C. The fixed orifice 52C allows the passages in the plurality of passage holes 37 and the annular recessed part 38 to communicate with a second chamber 20 even when it is in contact with the valve seat part 47.

The back pressure applying part 231 comes into contact with the disc valve 51C from a side opposite to the piston 18 in the axial direction to apply a back pressure to the disc valve 51C. The back pressure applying part 231 includes a pilot disc 241, a disc 242, and a case member 243 (fixing member).

The pilot disc 241 is formed of a bored disc-shaped disc 251 made of a metal and an annular seal member 252 made of rubber fixed to an outer circumferential side of the disc 251 on one side in a thickness direction. The mounting shaft part 28C of the piston rod 21C is fitted to an inner circumferential side of the disc 251. The seal member 252 is fixed to an outer circumferential side of the disc 251 on a side opposite to the piston 18 in the axial direction. The back pressure applying part 231 is in contact with the disc valve 51C at the disc 251 of the pilot disc 241.

The mounting shaft part 28C of the piston rod 21C is fitted to an inner circumferential side of the disc 242. An outer diameter of the disc 242 has a diameter smaller than a minimum inner diameter of seal member 252 of the pilot disc 241. The disc 242 is in contact with the disc 251 of the pilot disc 241.

The case member 243 has a bottomed cylindrical shape. The case member 243 includes a bottom part 262 having a bored disc shape, an inner cylindrical part 263 having a cylindrical shape, an outer cylindrical part 264 having a cylindrical shape, and an annular valve seat 265. The inner cylindrical part 263 protrudes to both sides in the axial direction of the bottom part 262 from an inner circumferential edge portion of the bottom part 262. The outer cylindrical part 264 protrudes to one side in the axial direction of the bottom part 262 from an outer circumferential edge portion of the bottom part 262. The valve seat 265 protrudes from an outer circumferential side of the bottom part 262 to a side opposite to the outer cylindrical part 264 in the axial direction of the bottom part 262.

A plurality of through holes 267 penetrating in the axial direction of the bottom part 262 are formed in the bottom part 262 between the outer cylindrical part 264 and the valve seat 265, and the inner cylindrical part 263 in a radial direction of the bottom part 262.

On an inner circumferential side of the inner cylindrical part 263, a small diameter hole portion 271 is provided on the valve seat 265 side in the axial direction, and a large diameter hole portion 272 is provided on a side opposite to the valve seat 265 in the axial direction. The mounting shaft part 28 of the piston rod 21 is fitted into the small diameter hole portion 271. The large diameter hole portion 272 has a diameter larger than that of the small diameter hole portion 271.

A passage in the large diameter hole portion 272 of the case member 243 and the rod passage 75C of the mounting shaft part 28C are in constant communication. A passage groove 273 that penetrates the inner cylindrical part 263 in the radial direction at a position of the large diameter hole portion 272 is formed on the large diameter hole portion 272 side in the axial direction of the inner cylindrical part 263.

The seal member 252 of the pilot disc 241 is fitted to an inner circumferential surface of the outer cylindrical part 264 of the case member 243 in a slidable and liquid-tight manner over the entire circumference. The seal member 252 constantly seals a gap between the pilot disc 241 and the outer cylindrical part 264. The back pressure applying part 231 forms a back pressure chamber 275 by surrounding it together with the pilot disc 241 and the case member 243. The back pressure chamber 275 communicates with a first chamber 19 via the passages in the plurality of passage holes 37 and the annular recessed part 38 of the piston 18, the throttle flow path 76C of the throttle flow path forming part 77C, the rod passage 75C, and a passage in the large diameter hole portion 272 and the passage groove 273 of the case member 243. The back pressure chamber 275 applies a back pressure in a direction closing the disc valve 51C via the pilot disc 241.

The hard valve 232 is constituted by a plurality of discs to which the mounting shaft part 28C of the piston rod 21C is fitted at an inner circumferential side. The hard valve 232 is in contact with the valve seat 265 of the case member 243 over the entire circumference. The hard valve 232 closes the back pressure chamber 275 by coming into contact with the valve seat 265 over the entire circumference. When a pressure in the back pressure chamber 275 is higher than a predetermined value, the hard valve 232 is separated from the valve seat 265 to open the back pressure chamber 275 and allow the back pressure chamber 275 to communicate with the second chamber 20. At that time, the hard valve 232 generates a damping force.

The frequency sensitive part 72C includes one housing main body 281, a plurality of (specifically, two) discs 282 and one partition disc 283, one disc 284, one disc 285, and one stopper member 286 in order from the hard valve 232 side in the axial direction. The discs 282, 284, and 285 all have a bored disc shape with a certain thickness into which the mounting shaft part 28C of the piston rod 21C can be fitted. The housing main body 281 and the stopper member 286 have an annular shape into which the mounting shaft part 28C of the piston rod 21C can be fitted.

The housing main body 281 includes a bored disc-shaped bottom part 301, an outer cylindrical part 302 having a cylindrical shape, an inner cylindrical part 303 having a cylindrical shape, and an annular support part 304. The outer cylindrical part 302 protrudes to one side in the axial direction of the bottom part 301 from an outer circumferential side of the bottom part 301. The inner cylindrical part 303 protrudes from an inner circumferential side of the bottom part 301 to the same side as the outer cylindrical part 302. The support part 304 protrudes from an intermediate position in a radial direction of the bottom part 301 to the same side as the outer cylindrical part 302 and the inner cylindrical part 303. In the housing main body 281, a radial inner side of the bottom part 301 is a small diameter hole portion 311 into which the mounting shaft part 28C of the piston rod 21C is fitted, and a radial inner side of the inner cylindrical part 303 is a large diameter hole portion 312 having a diameter larger than that of the small diameter hole portion 311. The groove part 211C of the piston rod 21C is formed from the piston 18 to a position of the large diameter hole portion 312 in the axial direction of the mounting shaft part 28C.

A passage groove 315 is formed in the inner cylindrical part 303. The passage groove 315 penetrates the inner cylindrical part 303 in the radial direction at a position of the large diameter hole portion 312. A passage groove 316 is formed on a distal end side of the support part 304 to penetrate the support part 304 in the radial direction. A passage in the large diameter hole portion 312 of the housing main body 281 communicates with the rod passage 75C of the mounting shaft part 28C. The plurality of discs 282, the partition disc 283, the disc 284, and the disc 285 are provided in the housing main body 281 with the mounting shaft part 28 penetrating therethrough.

The plurality of discs 282 have an outer diameter substantially the same as an outer diameter of a distal end surface of the inner cylindrical part 303 of the housing main body 281. The disc 284 has an outer diameter larger than the outer diameter of the discs 282. The disc 285 has an outer diameter larger than the outer diameter of the disc 284.

The partition disc 283 includes a bored disc-shaped disc 321 made of a metal, an annular seal part 322 made of rubber fixed to one side in a thickness direction on an outer circumferential side of the disc 321, and an annular contact part 323 made of rubber fixed to the other side in the thickness direction on the outer circumferential side of the disc 321.

The disc 321 has an inner diameter larger than the outer diameter of discs 282. The discs 282 can be disposed on an inner side of the disc 321 with a gap in the radial direction. The disc 321 has an inner diameter smaller than the outer diameter of the disc 284. The disc 321 can come into contact with the disc 284. The disc 321 can come into contact with the support part 304 of the housing main body 281.

The seal part 322 has a cylindrical shape. The seal part 322 is fixed to the disc 321 over the entire circumference.

The seal part 322 is fitted to an inner circumferential surface of the outer cylindrical part 302 of the housing main body 281 in a slidable and liquid-tight manner over the entire circumference. The seal part 322 constantly seals between the outer cylindrical part 302 and the partition disc 283.

The contact part 323 is intermittently formed in the circumferential direction of the disc 321. The contact part 323 comes into contact with the stopper member 286 and elastically deforms when the partition disc 283 deforms to the stopper member 286 side. When the contact part 323 deforms close to the stopper member 286 to a maximum extent, deformation of the partition disc 283 more than that is suppressed.

The partition disc 283 is centered with respect to the housing main body 281 when the seal part 322 comes into contact with the outer cylindrical part 302 of the housing main body 281 over the entire circumference. As a result, the partition disc 283 is also centered with respect to the mounting shaft part 28C. The disc 321 of the partition disc 283 is in contact with the support part 304 of the housing main body 281 to be supported from one side in the axial direction, and an inner circumferential side of the disc 321 is supported by the disc 284 from the other side in the axial direction.

In a state in which there is no pressure difference between a front side and a back side of the partition disc 283, the disc 321 is supported by being in contact with the support part 304 at one side in a thickness direction and the disc 284 at the other side in the thickness direction. The disc 284 is a seat part on which the partition disc 283 is seated. The partition disc 283 has a simple support structure in which an inner circumferential side thereof is supported by the disc 284 only on one side without being clamped from both sides.

The stopper member 286 includes a cylindrical part 331 having a cylindrical shape and a flange part 332 having a disc shape. The flange part 332 extends outward in the radial direction from a central position in the axial direction of an outer circumferential portion of the cylindrical part 331. In the stopper member 286, the mounting shaft part 28C of the piston rod 21C is fitted to an inner side of the cylindrical part 331. The housing main body 281 and the stopper member 286 constitute a housing 84C (fixing member). A passage groove 333 that allows the inside of the housing 84C to constantly communicate with the second chamber 20 is formed in an outer circumferential portion of the flange part 332.

The seal part 322 of the partition disc 283 constantly seals a gap between the partition disc 283 and the outer circumferential cylindrical part 302 even if the partition disc 283 is displaced and deformed within an allowable range between the housing main body 281 and the stopper member 286. The partition disc 283 is centered by being fitted into the housing main body 281, and in this state, the disc 321 seals a gap between itself and the disc 284 by an inner circumferential portion thereof brought into contact with the disc 284 over the entire circumference.

The partition disc 283 forms a variable chamber 121C that is variable in volume on the bottom part 301 side in the housing 84C. The partition disc 283 forms a variable chamber 122C that is variable in volume on the stopper member 286 side of the housing 84C. The variable chamber 122C communicates with the second chamber 20 through a passage in the passage groove 333. The partition disc 283 and the disc 284 as a seat part thereof constitute a check valve 335 that allows a flow of an oil fluid from the variable chamber 122C to the variable chamber 121C while restricting a flow of the oil fluid from the variable chamber 121C to the variable chamber 122C.

When the disc valve 51C is separated from the valve seat part 47 of the piston 18 and open, it allows the oil fluid from the passages in the plurality of passage holes 37 and the annular recessed part 38 to flow into the second chamber 20. The passages in the plurality of passage holes 37 and the annular recessed part 38 of the piston 18, and a passage between the disc valve 51C and the valve seat part 47 constitute a first passage 131C. This first passage 131C is provided in the piston 18. The first passage 131C serves as an extension-side passage through which the oil fluid as a working fluid moves from the first chamber 19 on an upstream side toward the second chamber 20 on a downstream side in the cylinder 2 when the piston 18 moves to the first chamber 19 side, that is, during an extension stroke. The extension-side first damping force generation mechanism 41C including the valve seat part 47 and the disc valve 51C is provided in the first passage 131C. A damping force is generated when the disc valve 51C opens and closes the first passage 131C to suppress a flow of the oil fluid. The extension-side first damping force generation mechanism 41C includes the fixed orifice 52C.

In the shock absorber 1C, passages in the plurality of passage holes 37 and the annular recessed part 38 of the piston 18, the throttle flow path 76C of the throttle flow path forming part 77C, the rod passage 75C of the piston rod 21C, the passage in the large diameter hole portion 272 and the passage groove 273 of the case member 243, the back pressure chamber 275, a gap between the hard valve 232 and the valve seat 265 of the case member 243 generated at the time of opening, a passage in the large diameter hole portion 312 and the passage groove 315 of the housing main body 281, the variable chamber 121C, the variable chamber 122C, and the passage in the passage groove 333 of the stopper member 286 constitute a second passage 141C that is parallel to the first passages 131C and 132. In the second passage 141C, the throttle flow path 76C of the throttle flow path forming part 77C, the rod passage 75C of the piston rod 21C, the passage in the large diameter hole portion 272 and the passage groove 273 of the case member 243, the back pressure chamber 275, the gap between the hard valve 232 and the valve seat 265 of the case member 243, the passage in the large diameter hole portion 312 and the passage groove 315 of the housing main body 281, the variable chamber 121C, the variable chamber 122C, and the passage in the passage groove 333 of the stopper member 286 serve as a parallel passage 142C that is parallel to the first passages 131C and 132.

The second passage 141C includes the rod passage 75C of the piston rod 21C. The second passage 141C is provided in the piston rod 21C. The parallel passage 142C, the back pressure applying part 231, the hard valve 232, and the frequency sensitive part 72C are provided in the second passage 141C. The hard valve 232 and the frequency sensitive part 72C constitute a second damping force generation mechanism 145C that generates a damping force in cooperation with the first damping force generation mechanisms 41C and 42. The second damping force generation mechanism 145C includes the throttle flow path 76C, the hard valve 232, the back pressure applying part 231, and the frequency sensitive part 72C. The housing 84C is fixed to the piston rod 21C to form the variable chambers 121C and 122C that are a part of the second passage 141C. The case member 243 is fixed to the piston rod 21C to form the back pressure chamber 275 that is a part of the second passage 141C.

The mounting shaft part 28C of the piston rod 21C is fitted to an inner side of the disc 233 and the washer 234. The nut 71C is screwed onto the male screw 31C of the mounting shaft part 28C, and sandwiches the deformation suppression part 65, the disc valve 61, the piston 18, the throttle flow path forming part 77C, the disc valve 51C, the back pressure applying part 231, the hard valve 232, the frequency sensitive part 72C, the disc 233, and the washer 234 between itself and the shaft step part 29.

The frequency sensitive part 72C acts as follows.

That is, in the extension stroke in which a piston frequency is low, at the beginning of the stroke, a volume of the oil fluid entering the variable chamber 121C from the first chamber 19 through the second passage 141C is large, and an amount of deformation of the partition disc 283 is large. Therefore, the partition disc 283 elastically deforms the contact part 323 and stops. Then, it becomes a state in which the oil fluid is not introduced into the variable chamber 121C thereafter. Thereby, the oil fluid from the first chamber 19 flows from the first passage 131C into the second chamber 20 through the fixed orifice 52C in a low-speed region of the piston, flows from the second passage 141C into the second chamber 20 by opening the hard valve 232 in a medium-speed region of the piston, and flows from the second passage 141C into the second chamber 20 by opening the disc valve 51C in addition to the flow due to the opening of the hard valve 232 in a high-speed region of the piston.

In the extension stroke in which the piston frequency is high, a volume of the oil fluid entering the variable chamber 121C from the first chamber 19 is small, and an amount of deformation of the partition disc 283 is small. Therefore, the oil fluid flowing out from the first chamber 19 can be absorbed by the variable chamber 121C. Thereby, an amount of the oil fluid flowing from the first chamber 19 to the second chamber 20 through the fixed orifice 52C, an amount of the oil fluid flowing from the first chamber 19 to the second chamber 20 by opening the hard valve 232, and an amount of the oil fluid flowing from the first chamber 19 to the second chamber 20 by opening the hard valve 232 and the disc valve 51C as described above reduce. Therefore, the fixed orifice 52C, the hard valve 232, and the disc valve 51C generate a softer damping force than that when the piston frequency is low.

Also in the compression stroke, the frequency sensitive part 72C makes the damping force softer when the piston frequency is high than when the piston frequency is low. Also, in the frequency sensitive part 72C, if a pressure in the second chamber 20 increases rapidly during the compression stroke, the check valve 335 opens to allow the oil fluid to also flow from the second chamber 20 to the first chamber 19 through the second passage 141C.

Figure 22:
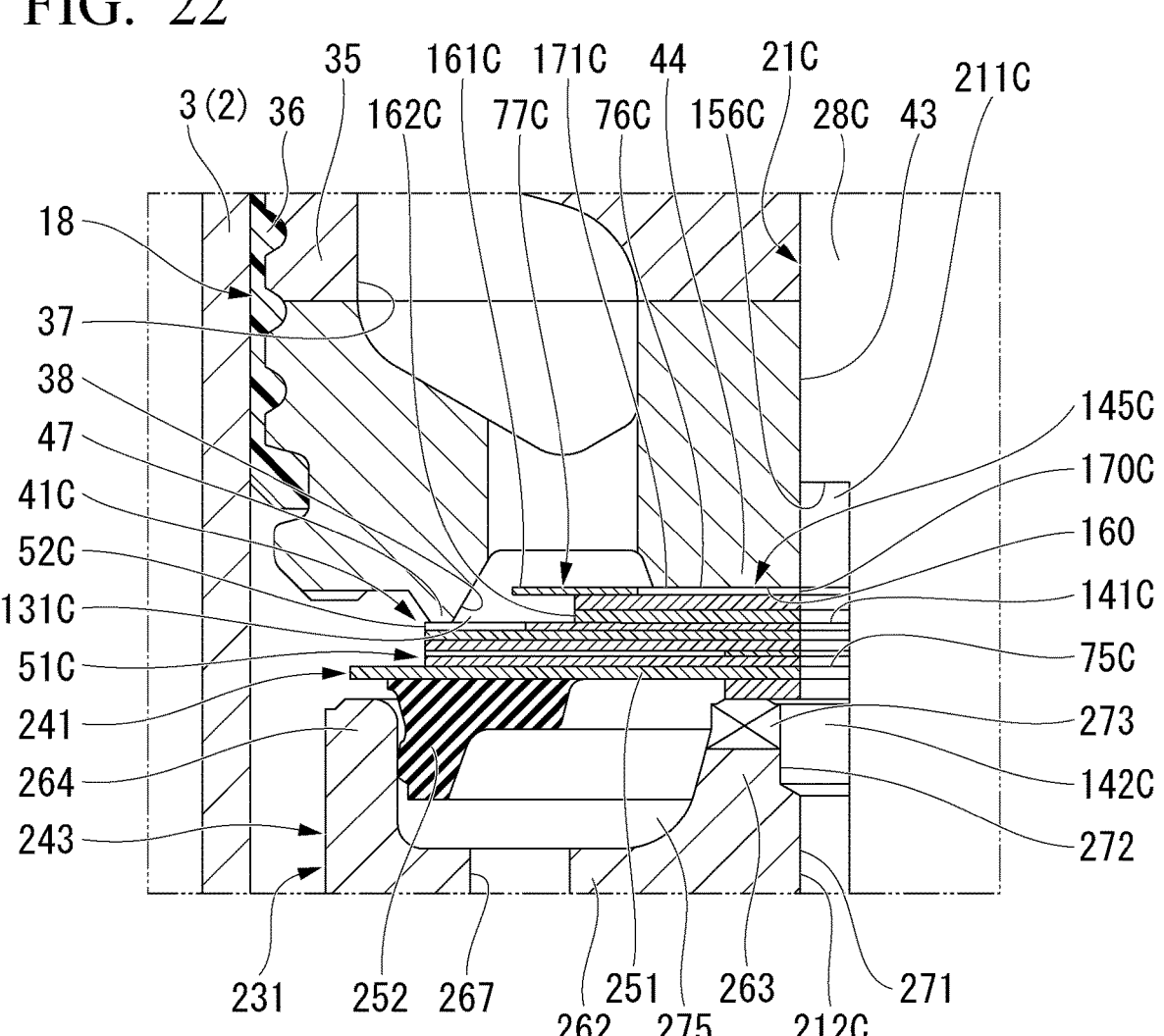
FIG. 22 is a partial cross-sectional view of a main part of the shock absorber according to the fourth embodiment of the present invention.

As illustrated in FIG. 22, the throttle flow path forming part 77C includes a throttle disc 161C (throttle member, throttle valve) and a plurality of discs 162C. The throttle disc 161C is fitted on the mounting shaft part 28C of the piston rod 21C and is in contact with a distal end surface 160 of an inner seat part 44 of the piston 18. The discs 162C are fitted on the mounting shaft part 28C of the piston rod 21C and are in contact with the throttle disc 161C on a side opposite to the inner seat part 44 in the axial direction (thickness direction). The discs 162C are in contact with the disc valve 51C at a side opposite to the throttle disc 161C in the axial direction (thickness direction).

The throttle disc 161C and the discs 162C all have a bored disc shape fitted on the mounting shaft part 28C. A notch part 171C is formed in the throttle disc 161C. The notch part 171C extends radially outward from an inner circumferential end edge portion 170C fitted on the mounting shaft part 28C to a predetermined intermediate position in the radial direction. The notch part 171C also has a notch shape in which an outer circumferential side of the throttle disc 161C in the radial direction is wider than an inner circumferential side thereof. The throttle disc 161C has a constant outer diameter over the entire circumference. A plurality of notch parts 171C having the same shape are formed in the throttle disc 161C at regular intervals in the circumferential direction. All the notch parts 171C extend to an outer side of the distal end surface 160 of the inner seat part 44 in the radial direction of the throttle disc 161C. Therefore, the distal end surface 160 of the inner seat part 44 covers and closes a part of each notch part 171C on an inner side in the radial direction of the throttle disc 161C from a side opposite to the discs 162C in the axial direction for all the notch parts 171C of the throttle disc 161C. For all the notch parts 171C, the throttle disc 161C allows a part of each notch part 171C on an outer side in the radial direction of the throttle disc 161C to communicate with the passages in the annular recessed part 38 and the plurality of passage holes 37 of the piston 18.

The discs 162C each have a constant inner diameter over the entire circumference, a constant outer diameter over the entire circumference, and a constant radial width over the entire circumference. The disc 162C has an inner diameter equal to a minimum inner diameter of the throttle disc 161C and an outer diameter smaller than an outer diameter of the throttle disc 161C. However, the disc 162C covers and closes each notch part 171C in its entirety from a side opposite to the inner seat part 44 in the axial direction for all the notch parts 171C of the throttle disc 161C.

The throttle disc 161C, together with the inner seat part 44 and the discs 162C, forms the throttle flow path 76C. Therefore, the throttle disc 161C is provided in the second damping force generation mechanism 145C including the throttle flow path 76C. The throttle disc 161C includes the plurality of notch parts 171C at substantially regular intervals in the circumferential direction. The throttle disc 161C is a throttle valve that forms the throttle flow path 76C in the parallel passage 142C of the second passage 141C due to the notch parts 171C. The throttle disc 161C is provided on the piston 18 side which is one side of the second passage 141C with respect to the housing 84C and the case member 243 illustrated in FIG. 21. As illustrated in FIG. 22, in the axial direction of the mounting shaft part 28C of the piston rod 21C, the throttle disc 161C, that is, the throttle flow path 76C, overlaps the groove parts 211C in axial position. Thereby, the throttle flow path 76C communicates with the rod passage 75C.

Then, also in the fourth embodiment, the throttle disc 161C has a relationship between the notch part 171C thereof and the groove part 211C set in the same manner as that in the throttle disc 161B of the third embodiment. Therefore, a flow path area of the throttle flow path 76C is formed to be constant regardless of an attachment position of the throttle disc 161C in the circumferential direction with respect to the mounting shaft part 28C of the piston rod 21C.

Fifth Embodiment

Next, a fifth embodiment will be described mainly on the basis of FIG. 23, focusing on differences from the fourth embodiment. Further, parts common to those in the fourth embodiment will be denoted by the same terms and the same reference signs.

Figure 23:
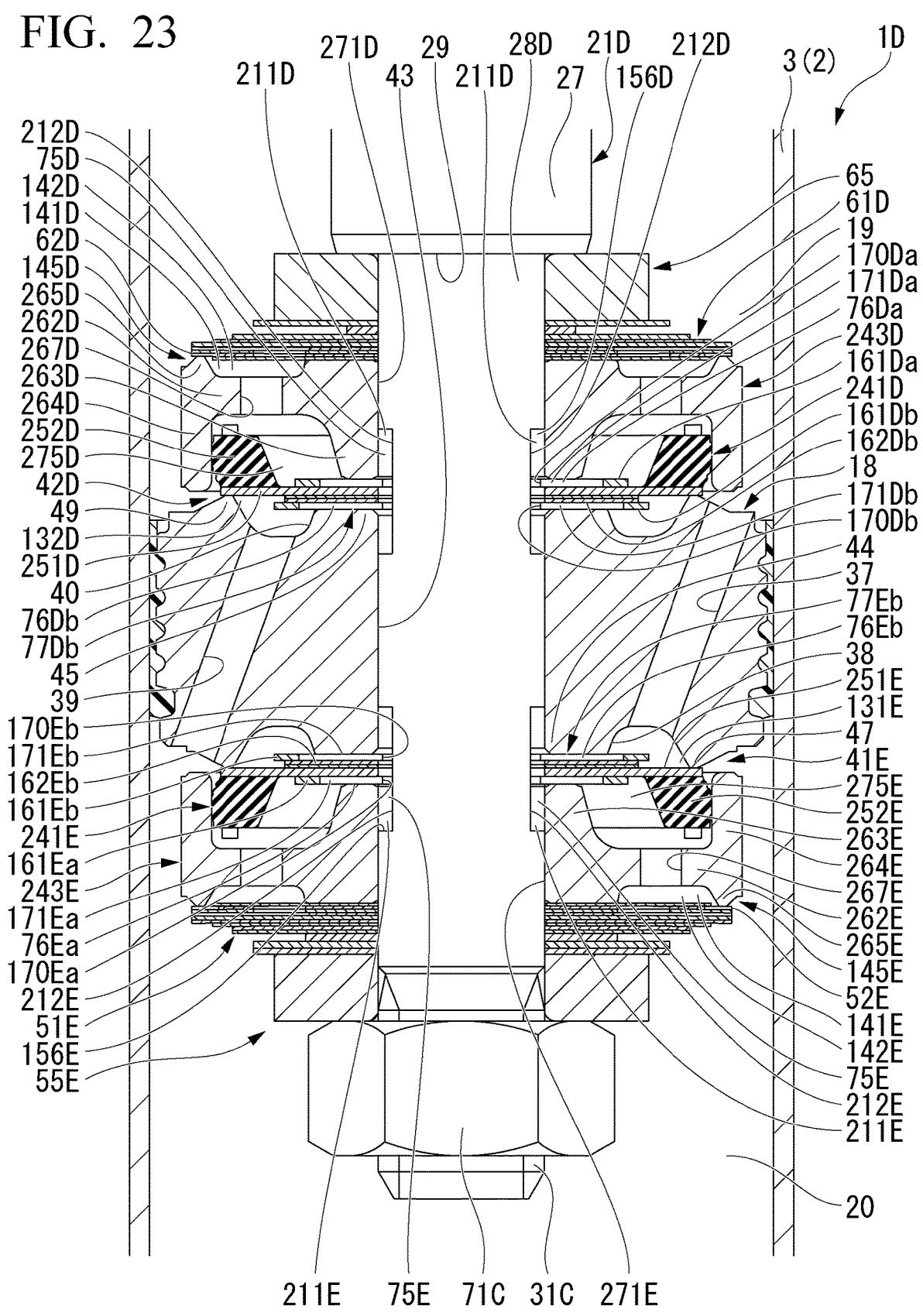
FIG. 23 is a partial cross-sectional view illustrating the vicinity of a piston of a shock absorber according to a fifth embodiment of the present invention.

As illustrated in FIG. 23, in a shock absorber 1D of the fifth embodiment, a piston rod 21D is partially different from the piston rod 21C. Specifically, a mounting shaft part 28D is partially different from the mounting shaft part 28C. The mounting shaft part 28D is different from the mounting shaft part 28C in that two rod passages 75D and 75E, which are partially different from the rod passage 75C, are provided. Both the rod passage 75D and the rod passage 75E partly overlap the piston 18 in an axial direction of the piston 18.

The rod passage 75D is formed of a plurality of, specifically two, groove parts 211D having the same shape. The groove parts 211D each have a shape in which an outer circumferential portion of the mounting shaft part 28D is notched to form a planar bottom surface 212D parallel to a central axis of the mounting shaft part 28D. The bottom surfaces 212D of the two groove parts 211D are disposed parallel to each other. The two groove parts 211D are formed to be aligned in position in the axial direction of the mounting shaft part 28D in a range between a male screw 31C provided at an end portion of the mounting shaft part 28D on a side opposite to a main shaft part 27 and a shaft step part 29.

The rod passage 75D opens to an outer diameter side of the mounting shaft part 28D of the piston rod 21D at the groove parts 211D. In the rod passage 75D provided in the piston rod 21D, an opening 156D opening to an outer diameter surface on the piston 18 side is formed by the groove part 211D.

The rod passage 75E is formed between the rod passage 75D and the male screw 31C. The rod passage 75E is formed of a plurality of, specifically two, groove parts 211E having the same shape. The groove parts 211E each have a shape in which an outer circumferential portion of the mounting shaft part 28D is notched to form a planar bottom surface 212E parallel to the central axis of the mounting shaft part 28D. The bottom surfaces 212E of the two groove parts 211E are disposed parallel to each other. The two groove parts 211E are formed to be aligned in position in the axial direction of the mounting shaft part 28D in a range between the rod passage 75D of the mounting shaft part 28D and the male screw 31C.

The rod passage 75E opens to an outer diameter side of the mounting shaft part 28D of the piston rod 21D at the groove part 211E. In the rod passage 75E provided in the piston rod 21D, an opening 156E opening to an outer diameter surface on the piston 18 side is formed by the groove part 211E.

In the shock absorber 1D of the fifth embodiment, a deformation suppression part 65, a disc valve 61D, a case member 243D (fixing member), a throttle disc 161Da (throttle member, throttle valve) forming a throttle flow path 76Da, a main valve 241D, a throttle flow path forming part 77*db* forming a throttle flow path 76*db*, a piston 18, a throttle flow path forming part 77Eb forming a throttle flow path 76Eb, a main valve 241E, a throttle disc 161Ea (throttle member, throttle valve) forming a throttle flow path 76Ea, a case member 243E (fixing member), a disc valve 51E, a deformation suppression part 55E, and a nut 71C are provided on the mounting shaft part 28D of the piston rod 21D in order from the shaft step part 29 side.

The case member 243D includes a bottom part 262D similar to the bottom part 262 of the case member 243, an outer cylindrical part 264D similar to the outer cylindrical part 264, and a valve seat 265D similar to the valve seat 265, and also includes an inner cylindrical part 263D that is partially different from the inner cylindrical part 263. The large diameter hole portion 272 and the passage groove 273 are not formed in the inner cylindrical part 263D. In the case member 243D, a fitting hole 271D into which the mounting shaft part 28D is fitted is formed on an inner circumferential side of the inner cylindrical part 263D and the bottom part 262D. A through hole 267D similar to the through hole 267 is formed in the bottom part 262D. A distal end surface of the inner cylindrical part 263D has a constant inner diameter over the entire circumference, a constant outer diameter over the entire circumference, and a constant radial width over the entire circumference.

The disc valve 61D is constituted by stacking a plurality of discs having a bored disc shape. The disc valve 61D is separated from and seated on the valve seat 265D of the case member 243D. A fixed orifice 62D is formed in the disc valve 61D. The fixed orifice 62D allows the inside and outside of the valve seat 265D in the radial direction even when it is in contact with the valve seat 265D over the entire circumference. The deformation suppression part 65 suppresses deformation of the disc valve 61D in an opening direction by coming into contact with the disc valve 61D.

The main valve 241D is a part similar to the pilot disc 241. The main valve 241D includes a disc 251D similar to the disc 251 and a seal member 252D similar to the seal member 252. The mounting shaft part 28D of the piston rod 21D is fitted to an inner circumferential side of the disc 251D. An outer circumferential side of the disc 251D is in contact with a valve seat part 49 of the piston 18. The seal member 252D is in contact with an inner circumferential surface of the outer cylindrical part 264D of the case member 243D over the entire circumference. The seal member 252D constantly seals between itself and the outer cylindrical part 264D.

The disc 251D of the main valve 241D is separated from and seated on the valve seat part 49 of the piston 18 to open and close passages in the plurality of passage holes 39 and an annular recessed part 40. The main valve 241D forms a back pressure chamber 275D that generates a back pressure in a direction closing the main valve 241D between itself and the case member 243D. The fixed orifice 62D of the disc valve 61D allows the back pressure chamber 275D to communicate with a first chamber 19.

The throttle flow path 76Da of the throttle disc 161Da allows the rod passage 75D and the back pressure chamber 275D to communicate with each other. The throttle flow path 76db of the throttle flow path forming part 77db allows the passages in the plurality of passage holes 39 and the annular recessed part 40 of the piston 18 and the rod passage 75D to communicate with each other. An oil fluid of a second chamber 20 is introduced into the back pressure chamber 275D via the passages in the passage holes 39 and the annular recessed part 40 of the piston 18, the throttle flow path 76db of the throttle flow path forming part 77db, the rod passage 75D, and the throttle flow path 76Da of the throttle disc 161Da.

The case member 243E has the same shape as the case member 243D and has compatibility with the case member 243D. The case member 243E includes a bottom part 262E similar to the bottom part 262D, an outer cylindrical part 264E similar to the outer cylindrical part 264D, a valve seat 265E similar to the valve seat 265D, and an inner cylindrical part 263E similar to the inner cylindrical part 263D. A fitting hole 271E similar to the fitting hole 271D and a through hole 267E similar to the through hole 267D are formed in the case member 243E.

The disc valve 51E is constituted by stacking a plurality of discs having a bored disc shape. The disc valve 51E is separated from and seated on the valve seat 265E of the case member 243E. A fixed orifice 52E is formed in the disc valve 51E. The fixed orifice 52E allows the inside and outside of the valve seat 265E in the radial direction even when it is in contact with the valve seat 265E over the entire circumference.

A deformation suppression part 65E is constituted by a plurality of annular discs. The deformation suppression part 65E suppresses deformation of the disc valve 51E in an opening direction by coming into contact with the disc valve 51E.

The main valve 241E is a part similar to the main valve 241D. The main valve 241E includes a disc 251E similar to the disc 251D and a seal member 252E similar to the seal member 252D. The mounting shaft part 28D of the piston rod 21D is fitted to an inner circumferential side of the disc 251E. An outer circumferential side of the disc 251E is in contact with the valve seat part 47 of the piston 18. The seal member 252E is in contact with an inner circumferential surface of the outer cylindrical part 264E of the case member 243E over the entire circumference to constantly close a space between itself and the outer cylindrical part 264E.

The disc 251E of the main valve 241E is separated from and seated on the valve seat part 47 of the piston 18 to open and close passages in a plurality of passage holes 37 and an annular recessed part 38. The main valve 241E forms a back pressure chamber 275E that generates a back pressure in a direction closing the main valve 241E between itself and the case member 243E. The fixed orifice 52E of the disc valve 51E allows the back pressure chamber 275E to communicate with the second chamber 20.

The throttle flow path 76Ea of the throttle disc 161Ea allows the rod passage 75E and the back pressure chamber 275E to communicate with each other. The throttle flow path 76Eb of the throttle flow path forming part 77Eb allows the passages in the plurality of passage holes 37 and the annular recessed part 38 of the piston 18 and the rod passage 75E to communicate with each other. The oil fluid of the first chamber 19 is introduced into the back pressure chamber 275E via the passages in the passage holes 37 and the annular recessed part 38 of the piston 18, the throttle flow path 76Eb of the throttle flow path forming part 77Eb, the rod passage 75E, and the throttle flow path 76Ea of the throttle disc 161Ea.

When the main valve 241D is separated from the valve seat part 49 of the piston 18 and open, the oil fluid from the passages in the plurality of passage holes 39 and the annular recessed part 40 is caused to flow into the first chamber 19. The passages in the plurality of passage holes 39 and the annular recessed part 40 of the piston 18, and a passage between the main valve 241D and the valve seat part 49 generated at the time of opening constitute a first passage 132D. The first passage 132D is provided in the piston 18. The first passage 132D serves as a compression-side passage through which the oil fluid as a working fluid moves from the second chamber 20 on an upstream side toward the first chamber 19 on a downstream side in the cylinder 2 when the piston 18 moves to the second chamber 20 side, that is, during a compression stroke. The valve seat part 49 and the main valve 241D constitute a compression-side first damping force generation mechanism 42D. The first damping force generation mechanism 42D is provided in the first passage 132D. A damping force is generated when the main valve 241D opens and closes the first passage 132D to suppress a flow of the oil fluid.

In the shock absorber 1D, the passages in the plurality of passage holes 39 and the annular recessed part 40 of the piston 18, the throttle flow path 76db of the throttle flow path forming part 77db, the rod passage 75D of the piston rod 21D, the throttle flow path 76Da of the throttle disc 161Da, the back pressure chamber 275D, and a passage between the disc valve 61D and the valve seat 265D generated at the time of opening constitute a second passage 141D that is parallel to the first passage 132D. In the second passage 141D, the throttle flow path 76db of the throttle flow path forming part 77db, the rod passage 75D of the piston rod 21D, the throttle flow path 76Da of the throttle disc 161Da, the back pressure chamber 275D, and the passage between the disc valve 61D and the valve seat 265D generated at the time of opening serve as a parallel passage 142D that is parallel to the first passage 132D.

The second passage 141D includes the rod passage 75D of the piston rod 21D. The second passage 141D is provided in the piston rod 21D. The valve seat 265D and the disc valve 61D constitute a compression-side second damping force generation mechanism 145D. The second damping force generation mechanism 145D includes the fixed orifice 62D. The second damping force generation mechanism 145D is provided in the second passage 141D. A damping force is generated when the disc valve 61D opens and closes the second passage 141D to suppress a flow of the oil fluid. The case member 243D is fixed to the piston rod 21D to form the back pressure chamber 275D that is a part of the second passage 141D.

When the main valve 241E is separated from the valve seat part 47 of the piston 18 and open, the oil fluid from the passages in the plurality of passage holes 37 and the annular recessed part 38 is caused to flow into the second chamber 20. The passages in the plurality of passage holes 37 and the annular recessed part 38 of the piston 18, and a passage between the main valve 241E and the valve seat part 47 generated at the time of opening constitute a first passage 131E. The first passage 131E is provided in the piston 18. The first passage 131E serves as an extension-side passage through which the oil fluid as a working fluid moves from the first chamber 19 on an upstream side toward the second chamber 20 on a downstream side in the cylinder 2 when the piston 18 moves to the first chamber 19 side, that is, during an extension stroke. The valve seat part 47 and the main valve 241E constitute an extension-side first damping force generation mechanism 41E. The first damping force generation mechanism 41E is provided in the first passage 131E, and generates a damping force by opening and closing the first passage 131E with the main valve 241E to suppress a flow of the oil fluid.

In the shock absorber 1E, the passages in the plurality of passage holes 37 and the annular recessed part 38 of the piston 18, the throttle flow path 76Eb of the throttle flow path forming part 77Eb, the rod passage 75E of the piston rod 21D, the throttle flow path 76Ea of the throttle disc 161Ea, the back pressure chamber 275E, and a passage between the disc valve 51E and the valve seat 265E generated at the time of opening constitute a second passage 141E that is parallel to the first passage 131E. In the second passage 141E, the throttle flow path 76Eb of the throttle flow path forming part 77Eb, the rod passage 75E of the piston rod 21D, the throttle flow path 76Ea of the throttle disc 161Ea, the back pressure chamber 275E, and the passage between the disc valve 51E and the valve seat 265E generated at the time of opening serve as a parallel passage 142E that is parallel to the first passage 131E.

The second passage 141E includes the rod passage 75E of the piston rod 21D. The second passage 141E is provided in the piston rod 21D. The valve seat 265E and the disc valve 51E constitute an extension-side second damping force generation mechanism 145E. The second damping force generation mechanism 145E includes the fixed orifice 52E. The second damping force generation mechanism 145E is provided in the second passage 141E. A damping force is generated when the disc valve 51E opens and closes the second passage 141E to suppress a flow of the oil fluid. The case member 243E is fixed to the piston rod 21D to form the back pressure chamber 275E that is a part of the second passage 141E.

In the extension stroke, a flow of the oil fluid from the first chamber 19 is as follows.

In a low-speed region of the piston, the oil fluid flows from the second passage 141E into the second chamber 20 via the fixed orifice 52E.

In a medium-speed region of the piston, the oil fluid flows from the second passage 141E into the second chamber 20 by opening the disc valve 51E.

In a high-speed region of the piston, the oil fluid flows from the first passage 131E into the second chamber 20 by opening the main valve 241E in addition to the flow from the second passage 141E due to the opening of the disc valve 51E.

In the compression stroke, a flow of the oil fluid from the second chamber 20 is as follows.

In a low-speed region of the piston, the oil fluid flows from the second passage 141D into the first chamber 19 via the fixed orifice 62D.

In a medium-speed region of the piston, the oil fluid flows from the second passage 141D into the first chamber 19 by opening the disc valve 61D.

In a high-speed region of the piston, the oil fluid flows from the first passage 132D into the first chamber 19 by opening the main valve 241D in addition to the flow from the second passage 141D due to the opening of the disc valve 61D.

The throttle disc 161Da is fitted on the mounting shaft part 28D of the piston rod 21D. The throttle disc 161Da is in contact with a distal end surface of the inner cylindrical part 263D of the case member 243D and the disc 251D of the main valve 241D. The distal end surface of the inner cylindrical part 263D has a constant inner diameter over the entire circumference, a constant outer diameter over the entire circumference, and a constant radial width over the entire circumference. The throttle disc 161Da has a bored disc shape. A notch part 171Da extending radially outward from an inner circumferential end edge portion 170Da fitted on the mounting shaft part 28D to a predetermined intermediate position in the radial direction is formed in the throttle disc 161Da. The notch part 171Da also has a notch shape in which an outer circumferential side of the throttle disc 161Da in the radial direction is wider than an inner circumferential side thereof. The throttle disc 161Da has a constant outer diameter over the entire circumference. A plurality of notch parts 171Da having the same shape are formed in the throttle disc 161Da at regular intervals in the circumferential direction. All the notch parts 171Da extend to an outer side of the distal end surface of the inner cylindrical part 263D in the radial direction of the throttle disc 161Da. Therefore, the distal end surface of the inner cylindrical part 263D covers and closes a part of each notch part 171Da on an inner side in the radial direction of the throttle disc 161Da from a side opposite to the piston 18 in the axial direction for all the notch parts 171Da of the throttle disc 161Da. For all the notch parts 171Da, the throttle disc 161Da allows a part of each notch part 171Da on an outer side in the radial direction of the throttle disc 161Da to communicate with the back pressure chamber 275D.

The disc 251D of the main valve 241D has a constant inner diameter over the entire circumference, a constant outer diameter over the entire circumference, and a constant radial width over the entire circumference. The disc 251D has an inner diameter equal to a minimum inner diameter of the throttle disc 161Da and an outer diameter larger than an outer diameter of the throttle disc 161Da. For all the notch parts 171Da of the throttle disc 161Da, the disc 251D covers and closes each notch part 171Da in its entirety from a side opposite to the inner cylindrical part 263D in the axial direction.

The throttle disc 161Da forms the throttle flow path 76Da with the inner cylindrical part 263D and the disc 251D. The throttle disc 161Da is provided in the second damping force generation mechanism 145D including the throttle flow path 76Da. The throttle disc 161Da has the plurality of notch parts 171Da at substantially regular intervals in the circumferential direction. The throttle disc 161Da is a throttle valve that forms the throttle flow path 76Da in the parallel passage 142D of the second passage 141D due to the notch parts 171Da. The throttle disc 161Da is provided on the piston 18 side which is one side of the second passage 141D with respect to the case member 243D. In the axial direction of the mounting shaft part 28D of the piston rod 21D, the throttle disc 161Da, that is, the throttle flow path 76Da, overlaps the groove parts 211D in axial position. Thereby, the throttle flow path 76Da communicates with the rod passage 75D.

Then, in the fifth embodiment, the throttle disc 161Da has a relationship between the notch part 171Da thereof and the groove part 211D set in the same manner as that in the throttle disc 161B of the third embodiment. Therefore, a flow path area of the throttle flow path 76Da is formed to be constant regardless of an attachment position of the throttle disc 161Da in the circumferential direction with respect to the mounting shaft part 28D of the piston rod 21D.

The throttle flow path forming part 77db includes a throttle disc 161db (throttle member, throttle valve) and a plurality of discs 162db. The throttle disc 161db is fitted on the mounting shaft part 28D of the piston rod 21D and is in contact with a distal end surface of the inner seat part 45 of the piston 18. The discs 162db are fitted on the mounting shaft part 28D of the piston rod 21D and are in contact with the throttle disc 161db on a side opposite to the inner seat part 45 in the axial direction (thickness direction). The distal end surface of the inner seat part 45 has a constant inner diameter over the entire circumference, a constant outer diameter over the entire circumference, and a constant radial width over the entire circumference. The discs 162db are in contact with the disc 251D of the main valve 241D at a side opposite to the throttle disc 161db in the axial direction (thickness direction).

The throttle disc 161db and the discs 162db all have a bored disc shape fitted on the mounting shaft part 28D. A notch part 171db is formed in the throttle disc 161db. The notch part 171db extends radially outward from an inner circumferential end edge portion 170db fitted on the mounting shaft part 28D to a predetermined intermediate position in the radial direction. The notch part 171db also has a notch shape in which an outer circumferential side of the throttle disc 161db in the radial direction is wider than an inner circumferential side thereof. The throttle disc 161db has a constant outer diameter over the entire circumference. A plurality of notch parts 171db having the same shape are formed in the throttle disc 161db at regular intervals in the circumferential direction. All the notch parts 171db extend to an outer side of the distal end surface of the inner seat part 45 in the radial direction of the throttle disc 161D. Therefore, the distal end surface of the inner seat part 45 covers and closes a part of each notch part 171db on an inner side in the radial direction of the throttle disc 161db from a side opposite to the discs 162db in the axial direction for all the notch parts 171db of the throttle disc 161db. For all the notch parts 171db, the throttle disc 161db allows a part of each notch part 171db on an outer side in the radial direction of the throttle disc 161db to communicate with the passages in the annular recessed part 40 and the plurality of passage holes 39 of the piston 18.

The discs 162db each have a constant inner diameter over the entire circumference, a constant outer diameter over the entire circumference, and a constant radial width over the entire circumference. The disc 162db has an inner diameter equal to a minimum inner diameter of the throttle disc 161db. The disc 162db has an outer diameter smaller than an outer diameter of the throttle disc 161db. However, the disc 162db covers and closes each notch part 171db in its entirety from a side opposite to the inner seat part 45 in the axial direction for all the notch parts 171db of the throttle disc 161db.

The throttle disc 161db forms the throttle flow path 76db with the inner seat part 45 and the disc 162db. The throttle disc 161db is provided in the second damping force generation mechanism 145D including the throttle flow path 76db. The throttle disc 161db has the plurality of notch parts 171db at substantially regular intervals in the circumferential direction. The throttle disc 161db is a throttle valve that forms the throttle flow path 76db in the parallel passage 142D of the second passage 141D due to the notch parts 171db. The throttle disc 161db is provided on the piston 18 side which is one side of the second passage 141D with respect to the case member 243D. In the axial direction of the mounting shaft part 28D of the piston rod 21D, the throttle disc 161db, that is, the throttle flow path 76db, overlaps the groove parts 211D in axial position. Thereby, the throttle flow path 76db communicates with the rod passage 75D.

The throttle disc 161db also has a relationship between the notch part 171db thereof and the groove part 211D set in the same manner as that in the throttle disc 161B of the third embodiment, and therefore a flow path area of the throttle flow path 76db is formed to be constant regardless of an attachment position of the throttle disc 161db in the circumferential direction with respect to the mounting shaft part 28D of the piston rod 21D.

The throttle disc 161Ea is fitted on the mounting shaft part 28D of the piston rod 21D. The throttle disc 161Ea is in contact with a distal end surface of the inner cylindrical part 263E of the case member 243E and the disc 251E of the main valve 241E. The distal end surface of the inner cylindrical part 263E has a constant inner diameter over the entire circumference, a constant outer diameter over the entire circumference, and a constant radial width over the entire circumference. The throttle disc 161Ea has a bored disc shape. A notch part 171Ea is formed in the throttle disc 161Ea. The notch part 171Ea extends radially outward from an inner circumferential end edge portion 170Ea fitted on the mounting shaft part 28D to a predetermined intermediate position in the radial direction. The notch part 171Ea also has a notch shape in which an outer circumferential side of the throttle disc 161Ea in the radial direction is wider than an inner circumferential side thereof. The throttle disc 161Ea has a constant outer diameter over the entire circumference. A plurality of notch parts 171Ea having the same shape are formed in the throttle disc 161Ea at regular intervals in the circumferential direction thereof. All the notch parts 171Ea extend to an outer side of the distal end surface of the inner cylindrical part 263E in the radial direction of the throttle disc 161Ea. Therefore, the distal end surface of the inner cylindrical part 263E covers and closes a part of each notch part 171Ea on an inner side in the radial direction of the throttle disc 161Ea from a side opposite to the piston 18 in the axial direction for all the notch parts 171Ea of the throttle disc 161Ea. For all the notch parts 171Ea, the throttle disc 161Ea allows a part of each notch part 171Ea on an outer side in the radial direction of the throttle disc 161Ea to communicate with the back pressure chamber 275E.

The disc 251E of the main valve 241E has a constant inner diameter over the entire circumference, a constant outer diameter over the entire circumference, and a constant radial width over the entire circumference. The disc 251E has an inner diameter equal to a minimum inner diameter of the throttle disc 161Ea and an outer diameter larger than an outer diameter of the throttle disc 161Ea. For all the notch parts 171Ea of the throttle disc 161Ea, the disc 251E covers and closes each notch part 171Ea in its entirety from a side opposite to the inner cylindrical part 263E in the axial direction.

The throttle disc 161Ea forms the throttle flow path 76Ea with the inner cylindrical part 263E and the disc 251E. The throttle disc 161Ea is provided in the second damping force generation mechanism 145E including the throttle flow path 76Ea. The throttle disc 161Ea has the plurality of notch parts 171Ea at substantially regular intervals in the circumferential direction. The throttle disc 161Ea is a throttle valve that forms the throttle flow path 76Ea in the parallel passage 142E of the second passage 141E due to the notch parts 171Ea. The throttle disc 161Ea is provided on the piston 18 side which is one side of the second passage 141E with respect to the case member 243E. In the axial direction of the mounting shaft part 28D of the piston rod 21D, the throttle disc 161Ea, that is, the throttle flow path 76Ea, overlaps the groove parts 211E in axial position. Thereby, the throttle flow path 76Ea communicates with the rod passage 75E.

The throttle disc 161Ea also has a relationship between the notch part 171Ea thereof and the groove part 211E set in the same manner as that in the throttle disc 161B of the third embodiment. Therefore, the throttle disc 161Ea is formed to have a flow path area of the throttle flow path 76Ea that is constant regardless of its attachment position in the circumferential direction with respect to the mounting shaft part 28D of the piston rod 21D.

The throttle flow path forming part 77Eb includes a throttle disc 161Eb (throttle member, throttle valve) and a plurality of discs 162Eb. The throttle disc 161Eb is fitted on the mounting shaft part 28D of the piston rod 21D and is in contact with a distal end surface of an inner seat part 44 of the piston 18. The discs 162Eb are fitted on the mounting shaft part 28D of the piston rod 21D and are in contact with the throttle disc 161Eb on a side opposite to the inner seat part 44 in the axial direction (thickness direction). The distal end surface of the inner seat part 44 has a constant inner diameter over the entire circumference, a constant outer diameter over the entire circumference, and a constant radial width over the entire circumference. The discs 162Eb are in contact with the disc 251E of the main valve 241E at a side opposite to the throttle disc 161Eb in the axial direction (thickness direction).

The throttle disc 161Eb and the discs 162Eb all have a bored disc shape fitted on the mounting shaft part 28D. A notch part 171Eb is formed in the throttle disc 161Eb. The notch part 171Eb extends radially outward from an inner circumferential end edge portion 170Eb fitted on the mounting shaft part 28D to a predetermined intermediate position in the radial direction. The notch part 171Eb also has a notch shape in which an outer circumferential side of the throttle disc 161Eb in the radial direction is wider than an inner circumferential side thereof. The throttle disc 161Eb has a constant outer diameter over the entire circumference. A plurality of notch parts 171Eb having the same shape are formed in the throttle disc 161Eb at regular intervals in the circumferential direction. All the notch parts 171Eb extend to an outer side of the distal end surface of the inner seat part 44 in the radial direction of the throttle disc 161E. Therefore, the distal end surface of the inner seat part 44 covers and closes a part of each notch part 171Eb on an inner side in the radial direction of the throttle disc 161Eb from a side opposite to the discs 162Eb in the axial direction for all the notch parts 171Eb of the throttle disc 161Eb. For all the notch parts 171Eb, the throttle disc 161Eb allows a part of each notch part 171Eb on an outer side in the radial direction of the throttle disc 161Eb to communicate with the passages in the annular recessed part 38 and the plurality of passage holes 37 of the piston 18.

The discs 162Eb each have a constant inner diameter over the entire circumference, a constant outer diameter over the entire circumference, and a constant radial width over the entire circumference. The disc 162Eb has an inner diameter equal to a minimum inner diameter of the throttle disc 161Eb and an outer diameter smaller than an outer diameter of the throttle disc 161Eb. However, the disc 162Eb covers and closes each notch part 171Eb in its entirety from a side opposite to the inner seat part 44 in the axial direction for all the notch parts 171Eb of the throttle disc 161Eb.

The throttle disc 161Eb, together with the inner seat part 44 and the discs 162Eb, forms the throttle flow path 76Eb. The throttle disc 161Eb is provided in the second damping force generation mechanism 145E including the throttle flow path 76Eb. The throttle disc 161Eb has a plurality of notch parts 171Eb at substantially regular intervals in the circumferential direction. The throttle disc 161Eb is a throttle valve that forms the throttle flow path 76Eb in the parallel passage 142E of the second passage 141E due to the notch parts 171Eb. The throttle disc 161Eb is provided on the piston 18 side which is one side of the second passage 141E with respect to the case member 243E. In the axial direction of the mounting shaft part 28D of the piston rod 21D, the throttle disc 161Eb, that is, the throttle flow path 76Eb, overlaps the groove parts 211E in axial position. Thereby, the throttle flow path 76Eb communicates with the rod passage 75E.

The throttle disc 161Eb also has a relationship between the notch part 171Eb thereof and the groove part 211E set in the same manner as that in the throttle disc 161B of the third embodiment, and therefore a flow path area of the throttle flow path 76Eb is formed to be constant regardless of an attachment position of the throttle disc 161Eb in the circumferential direction with respect to the mounting shaft part 28D of the piston rod 21D.

Sixth Embodiment

Next, a sixth embodiment will be described mainly on the basis of FIG. 24, focusing on differences from the third and fourth embodiments. Further, parts common to those in the third and fourth embodiments will be denoted by the same terms and the same reference signs.

Figure 24:
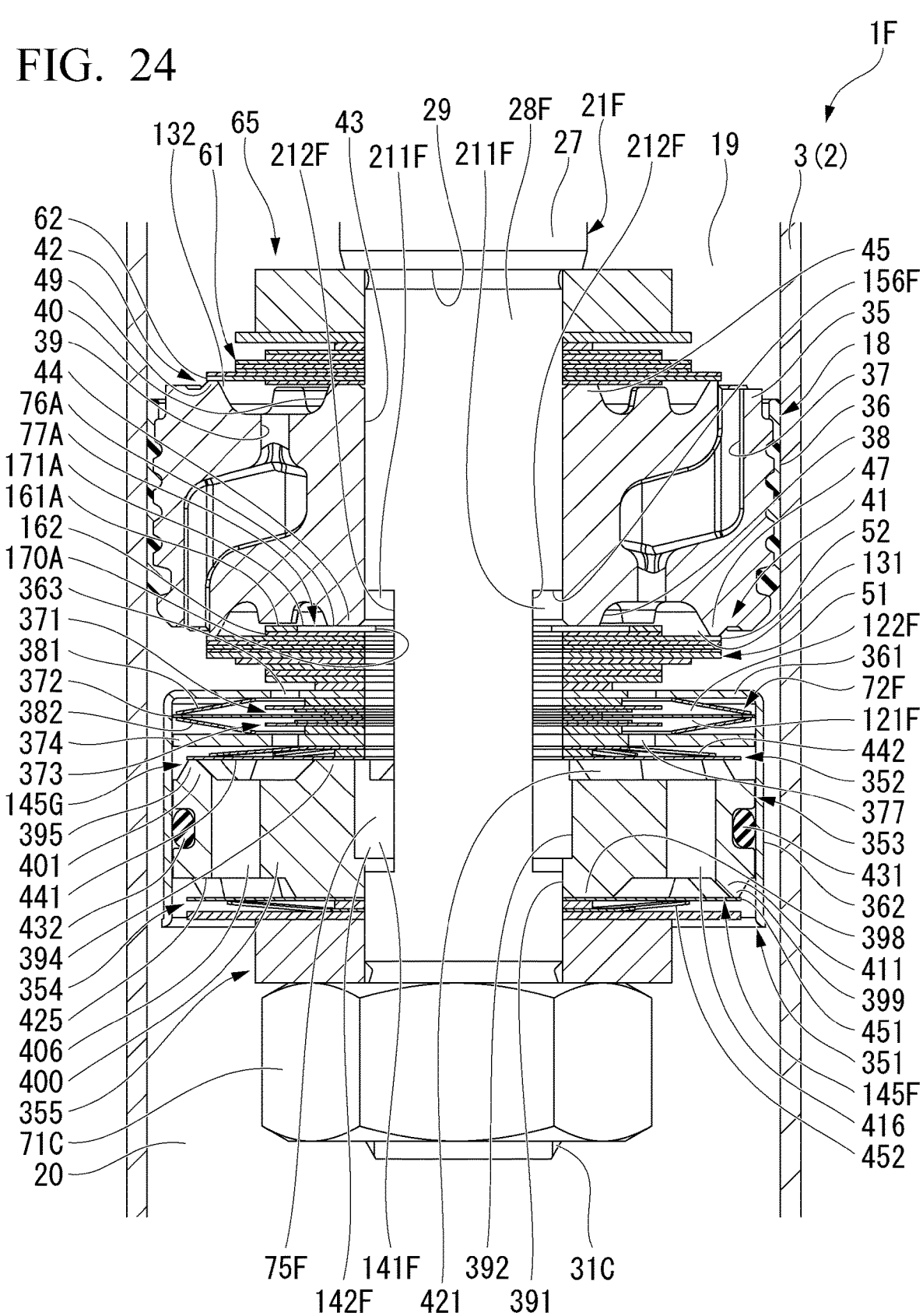
FIG. 24 is a partial cross-sectional view illustrating the vicinity of a piston of a shock absorber according to a sixth embodiment of the present invention.

As illustrated in FIG. 24, in a shock absorber 1F of the sixth embodiment, a piston rod 21F is partially different from the piston rod 21C. Specifically, a mounting shaft part 28F is partially different from the mounting shaft part 28C. The mounting shaft part 28F has an axial length smaller than that of the mounting shaft part 28C. Also, the mounting shaft part 28F is different in that a rod passage 75F having a length in an axial direction of the mounting shaft part 28F smaller than that of the rod passage 75C is provided.

The rod passage 75F is formed of two groove parts 211F in which lengths of the two groove parts 211C are changed to be reduced to be small in the axial direction of the mounting shaft part 28F. In each of the groove parts 211F, a bottom surface 212F and an opening 156F also have a length in the axial direction of the mounting shaft part 28F smaller than that of the bottom surface 212C and the opening 156C. The two groove parts 211F are also aligned in position in the axial direction of the mounting shaft part 28F.

In the shock absorber 1F of the sixth embodiment, a deformation suppression part 65 similar to that of the third embodiment, a disc valve 61, a piston 18, a throttle flow path forming part 77A, and a disc valve 51 are provided on the mounting shaft part 28F in order from the shaft step part 29 side. Also, a cap member 351 is disposed on the mounting shaft part 28F on a side opposite to the piston 18 with respect to the disc valve 51, and a frequency sensitive part 72F, a disc valve 352, a valve seat member 353, a disc valve 354, a deformation suppression part 355, and a nut 71C are provided in the cap member 351 in order from the disc valve 51 side in the axial direction.

The cap member 351 has a bottomed cylindrical shape having a bored disc-shaped bottom part 361, and a cylindrical part 362 extending from an outer circumferential edge portion of the bottom part 361 to one side of the bottom part 361 in the axial direction. A plurality of passage holes 363 penetrating in the axial direction are formed in the bottom part 361. The cap member 351 is attached to the mounting shaft part 28F by fitting the mounting shaft part 28F to an inner circumferential side of the bottom part 361 with the bottom part 361 directed to be positioned on the disc valve 51 side in the axial direction of the cap member 351.

The frequency sensitive part 72F includes a spacer part 371, a partition disc 372, a spacer part 373, and a support disc 374 on a side of the bottom part 361 of the cap member 351 opposite to the disc valve 51 in that order from the bottom part 361 side with the mounting shaft part 28F fitted therein.

The spacer part 371 is constituted by stacking a plurality of discs. The spacer part 373 is also constituted by stacking a plurality of discs. The spacer part 371 and the spacer part 373 have the same configuration and are symmetrically disposed in the axial direction. The partition disc 372 has an outer diameter larger than a maximum outer diameter of the spacer parts 371 and 373 and slightly smaller than an inner diameter of the cylindrical part 362. The support disc 374 has an outer diameter equal to that of the partition disc 372, and has a larger thickness and higher rigidity than the partition disc 372. In the support disc 374, a plurality of passage holes 377 are formed to be aligned with the passage holes 363 in position in the radial direction.

The frequency sensitive part 72F includes a disc spring 381 between the bottom part 361 of the cap member 351 and the partition disc 372, and a disc spring 382 between the support disc 374 and the partition disc 372. The disc spring 381 has a bored tapered shape in which a diameter thereof increases toward the partition disc 372. The spacer part 371 is disposed on a radial inner side of the disc spring 381 with a gap therebetween. The disc spring 381 is in close contact with the bottom part 361 at an inner circumferential side thereof and is in close contact with the partition disc 372 at an outer circumferential side thereof while being elastically deformed. The disc spring 382 has a bored tapered shape in which a diameter thereof increases toward the partition disc 372. The spacer part 373 is disposed on a radial inner side of the disc spring 382 with a gap therebetween. The disc spring 382 is in close contact with the support disc 374 at an inner circumferential side thereof and is in close contact with the partition disc 372 at an outer circumferential side thereof while being elastically deformed. The disc springs 381 and 382 urge an outer circumferential side of the partition disc 372 to hold it at a fixed position in the axial direction of the mounting shaft part 28F while being in close contact with the outer circumferential side of the partition disc 372. The frequency sensitive part 72F includes a variable chamber 121F between the disc spring 382 and the partition disc 372, and a variable chamber 122F between the disc spring 381 and the partition disc 372. The frequency sensitive part 72F changes volumes of the variable chambers 121F and 122F by deforming a portion between an inner circumferential portion of the partition disc 372 sandwiched between the spacer parts 371 and 373 and an outer circumferential portion thereof sandwiched between the disc springs 381 and 382 in the axial direction (thickness direction).

In the valve seat member 353, a small diameter hole portion 391 on one side in the axial direction and a large diameter hole portion 392 on the other side in the axial direction have a bored disc shape formed at a center in the radial direction. The mounting shaft part 28F is fitted in the small diameter hole portion 391. The large diameter hole portion 392 has a diameter larger than that of the small diameter hole portion 391. The rod passage 75F extends to the large diameter hole portion 392 of the valve seat member 353 in the axial direction of the mounting shaft part 28F.

The valve seat member 353 includes an inner seat part 394 having an annular shape to surround the large diameter hole portion 392 at an end portion on the large diameter hole portion 392 side in the axial direction. The valve seat member 353 has a valve seat part 395 extending outward in the radial direction from the inner seat part 394. The valve seat member 353 includes an inner seat part 398 having an annular shape to surround the small diameter hole portion 391 at an end portion on the small diameter hole portion 391 side on a side opposite to the large diameter hole portion 392 in the axial direction. The valve seat member 353 has a valve seat part 399 extending outward in the radial direction from the inner seat part 398. The valve seat member 353 includes a bored disc-shaped main body part 400 at a portion between the inner seat part 394 and the valve seat part 395, and the inner seat part 398 and the valve seat part 399 in the axial direction.

The inner seat part 394 protrudes to one side in the axial direction of the main body part 400 from an inner circumferential edge portion of the main body part 400 on the large diameter hole portion 392 side in the axial direction. The valve seat part 395 also protrudes from the main body part 400 to the same side as the inner seat part 394 in the axial direction of the main body part 400 at an outer side of the inner seat part 394 in the radial direction. Distal end surfaces of the inner seat part 394 and the valve seat part 395 on the protruding side, that is, distal end surfaces thereof on a side opposite to the main body part 400, are flat surfaces, and extend in a direction perpendicular to an axis of the valve seat member 353 to be disposed on the same plane.

The valve seat part 395 is a deformed seat having a petal shape. The valve seat part 395 includes a plurality of valve seat constituent parts 401 having the same shape. Inner end portions of the valve seat constituent parts 401 in the radial direction of the valve seat member 353 are connected to the inner seat part 394, thereby forming a frame shape together with the inner seat part 394. These valve seat constituent parts 401 are disposed at regular intervals in the circumferential direction of the valve seat member 353. A passage hole 406 penetrating the main body part 400 in an axial direction thereof is formed at inner positions of all the valve seat constituent parts 401.

The valve seat part 399 also is a deformed seat having a petal shape. The valve seat part 399 includes a plurality of valve seat constituent parts 411 having the same shape. Inner end portions of the valve seat constituent parts 411 in the radial direction of the valve seat member 353 are connected to the inner seat part 398, thereby forming a frame shape together with the inner seat part 398. These valve seat constituent parts 411 are disposed at regular intervals in the circumferential direction of the valve seat member 353. A passage hole 416 penetrating the main body part 400 in the axial direction is formed at inner positions of all the valve seat constituent parts 411.

A disposition pitch of the plurality of valve seat constituent parts 401 in the circumferential direction of the valve seat member 353 is the same as a disposition pitch of the plurality of valve seat constituent parts 411 in the circumferential direction of the valve seat member 353. The valve seat constituent parts 401 and the valve seat constituent parts 411 are shifted from each other by half a pitch. The passage hole 406 is disposed between the valve seat constituent parts 411 adjacent to each other in the circumferential direction of the valve seat member 353. Therefore, the passage hole 406 is disposed outside a range of the valve seat part 399. The passage hole 416 is disposed between the valve seat constituent parts 401 adjacent to each other in the circumferential direction of the valve seat member 353. Therefore, the passage hole 416 is disposed outside a range of the valve seat part 395.

A passage groove 421 traversing the inner seat part 394 in the radial direction is formed in the valve seat member 353. The passage groove 421 is formed to be recessed in the axial direction of the valve seat member 353 from a distal end surface of the inner seat part 394 on a side opposite to the main body part 400. The passage groove 421 also includes a space between the valve seat constituent parts 401 adjacent to each other in the circumferential direction of the valve seat member 353. The passage hole 416 opens to a bottom surface of the passage groove 421. The passage groove 421 allows the passage hole 416 and the large diameter hole portion 392 to communicate with each other.

The valve seat member 353 has a passage groove 425 formed between the valve seat constituent parts 411 adjacent to each other in the circumferential direction of the valve seat member 353. The passage hole 406 opens to a bottom surface of the passage groove 425. Therefore, the passage groove 425 communicates with the passage hole 406.

In the valve seat member 353, an annular seal groove 431 recessed inward in the radial direction is formed at an axially intermediate position of an outer circumferential portion of the main body part 400. An O-ring 432 is disposed in the seal groove 431. The valve seat member 353 is fitted to the cylindrical part 362 of the cap member 351 at an outer circumferential portion thereof with the inner seat part 398 and the valve seat part 399 directed toward a side opposite to the bottom part 361. In this state, the O-ring 432 seals a gap between the cylindrical part 362 of the cap member 351 and the valve seat member 353.

The disc valve 352 is provided between the valve seat member 353 and the support disc 374. The disc valve 352 includes a valve body disc 441 and a spring disc 442. The valve body disc 441 comes into contact with the valve seat part 395 to close a passage in the passage hole 406. The spring disc 442 urges the valve body disc 441 in a direction of the valve seat part 395. The disc valve 352 opens the passage in the passage hole 406 by separating the valve body disc 441 from the valve seat part 395. The support disc 374 suppresses deformation of the disc valve 352 in an opening direction beyond a predetermined amount by coming into contact with the disc valve 352.

The disc valve 354 is provided between the valve seat member 353 and the deformation suppression part 355. The disc valve 354 includes a valve body disc 451 and a spring disc 452. The valve body disc 451 comes into contact with the valve seat part 399 to close a passage in the passage hole 416. The spring disc 452 urges the valve body disc 451 in a direction of the valve seat part 399. The disc valve 354 opens the passage in the passage hole 416 by separating the valve body disc 451 from the valve seat part 399. The deformation suppression part 355 suppresses deformation of the disc valve 354 in an opening direction beyond a predetermined amount by coming into contact with the disc valve 354.

In the shock absorber 1F, passages in a plurality of passage holes 37 and an annular recessed part 38 of the piston 18, a throttle flow path 76A of the throttle flow path forming part 77A, the rod passage 75F of the piston rod 21F, a passage in the large diameter hole portion 392, the passage groove 421, and the passage hole 416 of the valve seat member 353, the gap between the valve body disc 451 and the valve seat part 399 of the valve seat member 353 generated at the time of opening, the passage in the passage hole 377 of the support disc 374, the variable chamber 121F, the variable chamber 122F, the passages in the passage holes 363 of the cap member 351, the passage in the passage groove 425 and the passage hole 406 of the valve seat member 353, and the gap between the valve body disc 441 and the valve seat part 395 of the valve seat member 353 generated at the time of opening constitute a second passage 141F that is parallel to first passages 131 and 132.

In the second passage 141F, the throttle flow path 76A of the throttle flow path forming part 77A, the rod passage 75F of the piston rod 21F, a passage in the large diameter hole portion 392, the passage groove 421, and the passage hole 416 of the valve seat member 353, the gap between the valve body disc 451 and the valve seat part 399 of the valve seat member 353 generated at the time of opening, the passage in the passage hole 377 of the support disc 374, the variable chamber 121F, the variable chamber 122F, the passages in the passage holes 363 of the cap member 351, the passage in the passage groove 425 and the passage hole 406 of the valve seat member 353, and the gap between the valve body disc 441 and the valve seat part 395 of the valve seat member 353 generated at the time of opening serve as a parallel passage 142F that is parallel to the first passage 131.

The second passage 141F includes the rod passage 75F of the piston rod 21F. The second passage 141F is provided in the piston rod 21F. The parallel passage 142F, the frequency sensitive part 72F, the valve seat part 399, and the disc valve 354 are provided in the second passage 141F, and constitute an extension-side second damping force generation mechanism 145F that generates a damping force in parallel with a first damping force generation mechanism 41. The parallel passage 142F, the frequency sensitive part 72F, the valve seat part 395, and the disc valve 352 are provided in the second passage 141F, and constitute a compression-side second damping force generation mechanism 145G that generates a damping force in parallel with a first damping force generation mechanism 42. The second damping force generation mechanisms 145F and 145G each include the throttle flow path 76A and the frequency sensitive part 72F. The valve seat member 353 is fixed to the piston rod 21F and forms a part of the second passage 141F.

An operation of the frequency sensitive part 72F is as follows.

That is, in an extension stroke in which a piston frequency is low, at the beginning of the stroke, a volume of an oil fluid entering the variable chamber 121F from a first chamber 19 through the second passage 141F is large, and an amount of deformation of the partition disc 372 is large. Therefore, the partition disc 372 elastically deforms to the bottom part 361 side and stops. Then, it becomes a state in which the oil fluid is not introduced into the variable chamber 121F thereafter. Thereby, the oil fluid from the first chamber 19 flows from the first passage 131 into a second chamber 20 via a fixed orifice 52 in a low-speed region of the piston.

In a medium-speed region of the piston, the oil fluid flows from the second passage 141F into the second chamber 20 by opening the disc valve 354 of the second damping force generation mechanism 145F.

In a high-speed region of the piston, the oil fluid flows from the first passage 131 into the second chamber 20 by opening the disc valve 51 in addition to the flow from the second passage 141F due to the opening of the disc valve 354.

In the extension stroke in which the piston frequency is high, the volume of the oil fluid entering the variable chamber 121F from the first chamber 19 through the second passage 141F is small, and the amount of deformation of the partition disc 372 is small. Therefore, the oil fluid flowing out from the first chamber 19 can be absorbed by the variable chamber 121F. Thereby, an amount of the oil fluid flowing from the first chamber 19 to the second chamber 20 through the fixed orifice 52, an amount of the oil fluid flowing from the first chamber 19 to the second chamber 20 by opening the disc valve 354, and an amount of the oil fluid flowing from the first chamber 19 to the second chamber 20 by opening the disc valve 354 and the disc valve 51 as described above reduce. Therefore, the fixed orifice 52, the disc valve 354, and the disc valve 51 generate a softer damping force than that when the piston frequency is low.

In a compression stroke in which the piston frequency is low, at the beginning of the stroke, a volume of the oil fluid entering the variable chamber 122F from the second chamber 20 through the passage holes 363 of the second passage 141F is large, and the amount of deformation of the partition disc 372 is large. Therefore, the partition disc 372 elastically deforms to the support disc 374 side and stops. Then, it becomes a state in which the oil fluid is not introduced into the variable chamber 122F thereafter. Thereby, the oil fluid from the second chamber 20 flows from the first passage 132 into the first chamber 19 via the fixed orifice 62 in the low-speed region of the piston.

In the medium-speed region of the piston, the oil fluid flows from the second passage 141F into the first chamber 19 by opening the disc valve 352 of the second damping force generation mechanism 145G.

In the high-speed region of the piston, the oil fluid flows from the first passage 132 into the first chamber 19 by opening the disc valve 61 in addition to the flow from the second passage 141F due to the opening of the disc valve 352.

In the compression stroke in which the piston frequency is high, the volume of the oil fluid entering the variable chamber 122F from the second chamber 20 through the passages in the passages holes 363 is small, and the amount of deformation of the partition disc 372 is small. Therefore, the oil fluid flowing out from the second chamber 20 can be absorbed by the variable chamber 122F. Thereby, an amount of the oil fluid flowing from the second chamber 20 to the first chamber 19 through the fixed orifice 62, an amount of the oil fluid flowing from the second chamber 20 to the first chamber 19 by opening the disc valve 352, and an amount of the oil fluid flowing from the second chamber 20 to the first chamber 19 by opening the disc valve 352 and the disc valve 61 as described above reduce, and therefore, the disc valve 61 generates a softer damping force than that when the piston frequency is low.

Also in the sixth embodiment, a throttle disc 161A of the throttle flow path forming part 77A has a relationship between a notch part 171A thereof and the groove part 211F set in the same manner as that in the throttle disc 161A of the third embodiment. Therefore, a flow path area of the throttle flow path 76A is formed to be constant regardless of an attachment position of the throttle disc 161A in the circumferential direction with respect to the mounting shaft part 28F of the piston rod 21F.

Seventh Embodiment

Next, a seventh embodiment will be described mainly on the basis of FIG. 25, focusing on differences from the sixth embodiment. Further, parts common to those in the sixth embodiment will be denoted by the same terms and the same reference signs.

Figure 25:
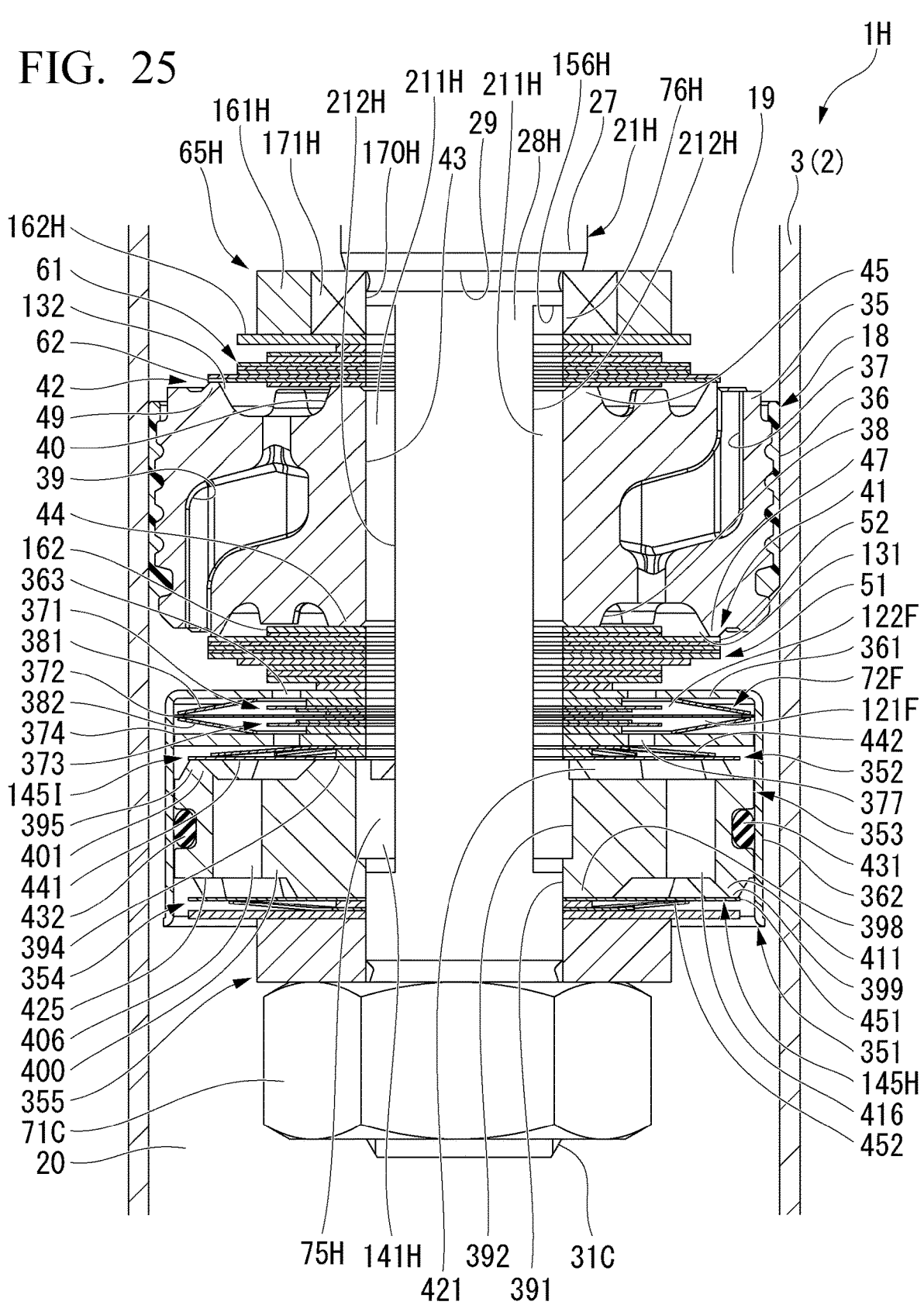
FIG. 25 is a partial cross-sectional view illustrating the vicinity of a piston of a shock absorber according to a seventh embodiment of the present invention.

As illustrated in FIG. 25, in a shock absorber 1H of the seventh embodiment, a piston rod 21H is partially different from the piston rod 21F. Specifically, a mounting shaft part 28H is partially different from the mounting shaft part 28F. The mounting shaft part 28H is different in that a rod passage 75H having a length in an axial direction of the mounting shaft part 28H larger than that of the rod passage 75F is provided.

The rod passage 75H is formed of two groove parts 211H. The groove parts 211H are formed by changing the two groove parts 211F to extend a length in the axial direction of the mounting shaft part 28H. In each of the groove parts 211H, a bottom surface 212H and an opening 156H also have a length in the axial direction of the mounting shaft part 28H smaller than that of the bottom surface 212F and the opening 156F. The two groove parts 211H are also aligned in position in the axial direction of the mounting shaft part 28H.

In the shock absorber 1H of the seventh embodiment, a deformation suppression part 65H that is partially different from the deformation suppression part 65 of the sixth embodiment is provided. An end portion of the rod passage 75H on a shaft step part 29 side in the axial direction of the mounting shaft part 28H extends to a position of the deformation suppression part 65H. A throttle flow path 76H that allows a first chamber 19 to communicate with the rod passage 75H is formed in the deformation suppression part 65H.

A plurality of, specifically two, discs 162 are provided in the shock absorber 1H of the seventh embodiment instead of the throttle flow path forming part 77A of the sixth embodiment. In other words, one more disc 162 is provided instead of the throttle disc 161A of the sixth embodiment.

In the shock absorber 1H, the throttle flow path 76H of the deformation suppression part 65H, the rod passage 75H of the piston rod 21H, passages in a large diameter hole portion 392 of a valve seat member 353, a passage groove 421, and a passage hole 416, a gap between a valve body disc 451 and a valve seat part 399 of the valve seat member 353 generated at the time of opening, a passage in a passage hole 377 of a support disc 374, a variable chamber 121F, a variable chamber 122F, a passage in a passage hole 363 of a cap member 351, passages in a passage groove 425 and a passage hole 406 of the valve seat member 353, and a gap between a valve body disc 441 and a valve seat part 395 of the valve seat member 353 at the time of opening constitute a second passage 141H that is parallel to first passages 131 and 132.

The second passage 141H includes the rod passage 75H of the piston rod 21H. The second passage 141H is provided in the piston rod 21H. The throttle flow path 76H, a frequency sensitive part 72F, the valve seat part 399, and a disc valve 354 are provided in the second passage 141H, and constitute an extension-side second damping force generation mechanism 145H that generates a damping force in parallel with a first damping force generation mechanism 41. The throttle flow path 76H, the frequency sensitive part 72F, the valve seat part 395, and a disc valve 352 are provided in the second passage 141H, and constitute a compression-side second damping force generation mechanism 145I that generates a damping force in parallel with a first damping force generation mechanism 42. The second damping force generation mechanisms 145H and 145I each include the throttle flow path 76H and the frequency sensitive part 72F. The valve seat member 353 is fixed to the piston rod 21F to form a part of the second passage 141H.

The shock absorber 1H has the second passage 141H that is partially different from the second passage 141F, but an operation thereof is similar to that of the shock absorber 1F of the sixth embodiment.

The deformation suppression part 65H includes a washer 161H (throttle member, throttle valve) and the disc 162H. The washer 161H is fitted on the mounting shaft part 28H of the piston rod 21H and is in contact with the shaft step part 29 of the piston rod 21H. The disc 162H is fitted on the mounting shaft part 28H of the piston rod 21H and is in contact with a side of the washer 161H opposite to the shaft step part 29 in the axial direction (thickness direction). The washer 161H has a larger thickness and higher rigidity than the disc 162H. The shaft step part 29 has a constant inner diameter over the entire circumference, a constant outer diameter over the entire circumference, and a constant radial width over the entire circumference.

Both the washer 161H and the disc 162H have a bored disc shape fitted on the mounting shaft part 28H. A notch part 171H is formed in the washer 161H. The notch part 171H extends radially outward from an inner circumferential end edge portion 170H fitted on the mounting shaft part 28H to a predetermined intermediate position in a radial direction. The notch part 171H also has a notch shape in which an outer circumferential side of the washer 161H in the radial direction is wider than an inner circumferential side thereof. The washer 161H has a constant outer diameter over the entire circumference. A plurality of notch parts 171H having the same shape are formed in the washer 161H at regular intervals in the circumferential direction. All the notch parts 171H extend to an outer side of the shaft step part 29 in the radial direction of the washer 161H. Therefore, the shaft step part 29 covers and closes a part of each notch part 171H on an inner side in the radial direction of the washer 161H from a side opposite to the disc 162H in the axial direction for all the notch parts 171H of the washer 161H. For all the notch parts 171H, the washer 161H allows a part of each notch part 171H on an outer side in the radial direction of the washer 161H to communicate with the first chamber 19.

The disc 162H has a constant inner diameter over the entire circumference, a constant outer diameter over the entire circumference, and a constant radial width over the entire circumference. The disc 162H has an inner diameter equal to a minimum inner diameter of the washer 161H and an outer diameter larger than an outer diameter of the washer 161H. Therefore, the disc 162H covers and closes each notch part 171H in its entirety from a side opposite to the shaft step part 29 in the axial direction for all the notch parts 171H of the washer 161H.

The washer 161H, together with the shaft step part 29 and the disc 162H, forms the throttle flow path 76H. The washer 161H is provided in the second damping force generation mechanisms 145H and 145I including the throttle flow path 76H. The washer 161H has the plurality of notch parts 171H at substantially regular intervals in the circumferential direction. The washer 161H is a throttle valve that forms the throttle flow path 76H in the second passage 141H due to the notch parts 171H. In the axial direction of the mounting shaft part 28H of the piston rod 21H, the washer 161H, that is, the throttle flow path 76H, overlaps the groove parts 211H in axial position. Thereby, the throttle flow path 76H communicates with the rod passage 75H.

Also in the seventh embodiment, the washer 161H has a relationship between the notch part 171H thereof and the groove part 211H set in the same manner as that in the throttle disc 161B of the third embodiment. Therefore, a flow path area of the throttle flow path 76H is formed to be constant regardless of an attachment position of the washer 161H in the circumferential direction with respect to the mounting shaft part 28H of the piston rod 21H.

Eighth Embodiment

Next, an eighth embodiment will be described mainly on the basis of FIG. 26, focusing on differences from the sixth embodiment. Further, parts common to those in the sixth embodiment will be denoted by the same terms and the same reference signs.

Figure 26:
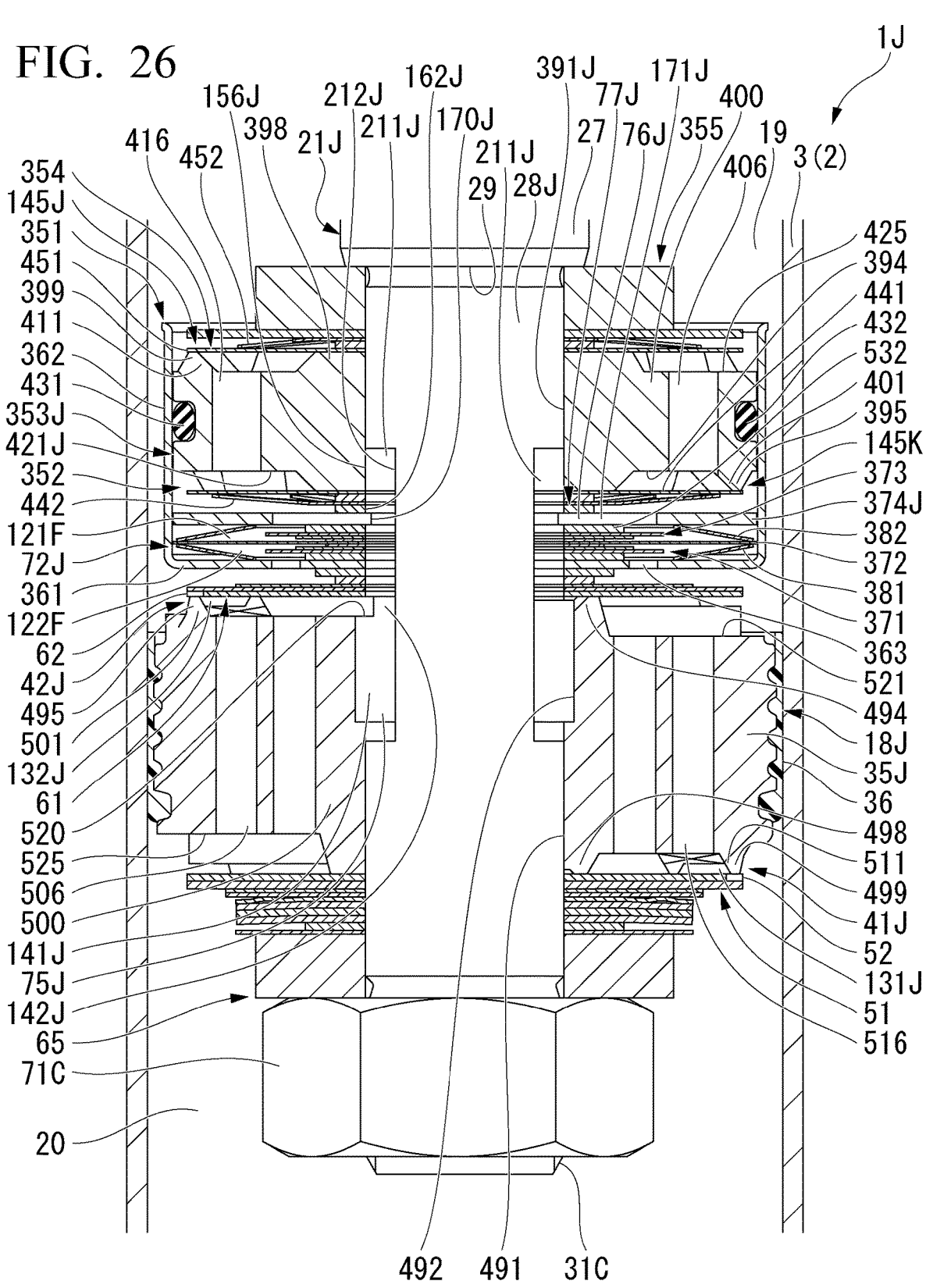
FIG. 26 is a partial cross-sectional view illustrating the vicinity of a piston of a shock absorber according to an eighth embodiment of the present invention.

As illustrated in FIG. 26, in a shock absorber 1J of the eighth embodiment, a piston rod 21J is partially different from the piston rod 21F. Specifically, a mounting shaft part 28J is partially different from the mounting shaft part 28F. Similarly to the rod passage 75F, a rod passage 75J in which an axial position of the mounting shaft part 28J is shifted to a shaft step part 29 side with respect to the rod passage 75F is provided in the mounting shaft part 28J.

The rod passage 75J is formed of two groove parts 211J. Similarly to the two groove parts 211F, the groove parts 211J are configured such that the axial position of the mounting shaft part 28J is shifted to the shaft step part 29 side with respect to the groove parts 211F. The groove parts 211J each have a bottom surface 212J and an opening 156J in which positions thereof in the axial direction of the mounting shaft part 28J are also shifted to the shaft step part 29 side with respect to the bottom surface 212F and the opening 156F. The two groove parts 211J are also aligned in position in the axial direction of the mounting shaft part 28J.

In the shock absorber 1J of the eighth embodiment, a piston 18J is partially different from the piston 18. A piston main body 35J of the piston 18J differs from the piston main body 35. In the piston main body 35J, a small diameter hole portion 491 on one side in the axial direction and a large diameter hole portion 492 on the other side in the axial direction having a larger diameter than the small diameter hole portion 491, into which the mounting shaft part 28J is fitted, have a bored disc shape formed at a center in the radial direction.

The piston main body 35J includes an inner seat part 494 having an annular shape to surround the large diameter hole portion 492 at an end portion on the large diameter hole portion 492 side in the axial direction, and a valve seat part 495 extending outward in a radial direction from the inner seat part 494. Also, the piston main body 35J includes an inner seat part 498 having an annular shape to surround the small diameter hole portion 491 at an end portion on the small diameter hole portion 491 side on a side opposite to the large diameter hole portion 492 in the axial direction. The piston main body 35J includes a valve seat part 499 extending outward in the radial direction from the inner seat part 498. The piston main body 35J includes a bored disc-shaped main body part 500 at a portion between the inner seat part 494 and the valve seat part 495, and the inner seat part 498 and the valve seat part 499 in the axial direction.

The inner seat part 494 protrudes to one side in the axial direction of the main body part 500 from an inner circumferential edge portion of the main body part 500 on the large diameter hole portion 492 side in the axial direction. The valve seat part 495 also protrudes from the main body part 500 to the same side as the inner seat part 494 in the axial direction of the main body part 500 at an outer side of the inner seat part 494 in the radial direction.

The valve seat part 495 is a deformed seat having a petal shape and includes a plurality of valve seat constituent parts 501 having the same shape. Inner end portions of the valve seat constituent parts 501 in the radial direction of the piston main body 35J are connected to the inner seat part 494, thereby forming a frame shape together with the inner seat part 494. The valve seat constituent parts 501 are disposed at regular intervals in the circumferential direction of the piston main body 35J. A plurality of passage holes 506 penetrating the main body part 500 in an axial direction thereof are formed at inner positions of all the valve seat constituent parts 501.

The valve seat part 499 also is a deformed seat having a petal shape and includes a plurality of valve seat constituent parts 511 having the same shape. Inner end portions of the valve seat constituent parts 511 in the radial direction of the piston main body 35J are connected to the inner seat part 498, thereby forming a frame shape together with the inner seat part 498. The valve seat constituent parts 511 are disposed at regular intervals in the circumferential direction of the piston main body 35J. A plurality of passage holes 516 penetrating the main body part 500 in the axial direction are formed at inner positions of all the valve seat constituent parts 511.

A disposition pitch of the plurality of valve seat constituent parts 501 in the circumferential direction of the piston main body 35J is the same as a disposition pitch of the plurality of valve seat constituent parts 511 in the circumferential direction of the piston main body 35J. The valve seat constituent parts 501 and the valve seat constituent parts 511 are shifted from each other by half a pitch. Then, the passage holes 506 are each disposed between the valve seat constituent parts 511 adjacent to each other in the circumferential direction of the piston main body 35J. Therefore, the passage holes 506 are disposed outside a range of the valve seat part 499. The passage holes 516 are each disposed between the valve seat constituent parts 501 adjacent to each other in the circumferential direction of the piston main body 35J. Therefore, the passage holes 516 are disposed outside a range of the valve seat part 495.

A passage groove 520 traversing the inner seat part 494 in the radial direction is formed in the piston main body 35J. The passage groove 520 communicates with the inside of the valve seat constituent part 501. The passage groove 520 allows the passage holes 506 and the large diameter hole portion 492 to communicate with each other. The piston main body 35J has a passage groove 521 formed between the valve seat constituent parts 501 adjacent to each other in the circumferential direction of the piston main body 35J. The passage holes 516 open to a bottom surface of the passage groove 521. Therefore, the passage groove 521 communicates with the passage holes 516. The piston main body 35J has a passage groove 525 between the valve seat constituent parts 511 adjacent to each other in the circumferential direction of the piston main body 35J. The passage holes 506 open to a bottom surface of the passage groove 525. Therefore, passage groove 525 communicates with passage holes 506.

A disc valve 61 is provided on a first chamber 19 side of the piston 18J. A disc valve 51 is provided on a second chamber 20 side of the piston 18J. The disc valve 61 closes the passage holes 506 by coming into contact with the valve seat part 495 of the piston 18J, and opens the passage holes 506 by separating from the valve seat part 495. Passages in the passage groove 525 and the passage holes 506 of the piston 18J and a space between the disc valve 61 and the valve seat part 495 generated at the time of opening constitute a first passage 132J. The disc valve 61 and the valve seat part 495 are provided in the first passage 132J and constitute a compression-side first damping force generation mechanism 42J that opens and closes the first passage 132J. The first damping force generation mechanism 42J includes a fixed orifice 62.

The disc valve 51 closes the passage holes 516 by coming into contact with the valve seat part 499 of the piston 18J, and opens the passage holes 516 by separating from the valve seat part 499. Passages in the passage groove 521 and the passage holes 516 of the piston 18J and a space between the disc valve 51 and the valve seat part 499 generated at the time of opening constitute a first passage 131J. The disc valve 51 and the valve seat part 499 constitute an extension-side first damping force generation mechanism 41J. The first damping force generation mechanism 41J is provided in the first passage 131J to open and close the first passage 131J. The first damping force generation mechanism 41J includes a fixed orifice 52. On a side of the disc valve 51 opposite to the piston 18J, a deformation suppression part 65 similar to that of the sixth embodiment is provided in a direction axially reversed with respect to the deformation suppression part 65 in the sixth embodiment.

In the shock absorber 1J of the eighth embodiment, a deformation suppression part 355 similar to that of the sixth embodiment is provided on a side closest to the shaft step part 29 on the mounting shaft part 28J in a direction axially reversed with respect to the deformation suppression part 355 in the sixth embodiment. Also, on a side of the deformation suppression part 355 opposite to the shaft step part 29, a disc valve 354 similar to that of the sixth embodiment is provided in an axially reversed direction with respect to the disc valve 354 in the sixth embodiment.

A valve seat member 353J that is partially different from the valve seat member 353 of the sixth embodiment is provided on a side of the disc valve 354 opposite to the deformation suppression part 355. The valve seat member 353J is also provided on the mounting shaft part 28J in a direction axially reversed with respect to the valve seat member 353. In the valve seat member 353J, the large diameter hole portion 392 is not provided, but a fitting hole portion 391J into which the mounting shaft part 28J is fitted is provided. Also, a passage groove 421J having a length that does not penetrate an inner seat part 394 in the radial direction with respect to the passage groove 421 is formed in the valve seat member 353J. The passage groove 421J is a portion between valve seat constituent parts 401 adjacent to each other in the circumferential direction of the valve seat member 353J. Also, on a side of the valve seat member 353J opposite to the disc valve 354, a disc valve 352 similar to that of the sixth embodiment is provided in a direction axially reversed with respect to the disc valve 352 in the sixth embodiment. A disc 162J is provided on a side of the disc valve 352 opposite to the valve seat member 353J.

A frequency sensitive part 72J that is partially different from the frequency sensitive part 72F of the sixth embodiment is provided on a side of the disc 162J opposite to the disc valve 352. The frequency sensitive part 72J is also provided on the mounting shaft part 28J in a direction axially reversed with respect to the frequency sensitive part 72F. Instead of the support disc 374, a support disc 374J (throttle member, throttle valve) that is partially different from that is provided in the frequency sensitive part 72J. The support disc 374J, together with the disc 162J adjacent to one side thereof in the axial direction and a disc 532 of a spacer part 373 adjacent to the other side thereof in the axial direction constitute a throttle flow path forming part 77J that forms a throttle flow path 76J. The throttle flow path 76J communicates with a variable chamber 121F. Also, the throttle flow path 76J communicates with passages in the passage groove 421J and a passage hole 416 of the valve seat member 353J. A cap member 351 similar to that of the sixth embodiment is provided in a direction axially reversed with respect to the cap member 351 of the sixth embodiment by disposing a bottom part 361 on a side of the frequency sensitive part 72J opposite to the disc valve 352. The disc valve 61 is disposed on a side of the bottom part 361 of the cap member 351 opposite to the frequency sensitive part 72J.

In the shock absorber 1J, passages in the passage groove 525, the passage holes 506, the passage groove 520, and the large diameter hole portion 492 of the piston 18J, the rod passage 75J, the throttle flow path 76J of the throttle flow path forming part 77J, passages in the passage groove 421J and the passage hole 416 of the valve seat member 353J, a gap between a valve body disc 451 and a valve seat part 399 of the valve seat member 353J generated at the time of opening, the variable chamber 121F, a variable chamber 122F, a passage in a passage hole 363 of the cap member

351, passages in a passage groove 425 and a passage hole 406 of the valve seat member 353, and a gap between a valve body disc 441 and a valve seat part 395 of the valve seat member 353J generated at the time of opening constitute a second passage 141J that is parallel to the first passages 131J and 132J.

In the second passage 141J, passages in the passage groove 520 and the large diameter hole portion 492 of the piston 18J, the rod passage 75J of the piston rod 21J, the throttle flow path 76J of the throttle flow path forming part 77J, the passages in the passage groove 421J and the passage hole 416 of the valve seat member 353J, the gap between the valve body disc 451 and the valve seat part 399 of the valve seat member 353J generated at the time of opening, the variable chamber 121F, the variable chamber 122F, the passage in the passage hole 363 of the cap member 351, passages in the passage groove 425 and the passage hole 406 of the valve seat member 353J, and the gap between the valve body disc 441 and the valve seat part 395 of the valve seat member 353J generated at the time of opening constitute a parallel passage 142J that is parallel to the first passages 131J and 132J.

The second passage 141J includes the rod passage 75J of the piston rod 21J. The second passage 141J is provided in the piston rod 21J. The parallel passage 142J, the frequency sensitive part 72J, the valve seat part 399, and the disc valve 354 are provided in the second passage 141J, and constitute a compression-side second damping force generation mechanism 145J that generates a damping force in parallel with the first damping force generation mechanism 42J. The parallel passage 142J, the frequency sensitive part 72J, the valve seat part 395, and the disc valve 352 are provided in the second passage 141J, and constitute an extension-side second damping force generation mechanism 145K that generates a damping force in parallel with the first damping force generation mechanism 41J. The second damping force generation mechanisms 145J and 145K each include the throttle flow path 76J and the frequency sensitive part 72J. The valve seat member 353J is fixed to the piston rod 21J to form a part of the second passage 141J.

The frequency sensitive part 72J operates as follows.

That is, in a compression stroke in which a piston frequency is low, at the beginning of the stroke, a volume of an oil fluid entering the variable chamber 121F from the second chamber 20 through the second passage 141J is large, and an amount of deformation of a partition disc 372 is large. Therefore, the partition disc 372 elastically deforms to the bottom part 361 side and stops. Then, it becomes a state in which the oil fluid is not introduced into the variable chamber 121F thereafter. Thereby, the oil fluid from the second chamber 20 flows from the first passage 132J into the first chamber 19 via the fixed orifice 62 in a low-speed region of the piston.

In a medium-speed region of the piston, the oil fluid flows from the second passage 141J into the first chamber 19 by opening the disc valve 354 of the second damping force generation mechanism 145J.

In a high-speed region of the piston, the oil fluid flows from the first passage 132J into the first chamber 19 by opening the disc valve 61 in addition to the flow from the second passage 141J due to the opening of the disc valve 354.

In the compression stroke in which the piston frequency is high, a volume of the oil fluid entering the variable chamber 121F from the second chamber 20 through the second passage 141J is small, and the amount of deformation of the partition disc 372 is small. Therefore, the oil fluid flowing out from the second chamber 20 can be absorbed by the variable chamber 121F. Thereby, an amount of the oil fluid flowing from the second chamber 20 to the first chamber 19 through the fixed orifice 62, an amount of the oil fluid flowing from the second chamber 20 to the first chamber 19 by opening the disc valve 354, and an amount of the oil fluid flowing from the second chamber 20 to the first chamber 19 by opening the disc valve 354 and the disc valve 61 as described above reduce. Therefore, the fixed orifice 62, the disc valve 354, and the disc valve 61 generate a softer damping force than that when the piston frequency is low.

In an extension stroke in which the piston frequency is low, at the beginning of the stroke, a volume of the oil fluid entering the variable chamber 122F from the first chamber 19 through a passage in the passage hole 363 of the bottom part 361 constituting the second passage 141K is large, and the amount of deformation of the partition disc 372 is large. Therefore, the partition disc 372 elastically deforms to the support disc 374J side and stops. Then, it becomes a state in which the oil fluid is not introduced into the variable chamber 122F thereafter. Thereby, the oil fluid from the first chamber 19 flows into the second chamber 20 via the fixed orifice 52 in the low-speed region of the piston.

In the medium-speed region of the piston, the oil fluid flows from the second passage 141J into the second chamber 20 by opening the disc valve 352 of the second damping force generation mechanism 145K.

In a high-speed region of the piston, the oil fluid flows from the first passage 131J into the second chamber 20 by opening the disc valve 51 in addition to the flow from the second passage 141J due to the opening of the disc valve 352.

In the extension stroke in which the piston frequency is high, the volume of the oil fluid entering the variable chamber 122F from the first chamber 19 is small, and the amount of deformation of the partition disc 372 is small. Therefore, the oil fluid flowing out from the first chamber 19 can be absorbed by the variable chamber 122F. Thereby, an amount of the oil fluid flowing from the first chamber 19 to the second chamber 20 through the fixed orifice 52, and an amount of the oil fluid flowing from the first chamber 19 to the second chamber 20 by opening the disc valve 352 and the disc valve 51 reduce, and therefore, the fixed orifice 52, the disc valve 352, and the disc valve 51 generate a softer damping force than that when the piston frequency is low.

The support disc 374J, the disc 162J, and the disc 532 that form the throttle flow path 76J all have a bored disc shape fitted on the mounting shaft part 28J. A notch part 171J is formed in the support disc 374J. The notch part 171J extends radially outward from an inner circumferential end edge portion 170J fitted on the mounting shaft part 28J to a predetermined intermediate position in the radial direction. The notch part 171J also has a notch shape in which an outer circumferential side of the support disc 374 in the radial direction is wider than an inner circumferential side thereof. The support disc 374J has a constant outer diameter over the entire circumference. A plurality of notch parts 171J having the same shape are formed in the support disc 374J at regular intervals in the circumferential direction.

The disc 162J has a constant inner diameter over the entire circumference, a constant outer diameter over the entire circumference, and a constant radial width over the entire circumference. The disc 162J has an inner diameter equal to a minimum inner diameter of the support disc 374J. The disc 532 has a constant inner diameter over the entire circumference, a constant outer diameter over the entire circumference, and a constant radial width over the entire circumference. The disc 532 has an inner diameter equal to a minimum inner diameter of the support disc 374J.

All the notch parts 171J extend to an outer side of the disc 162J and the disc 532 in the radial direction of the support disc 374J. Therefore, the disc 162J covers and closes a part of each notch part 171J on an inner side in the radial direction of the support disc 374J from a side opposite to the disc 532 in the axial direction for all the notch parts 171J of the support disc 374J. Also, the disc 532 covers and closes a part of each notch part 171J on an inner side in the radial direction of the support disc 374J from a side opposite to the disc 162J in the axial direction for all the notch parts 171J of the support disc 374J.

All the notch parts 171J each allow a part thereof on an outer side in the radial direction of the support disc 374J to communicate with the passages in the passage groove 421J and the passage hole 416 via a space between the support disc 374J and the valve seat member 353. Also, all the notch parts 171J each allow a part thereof on an outer side in the radial direction of the support disc 374J to also communicate with the variable chamber 121F.

The support disc 374J, together with the disc 162J and the disc 532, form the throttle flow path 76J. The support disc 374J is provided in the second damping force generation mechanisms 145J and 145K including the throttle flow path 76J. The support disc 374J has the plurality of notch parts 171J at substantially regular intervals in the circumferential direction. The support disc 374J is a throttle valve that forms the throttle flow path 76J in the second passage 141J due to the notch parts 171J. In the axial direction of the mounting shaft part 28J of the piston rod 21J, the support disc 374J, that is, the throttle flow path 76J, overlaps the groove parts 211J in axial position. Thereby, the throttle flow path 76J communicates with the rod passage 75J.

Then, also in the eighth embodiment, the support disc 374J has a relationship between the notch part 171J thereof and the groove part 211J set in the same manner as that in the throttle disc 161A of the third embodiment. Therefore, a flow path area of the throttle flow path 76J is formed to be constant regardless of an attachment position of the support disc 374J in the circumferential direction with respect to the mounting shaft part 28J of the piston rod 21J.

Ninth Embodiment

Next, a ninth embodiment will be described mainly on the basis of FIG. 27, focusing on differences from the sixth embodiment. Further, parts common to those in the sixth embodiment will be denoted by the same terms and the same reference signs.

Figure 27:
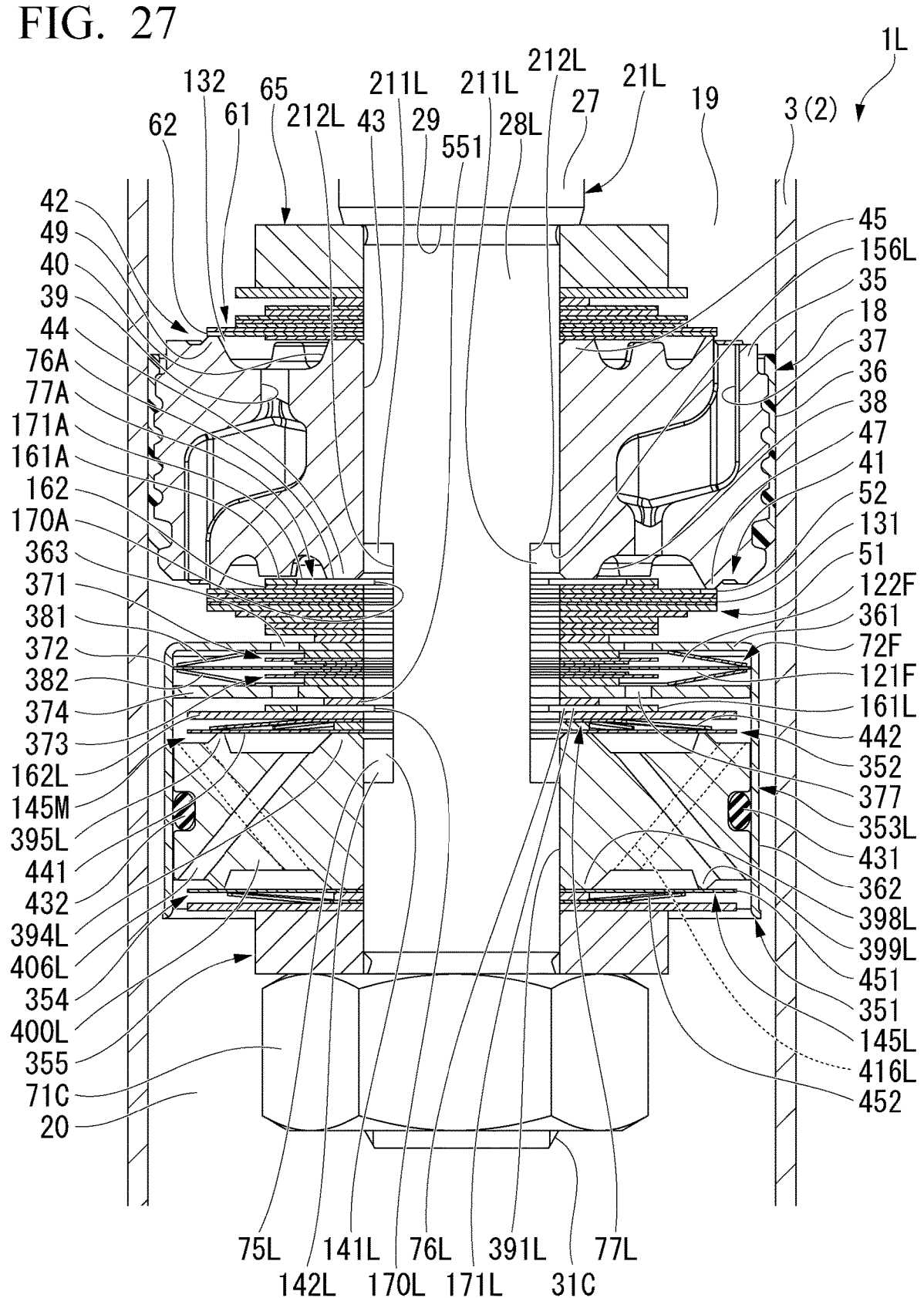
FIG. 27 is a partial cross-sectional view illustrating the vicinity of a piston of a shock absorber according to a ninth embodiment of the present invention.

As illustrated in FIG. 27, in a shock absorber 1L of the ninth embodiment, a piston rod 21L is partially different from the piston rod 21F. Specifically, a mounting shaft part 28L is partially different from the mounting shaft part 28F. Similarly to the rod passage 75F, a rod passage 75L in which an end portion position thereof on a male screw 31C side in an axial direction of the mounting shaft part 28L is shifted to a shaft step part 29 side with respect to the rod passage 75F is provided in the mounting shaft part 28L.

Similarly to the two groove parts 211F, the rod passage 75L is formed of two groove parts 211L in which end portion positions thereof on the male screw 31C side in the axial direction of the mounting shaft part 28L are shifted to the shaft step part 29 side with respect to the groove parts 211F. In each of the groove parts 211L, end portion positions of a bottom surface 212L and an opening 156L on the male screw 31C side in the axial direction of the mounting shaft part 28L are also shifted to the shaft step part 29 side with respect to the bottom surface 212F and the opening 156F. The two groove parts 211L are also aligned in position in the axial direction of the mounting shaft part 28L.

The shock absorber 1L of the ninth embodiment includes a valve seat member 353L that is partially different from the valve seat member 353. In the valve seat member 353L, a fitting hole portion 391L into which the mounting shaft part 28L is fitted is formed at a center in a radial direction. The valve seat member 353L includes, at an end portion on one side in the axial direction, an inner seat part 394L having an annular shape to surround the fitting hole portion 391L, and a valve seat part 395L having an annular shape at an outer side of the inner seat part 394L in the radial direction. Also, the valve seat member 353L includes, at an end portion on the opposite side in the axial direction, an inner seat part 398L having an annular shape to surround the fitting hole portion 391L, and a valve seat part 399L having an annular shape at an outer side of the inner seat part 398L in the radial direction. The valve seat member 353L includes a bored disc-shaped main body part 400L at a portion between the inner seat part 394L and the valve seat part 395L, and the inner seat part 398L and the valve seat part 399L in the axial direction.

A plurality of passage holes 406L are formed in the main body part 400L. The passage holes 406L each linearly penetrate the main body part 400L to be inclined with respect to an axial direction thereof so that a radial position between the inner seat part 394L and the valve seat part 395L on one side in the axial direction is connected to a radial position on an outer side of the valve seat part 399L on the other side in the axial direction. A plurality of passage holes 416L are formed in the main body part 400L. The passage holes 416L each linearly penetrate the main body part 400L to be inclined with respect to an axial direction thereof so that a radial position between the inner seat part 398L and the valve seat part 399L on the other side in the axial direction is connected to a radial position on an outer side of the valve seat part 395L on one side in the axial direction.

A disc valve 352 closes passages in the passage holes 406L when a valve body disc 441 comes into contact with the valve seat part 395L, and opens the passages in the passage holes 406L when the valve body disc 441 separates from the valve seat part 395L.

A disc valve 354 closes passages in the passage holes 416L when a valve body disc 451 comes into contact with the valve seat part 399L, and opens the passages in the passage holes 416L when the valve body disc 451 separates from the valve seat part 399L.

In the shock absorber 1L of the ninth embodiment, a throttle flow path forming part 77L that forms a throttle flow path 76L communicating with the rod passage 75L is provided between a support disc 374 and the disc valve 352 of a frequency sensitive part 72F.

In the shock absorber 1L, passages in a plurality of passage holes 37 and an annular recessed part 38 of the piston 18, a throttle flow path 76A of a throttle flow path forming part 77A, the rod passage 75L of the piston rod 21L, the throttle flow path 76L of the throttle flow path forming part 77L, the passages in the passage holes 416L of the valve seat member 353L, a gap between the valve body disc 451 and the valve seat part 399L of the valve seat member 353L generated at the time of opening, a passage in a passage hole 377 of the support disc 374, a variable chamber 121F, a variable chamber 122F, a passage in a passage hole 363 of a cap member 351, the passages in the passage holes 406L of the valve seat member 353L, and a gap between the valve body disc 441 and the valve seat part 395L of the valve seat member 353L generated at the time of opening constitute a second passage 141L that is parallel to first passages 131 and 132.

In the second passage 141L, the throttle flow path 76A of the throttle flow path forming part 77A, the rod passage 75L of the piston rod 21L, the throttle flow path 76L of the throttle flow path forming part 77L, the passages in the passage holes 416L of the valve seat member 353L, the gap between the valve body disc 451 and the valve seat part 399L of the valve seat member 353L generated at the time of opening, the passage in the passage hole 377 of the support disc 374, the variable chamber 121F, the variable chamber 122F, the passage in the passage hole 363 of the cap member 351, the passages in the passage holes 406L of the valve seat member 353L, and the gap between the valve body disc 441 and the valve seat part 395L of the valve seat member 353L generated at the time of opening constitute a parallel passage 142L that is parallel to the first passage 131.

The second passage 141L includes the rod passage 75L of the piston rod 21L. The second passage 141L is provided in the piston rod 21L. The parallel passage 142L, the frequency sensitive part 72F, the valve seat part 399L, and the disc valve 354 are provided in the second passage 141L, and constitute an extension-side second damping force generation mechanism 145L that generates a damping force in parallel with a first damping force generation mechanism 41. The parallel passage 142L, the frequency sensitive part 72F, the valve seat part 395L, and the disc valve 352L are provided in the second passage 141L, and constitute a compression-side second damping force generation mechanism 145M that generates a damping force in parallel with a first damping force generation mechanism 42. The second damping force generation mechanisms 145L and 145M each include the throttle flow paths 76A and 76L and the frequency sensitive part 72F. The valve seat member 353L is fixed to the piston rod 21L to form a part of the second passage 141L.

The shock absorber 1L has the second passage 141L that is partially different from the second passage 141F, but an operation thereof is similar to that of the shock absorber 1F of the sixth embodiment.

In the shock absorber 1L of the ninth embodiment, the throttle flow path forming part 77L includes a disc 551 that is in contact with the support disc 374, a throttle disc 161L (throttle member, throttle valve) that is in contact with a side of the disc 551 opposite to the support disc 374, and a disc 162L that in contact with a side of the throttle disc 161L opposite to the disc 551.

The disc 551, the throttle disc 161L, and the disc 162L all have a bored disc shape fitted on the mounting shaft part 28L. The disc 551 has a constant inner diameter over the entire circumference, a constant outer diameter over the entire circumference, and a constant radial width over the entire circumference. The disc 551 has an inner diameter equal to a minimum inner diameter of the throttle disc 161L and an outer diameter smaller than an outer diameter of the throttle disc 161L.

A notch part 171L is formed in the throttle disc 161L. The notch part 171L extends radially outward from an inner circumferential end edge portion 170L fitted on the mounting shaft part 28L to a predetermined intermediate position in the radial direction. The notch part 171L also has a notch shape in which an outer circumferential side of the throttle disc 161L in the radial direction is wider than an inner circumferential side thereof. The throttle disc 161L has a constant outer diameter over the entire circumference. A plurality of notch parts 171L having the same shape are formed in the throttle disc 161L at regular intervals in the circumferential direction thereof. All the notch parts 171L extend to an outer side of the disc 551 in the radial direction of the throttle disc 161L. Therefore, the disc 551 covers and closes a part of each notch part 171L on an inner side in the radial direction of the throttle disc 161L from a side opposite to the disc 162L in the axial direction for all the notch parts 171L of the throttle disc 161L. For all the notch parts 171L, the throttle disc 161L allows a part of each notch part 171L on an outer side in the radial direction of the throttle disc 161L to communicate with the passages in the passage holes 416L and the variable chamber 121F.

The disc 162L has a constant inner diameter over the entire circumference, a constant outer diameter over the entire circumference, and a constant radial width over the entire circumference. The disc 162L has an inner diameter equal to a minimum inner diameter of the throttle disc 161L and an outer diameter larger than an outer diameter of the throttle disc 161L. Therefore, the disc 162L covers and closes each notch part 171L in its entirety from a side opposite to the disc 551 in the axial direction for all the notch parts 171L of the throttle disc 161L. The disc 162L suppresses deformation of the disc valve 352 in an opening direction beyond a predetermined amount by coming into contact with the disc valve 352.

The throttle disc 161L, together with the discs 162L and 551, forms the throttle flow path 76L. Therefore, the throttle discs 161A and 161L are provided in the second damping force generation mechanisms 145L and 145M that include the throttle flow paths 76A and 76L. The throttle disc 161L has the plurality of notch parts 171L at substantially regular intervals in the circumferential direction. A throttle disc 161A is a throttle valve that forms the throttle flow path 76A in the second passage 141L due to notch parts 171A. The throttle disc 161L is a throttle valve that forms the throttle flow path 76L in the second passage 141L due to the notch parts 171L. In the axial direction of the mounting shaft part 28L of the piston rod 21L, the throttle discs 161A and 161L, that is, the throttle flow paths 76A and 76L, overlap the groove parts 211L in axial position. Thereby, the throttle flow paths 76A and 76L communicate with the rod passage 75L.

Also in the ninth embodiment, the notch parts 171A of the throttle disc 161A and 161L of the throttle disc 161L each have a relationship with the groove parts 211L set in the same manner as that of the throttle disc 161B in the third embodiment. Therefore, the throttle disc 161A is formed to have a flow path area of the throttle flow path 76A that is constant regardless of its attachment position in the circumferential direction with respect to the mounting shaft part 28L of the piston rod 21L, and the throttle disc 161L is formed to have a flow path area of the throttle flow path 76L that is constant regardless of its attachment position in the circumferential direction with respect to the mounting shaft part 28L of the piston rod 21L.

Tenth Embodiment

Next, a tenth embodiment will be described mainly on the basis of FIG. 28, focusing on differences from the ninth embodiment. Further, parts common to those in the ninth embodiment will be denoted by the same terms and the same reference signs.

Figure 28:
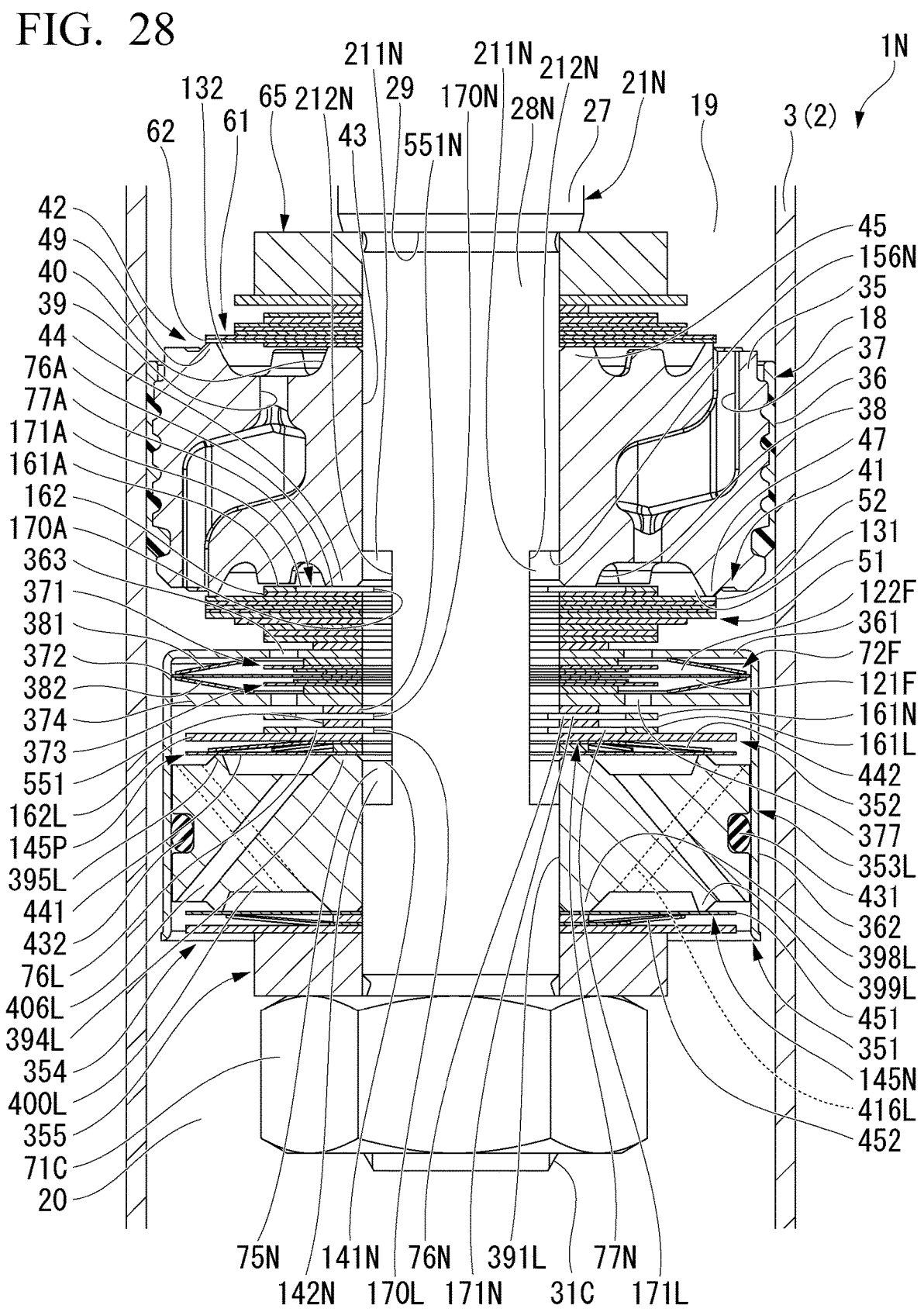
FIG. 28 is a partial cross-sectional view illustrating the vicinity of a piston of a shock absorber according to a tenth embodiment of the present invention.

As illustrated in FIG. 28, in a shock absorber 1N of the tenth embodiment, a piston rod 21N is partially different from the piston rod 21L. Specifically, a mounting shaft part 28N is partially different from the mounting shaft part 28L. The mounting shaft part 28N is slightly longer in the axial direction than the mounting shaft part 28L. Similarly to the rod passage 75L, a rod passage 75N in which an end portion position thereof on a male screw 31C side in an axial direction of the mounting shaft part 28N is slightly shifted to the male screw 31C side with respect to the rod passage 75L is provided in the mounting shaft part 28N.

The rod passage 75N is formed of two groove parts 211N in which end portion positions thereof on the male screw 31C side in the axial direction of the mounting shaft part 28N are slightly shifted to the male screw 31C side with respect to the groove parts 211L similarly to the two groove parts 211L. In each of the groove parts 211N, end portion positions of a bottom surface 212N and an opening 156N on the male screw 31C side in the axial direction of the mounting shaft part 28N are also slightly shifted to the male screw 31C side with respect to the bottom surface 212L and the opening 156L. The two groove parts 211N are also aligned in position in the axial direction of the mounting shaft part 28N.

In the shock absorber 1N of the tenth embodiment, a throttle flow path forming part 77N in which a throttle flow path 76L communicating with the rod passage 75N and a throttle flow path 76N communicating with the rod passage 75N are formed in parallel is provided between a support disc 374 and a disc valve 352.

In the shock absorber 1N, passages in a plurality of passage holes 37 and an annular recessed part 38 of a piston 18, a throttle flow path 76A of a throttle flow path forming part 77A, the rod passage 75N of the piston rod 21N, the throttle flow paths 76L and 76N of the throttle flow path forming part 77N, a passage in a passage hole 416L of a valve seat member 353L, a gap between a valve body disc 451 and a valve seat part 399L of the valve seat member 353L generated at the time of opening, a passage in a passage hole 377 of the support disc 374, a variable chamber 121F, a variable chamber 122F, a passage in a passage hole 363 of a cap member 351, a passage in a passage hole 406L of the valve seat member 353L, and a gap between a valve body disc 441 and a valve seat part 395L of the valve seat member 353L generated at the time of opening constitute a second passage 141N that is parallel to first passages 131 and 132.

In the second passage 141N, the throttle flow path 76A of the throttle flow path forming part 77A, the rod passage 75N of the piston rod 21N, the throttle flow paths 76L and 76N of the throttle flow path forming part 77N, the passage in the passage hole 416L of the valve seat member 353L, the gap between the valve body disc 451 and the valve seat part 399L of the valve seat member 353L generated at the time of opening, the passage in the passage hole 377 of the support disc 374, the variable chamber 121F, the variable chamber 122F, the passage in the passage hole 363 of the cap member 351, the passage in the passage hole 406L of the valve seat member 353L, and the gap between the valve body disc 441 and the valve seat part 395L of the valve seat member 353L generated at the time of opening constitute a parallel passage 142N that is parallel to the first passages 131.

The second passage 141N includes the rod passage 75N of the piston rod 21N. The second passage 141N is provided in the piston rod 21N. The parallel passage 142N, a frequency sensitive part 72F, the valve seat part 399L, and a disc valve 354 are provided in the second passage 141N, and constitute an extension-side second damping force generation mechanism 145N that generates a damping force in parallel with a first damping force generation mechanism 41. The parallel passage 142N, the frequency sensitive part 72F, the valve seat part 395L, and the disc valve 352 are provided in the second passage 141N, and constitute a compression-side second damping force generation mechanism 145P that generates a damping force in parallel with a first damping force generation mechanism 42. The second damping force generation mechanisms 145N and 145P each include the throttle flow paths 76A, 76L, and 76N and the frequency sensitive part 72F. The valve seat member 353L is fixed to the piston rod 21N to form a part of the second passage 141N.

The shock absorber 1N has the second passage 141N that is partially different from the second passage 141F, but an operation thereof is similar to that of the shock absorber 1F of the sixth embodiment.

In the shock absorber 1N of the tenth embodiment, the throttle flow path forming part 77N includes a disc 551N and a throttle disc 161N (throttle member, throttle valve) that form the throttle flow path 76N in addition to a disc 551, a throttle disc 161L, and a disc 162L similar to those in the ninth embodiment that form the throttle flow path 76L. The disc 551N and the throttle disc 161N are provided between the support disc 374 and the disc 551, the disc 551N is in contact with the support disc 374, and the throttle disc 161N is in contact with the disc 551. The mounting shaft part 28N and the rod passage 75N are longer than the mounting shaft part 28L and the rod passage 75L by an amount of thicknesses of the disc 551N and the throttle disc 161N.

Both the disc 551N and the throttle disc 161N have a bored disc shape fitted on the mounting shaft part 28N. The disc 551N has a constant inner diameter over the entire circumference, a constant outer diameter over the entire circumference, and a constant radial width over the entire circumference. The discs 551 and 551N each have an inner diameter equal to a minimum inner diameter of the throttle disc 161N and an outer diameter smaller than an outer diameter of the throttle disc 161N. The disc 551N can be made as a part having the same shape as the disc 551 to be compatible therewith.

A notch part 171N is formed in the throttle disc 161N. The notch part 171N extends radially outward from an inner circumferential end edge portion 170N fitted on the mounting shaft part 28N to a predetermined intermediate position in a radial direction. The notch part 171N also has a notch shape in which an outer circumferential side of the throttle disc 161N in the radial direction is wider than an inner circumferential side thereof. The throttle disc 161N has a constant outer diameter over the entire circumference. A plurality of notch parts 171N having the same shape are formed in the throttle disc 161N at regular intervals in the circumferential direction thereof. All the notch parts 171N extend to an outer side of the discs 551 and 551N in the radial direction of the throttle disc 161N. Therefore, the disc 551N covers and closes a part of each notch part 171N on an inner side in the radial direction of the throttle disc 161N from a side opposite to the disc 551 in the axial direction for all the notch parts 171N of the throttle disc 161N. Also, the disc 551 covers and closes a part of each notch part 171N on an inner side in the radial direction of the throttle disc 161N from a side opposite to the disc 551N in the axial direction for all the notch parts 171N of the throttle disc 161N. Similarly to the throttle disc 161L, the throttle disc 161N allows a part of each notch part 171N on an outer side in the radial direction of the throttle disc 161N to communicate with the passage in the passage hole 416L and the variable chamber 121F for all the notch parts 171N. The throttle disc 161N can be made as a part having the same shape as the throttle disc 161L to be compatible therewith.

The throttle discs 161A, 161L, and 161N are provided in the second damping force generation mechanisms 145N and 145P that include the throttle flow paths 76A, 76L, and 76N. The throttle disc 161N has the plurality of notch parts 171N at substantially regular intervals in the circumferential direction. The throttle disc 161N is a throttle valve that forms the throttle flow path 76N in the second passage 141N due to the notch parts 171N. In the axial direction of the mounting shaft part 28N of the piston rod 21N, the throttle discs 161A, 161L, and 161N, that is, the throttle flow paths 76A, 76L, and 76N, overlap the groove parts 211N in axial position. Thereby, the throttle flow paths 76A, 76L, and 76N communicate with the rod passage 75N.

Then, in the tenth embodiment, a relationship with the groove parts 211N is set for the notch parts 171N of the throttle disc 161N in the same manner as that of the throttle disc 161B in the third embodiment. Therefore, the throttle disc 161N is formed to have a flow path area of the throttle flow path 76N that is constant regardless of its attachment position in the circumferential direction with respect to the mounting shaft part 28N of the piston rod 21N. The same applies to the throttle discs 161A and 161L.

Eleventh Embodiment

Next, an eleventh embodiment will be described mainly on the basis of FIG. 29, focusing on differences from the ninth embodiment. Further, parts common to those in the ninth embodiment will be denoted by the same terms and the same reference signs.

Figure 29:
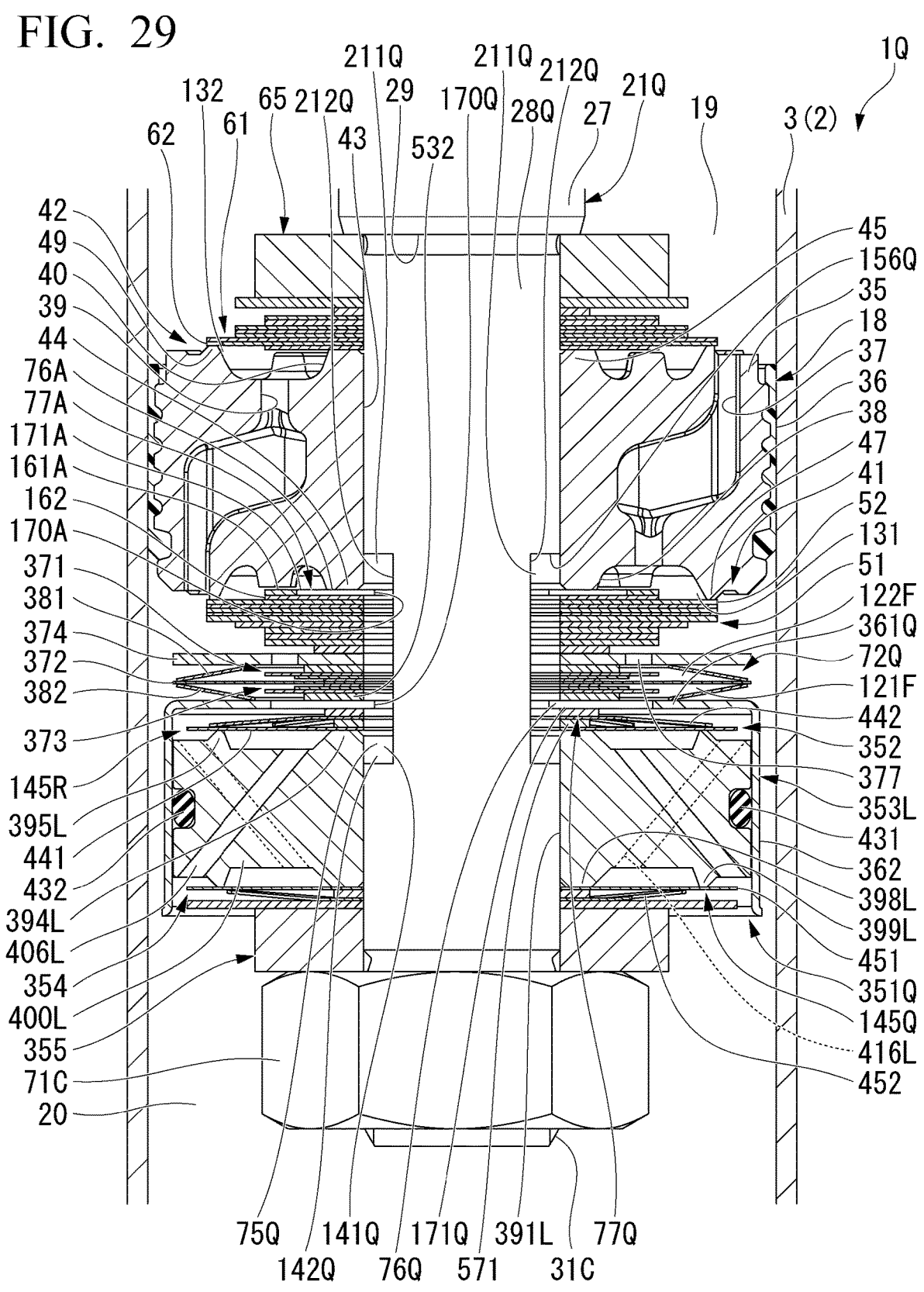
FIG. 29 is a partial cross-sectional view illustrating the vicinity of a piston of a shock absorber according to an eleventh embodiment of the present invention.

As illustrated in FIG. 29, in a shock absorber 1Q of the eleventh embodiment, a piston rod 21Q is partially different from the piston rod 21L. Specifically, a mounting shaft part 28Q is partially different from the mounting shaft part 28L. The mounting shaft part 28Q has a length in an axial direction smaller than that of the mounting shaft part 28L. Similarly to the rod passage 75L, a rod passage 75Q in which an end portion position thereof on a male screw 31C side in the axial direction of the mounting shaft part 28Q is shifted to a shaft step part 29 side with respect to the rod passage 75L is provided in the mounting shaft part 28Q.

The rod passage 75Q is formed of two groove parts 211Q in which end portion positions thereof on the male screw 31C side in the axial direction of the mounting shaft part 28Q are shifted to the shaft step part 29 side with respect to the groove parts 211L similarly to the two groove parts 211L. In each of the groove parts 211Q, end portion positions of a bottom surface 212Q and an opening 156Q on the male screw 31C side in the axial direction of the mounting shaft part 28Q are also shifted to the shaft step part 29 side with respect to the bottom surface 212L and the opening 156L. The two groove parts 211Q are also aligned in position in the axial direction of the mounting shaft part 28Q.

The shock absorber 1Q includes a cap member 351Q (throttle member, throttle valve) which differs from the cap member 351 in that a bottom part 361Q having a shape partially different from that of the bottom part 361 is provided. In the shock absorber 1Q, a frequency sensitive part 72Q is not provided inside the cap member 351Q but outside the cap member 351Q. The frequency sensitive part 72Q is provided between the disc valve 51 and the bottom part 361Q of the cap member 351Q. The frequency sensitive part 72Q is provided to have the same parts as the frequency sensitive part 72F but in a different disposition.

That is, the frequency sensitive part 72Q includes a spacer part 373, a partition disc 372, a spacer part 371, and a support disc 374 provided in that order from the bottom part 361Q side with the mounting shaft part 28Q fitted to inner sides thereof. Also, the frequency sensitive part 72Q includes a disc spring 382 provided between the bottom part 361Q and the partition disc 372, and a disc spring 381 provided between the partition disc 372 and the support disc 374. A variable chamber 122F between the partition disc 372 and the disc spring 381 communicates with a second chamber 20 via a passage hole 377 of the support disc 374.

A disc 571 is provided between the bottom part 361Q of the cap member 351Q and a disc valve 352. A disc 532 of the spacer part 373 that is in contact with the bottom part 361Q of the cap member 351Q on a side opposite to the disc 571, the bottom part 361Q of the cap member 351Q, and the disc 571 form a throttle flow path forming part 77Q that forms a throttle flow path 76Q communicating with the rod passage 75Q. The throttle flow path 76Q communicates with a variable chamber 121F between the partition disc 372 and the disc spring 382. Also, the throttle flow path 76Q communicates with a passage in a passage hole 416L of a valve seat member 353L.

In the shock absorber 1Q, passages in a plurality of passage holes 37 and an annular recessed part 38 of a piston 18, a throttle flow path 76A of a throttle flow path forming part 77A, the rod passage 75Q of the piston rod 21Q, the throttle flow path 76Q of the throttle flow path forming part 77Q, a passage in the passage hole 416L of the valve seat member 353L, a gap between a valve body disc 451 and a valve seat part 399L of the valve seat member 353L generated at the time of opening, the variable chamber 121F, the variable chamber 122F, a passage in the passage hole 377 of the support disc 374, a passage in a passage hole 406L of the valve seat member 353L, and a gap between a valve body disc 441 and a valve seat part 395L of the valve seat member 353L generated at the time of opening constitute a second passage 141Q that is parallel to first passages 131 and 132.

In the second passage 141Q, the throttle flow path 76A of the throttle flow path forming part 77A, the rod passage 75Q of the piston rod 21Q, the throttle flow path 76Q of the throttle flow path forming part 77Q, the passage in the passage hole 416L of the valve seat member 353L, the gap between the valve body disc 451 and the valve seat part 399L of the valve seat member 353L generated at the time of opening, the variable chamber 121F, the variable chamber 122F, the passage in the passage hole 377 of the support disc 374, the passage in a passage hole 406L of the valve seat member 353L, and the gap between the valve body disc 441 and the valve seat part 395L of the valve seat member 353L generated at the time of opening constitute a parallel passage 142Q that is parallel to the first passage 131.

The second passage 141Q includes the rod passage 75Q of the piston rod 21Q. The second passage 141Q is provided in the piston rod 21Q. The parallel passage 142Q, the frequency sensitive part 72Q, the valve seat part 399L, and the disc valve 354 are provided in the second passage 141Q, and constitute an extension-side second damping force generation mechanism 145Q that generates a damping force in parallel with a first damping force generation mechanism 41. The parallel passage 142Q, the frequency sensitive part 72Q, the valve seat part 395L, and the disc valve 352L are provided in the second passage 141Q, and constitute a compression-side second damping force generation mechanism 145R that generates a damping force in parallel with a first damping force generation mechanism 42. The second damping force generation mechanisms 145Q and 145R each include the throttle flow paths 76A and 76Q and the frequency sensitive part 72Q. The valve seat member 353L is fixed to the piston rod 21L to form a part of the second passage 141Q.

The shock absorber 1Q has the second passage 141Q that is partially different from the second passage 141F, but an operation thereof is similar to that of the shock absorber 1F of the sixth embodiment.

In the shock absorber 1Q of the eleventh embodiment, the bottom part 361Q of the cap member 351Q, the disc 571, and the disc 532, which form the throttle flow path 76Q, all have a bored disc shape fitted on the mounting shaft part 28Q. A notch part 171Q extending radially outward from an inner circumferential end edge portion 170Q fitted on the mounting shaft part 28Q to a predetermined intermediate position in the radial direction is formed in the bottom part 361Q of the cap member 351Q. The notch part 171Q also has a notch shape in which an outer circumferential side of the bottom part 361Q in the radial direction is wider than an inner circumferential side thereof. The bottom part 361Q of the cap member 351Q has a constant outer diameter over the entire circumference. A plurality of notch parts 171Q having the same shape are formed in the bottom part 361Q of the cap member 351Q at regular intervals in the circumferential direction thereof.

The disc 571 has a constant inner diameter over the entire circumference, a constant outer diameter over the entire circumference, and a constant radial width over the entire circumference. The disc 571 has an inner diameter equal to a minimum inner diameter of the bottom part 361Q of the cap member 351Q. The disc 532 has a constant inner diameter over the entire circumference, a constant outer diameter over the entire circumference, and a constant radial width over the entire circumference. The disc 532 has an inner diameter equal to a minimum inner diameter of the bottom part 361Q of the cap member 351Q. The disc 532 has an outer diameter larger than an outer diameter of the disc 571.

All the notch parts 171Q extend to an outer side of the disc 571 and the disc 532 in the radial direction of the bottom part 361Q of the cap member 351Q. Therefore, the disc 571 covers and closes a part of each notch part 171Q on an inner side in the radial direction of the bottom part 361Q from a side opposite to the disc 532 in the axial direction for all the notch parts 171Q of the bottom part 361Q. Also, the disc 532 covers and closes a part of each notch part 171Q on an inner side in the radial direction of the bottom part 361Q from a side opposite to the disc 571 in the axial direction for all the notch parts 171Q of the bottom part 361Q.

All the notch parts 171Q each allow a part thereof on an outer side in the radial direction of the bottom part 361Q to communicate with the passage in the passage hole 416L via a space between the bottom part 361Q and the valve seat member 353L. Also, all the notch parts 171Q each allow a part thereof on an outer side in the radial direction of the bottom part 361Q to also communicate with the variable chamber 121F.

A throttle disc 161A and the bottom part 361Q of the cap member 351Q are provided in the second damping force generation mechanisms 145Q and 145R that include the throttle flow paths 76A and 76Q. The bottom part 361Q of the cap member 351Q has the plurality of notch parts 171Q at substantially regular intervals in the circumferential direction. The bottom part 361Q of the cap member 351Q is a throttle valve that forms the throttle flow path 76Q in the second passage 141Q due to the notch parts 171Q. In the axial direction of the mounting shaft part 28Q of the piston rod 21Q, the throttle disc 161A and the bottom part 361Q of the cap member 351Q, that is, the throttle flow paths 76A and 76Q, both overlap the groove parts 211Q in axial position. Thereby, the throttle flow paths 76A and 76Q communicate with the rod passage 75Q.

Then, in the eleventh embodiment, a relationship with the groove parts 211Q is set for the notch parts 171Q of the bottom part 361Q of the cap member 351Q in the same manner as that of the throttle disc 161B in the third embodiment. Therefore, the bottom part 361Q of the cap member 351Q is formed to have a flow path area of the throttle flow path 76Q that is constant regardless of its attachment position in the circumferential direction with respect to the mounting shaft part 28Q of the piston rod 21Q. The same applies to the throttle disc 161A.

Twelfth Embodiment

Next, a twelfth embodiment will be described mainly on the basis of FIGS. 30 and 31, focusing on differences from the fourth embodiment. Further, parts common to those in the fourth embodiment will be denoted by the same terms and the same reference signs.

Figure 30:
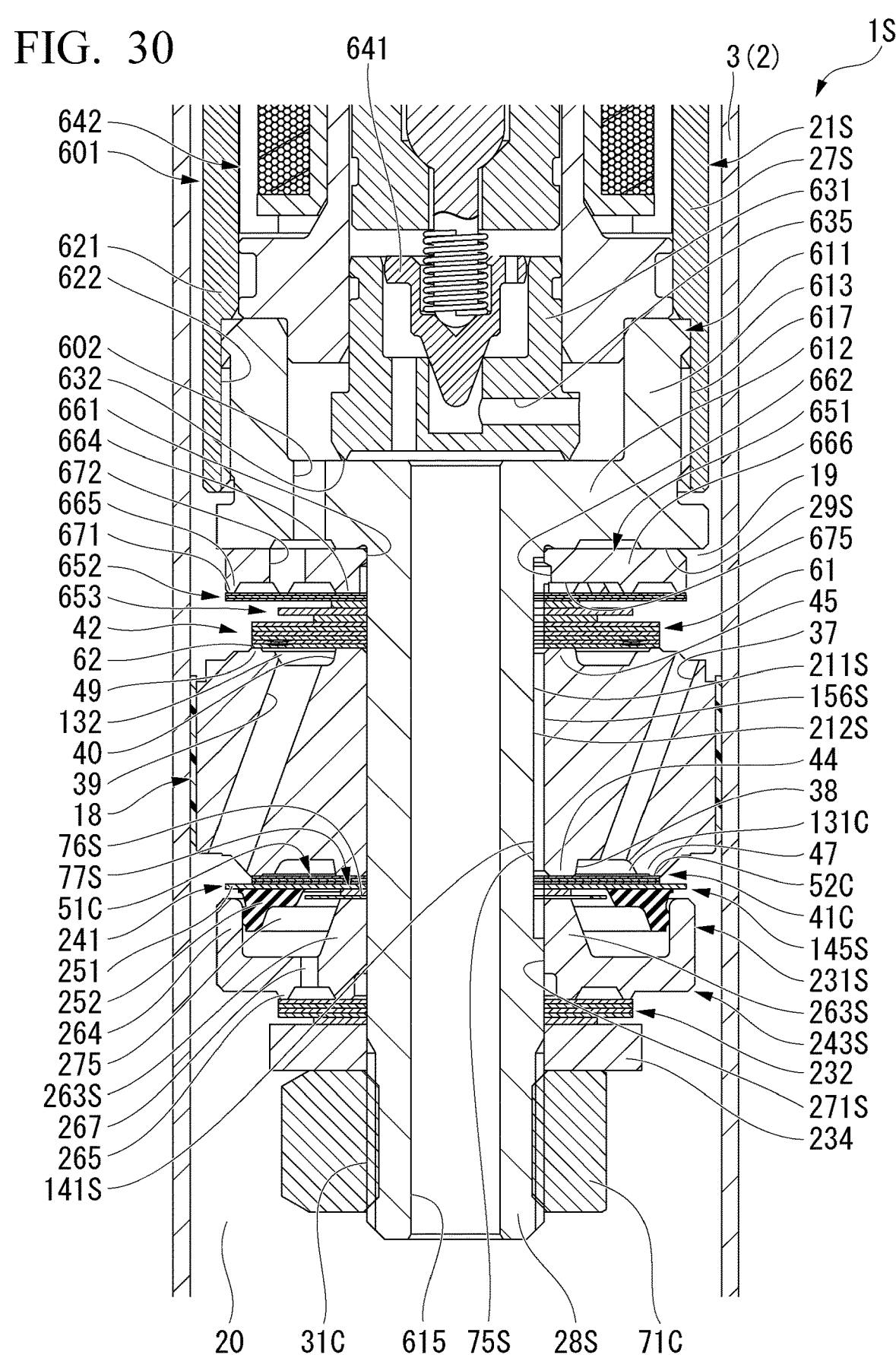
FIG. 30 is a partial cross-sectional view illustrating the vicinity of a piston of a shock absorber according to a twelfth embodiment of the present invention.

As illustrated in FIG. 30, in a shock absorber 1S of the twelfth embodiment, a piston rod 21S that is partially different from the piston rod 21C is used. The piston rod 21S includes a main shaft part 27S that is different from the main shaft part 27 in that a flow rate adjusting part 601 that is electrically driven to control a flow of an oil fluid is provided. The piston rod 21S includes a mounting shaft part 28S that is partially different from the mounting shaft part 28C. The flow rate adjusting part 601 is provided at a portion of the main shaft part 27S on the mounting shaft part 28S side. The flow rate adjusting part 601 has a passage hole 602 that opens to a shaft step part 29S at an end portion of the main shaft part 27S on the mounting shaft part 28S side.

The piston rod 21S has a distal end member 611. The distal end member 611 constitutes the shaft step part 29S of the main shaft part 27S. The distal end member 611 includes the mounting shaft part 28S and the passage hole 602 that is formed therein. The distal end member 611 includes the mounting shaft part 28S, a shaft step part forming part 612 extending radially outward from one end of the mounting shaft part 28S in an axial direction to form the shaft step part 29S, and a cylindrical mounting part 613 extending from an outer circumferential portion of the shaft step part forming part 612 to a side opposite to the mounting shaft part 28S in the axial direction. The passage hole 602 penetrates a portion in a radial direction of the shaft step part forming part 612 in the radial direction between the mounting shaft part 28S and the mounting part 613. A through hole 615 penetrating the mounting shaft part 28S in the axial direction is formed in the distal end member 611 at a central position in the radial direction of the mounting shaft part 28S. A male thread 617 is formed on an outer circumferential portion of the mounting part 613. The male thread 617 of the distal end member 611 is screwed into a female thread 622 of an inner circumferential portion of a cylindrical member 621 that forms an outer circumferential portion of the flow rate adjusting part 601.

A passage forming member 631 is provided in the flow rate adjusting part 601. The passage forming member 631 is disposed on an inner side of the mounting part 613 in the radial direction to be in contact with the shaft step part forming part 612. The passage forming member 631 includes an annular contact part 632. The contact part 632 surrounds the through hole 615 from an outer side in the radial direction to be in contact with the shaft step part forming part 612. An internal passage 635 is formed in the passage forming member 631. The internal passage 635 has one end that opens inward in the radial direction of the contact part 632 and the other end that opens outward in the radial direction of the contact part 632. One end of the internal passage 635 communicates with a passage in the through hole 615. The other end of the internal passage 635 communicates with a passage in the passage hole 602.

The flow rate adjusting part 601 includes a valve member 641 that opens and closes the internal passage 635, and an electromagnetic drive unit 642 that drives the valve member 641 with an electromagnetic force. The flow rate adjusting part 601 controls driving of the electromagnetic drive unit 642 to control a driving force of the valve member 641, and thereby a flow rate of the oil fluid introduced from the passage in the through hole 615 and discharged from the passage in the passage hole 602 through the internal passage 635 is controlled.

A male screw 31C is formed in an outer circumferential portion of the mounting shaft part 28S at an outer circumferential portion of an end portion on a side opposite to the shaft step part 29S in the axial direction, and a rod passage 75S that is partially different from the rod passage 75C is formed between the male screw 31C and the shaft step part 29S. The rod passage 75S is formed of one groove part 211S. The groove part 211S has a shape in which an outer circumferential portion of the mounting shaft part 28S is notched to form a planar bottom surface 212S parallel to a central axis of the mounting shaft part 28S. The rod passage 75S opens to an outer diameter side of the mounting shaft part 28S on a piston 18 side at an opening 156S of the groove part 211S.

In the shock absorber 1S of the twelfth embodiment, a valve seat member 651, a disc valve 652, a deformation suppression part 653, a disc valve 61 similar to that of the fourth embodiment, the piston 18 similar to that of the fourth embodiment, a disc valve 51C similar to that of the fourth embodiment, a throttle flow path forming part 77S, a back pressure applying part 231S, a hard valve 232 similar to that of the fourth embodiment, a washer 234 similar to that of the fourth embodiment, and a nut 71C similar to that of the fourth embodiment are provided on the mounting shaft part 28S in order from the shaft step part 29S while fitting the mounting shaft part 28S therein.

The valve seat member 651 has a small diameter hole portion 661 on one side in the axial direction and a large diameter hole portion 662 on the other side in the axial direction having a diameter larger than that of the small diameter hole portion 661, into which the mounting shaft part 28S is fitted, at a center in the radial direction. The valve seat member 651 includes an inner seat part 664 having an annular shape to surround the large diameter hole portion 662 at an end portion on the large diameter hole portion 662 side in the axial direction. The valve seat member 651 includes a valve seat part 665 extending outward in the radial direction from the inner seat part 664. The valve seat member 651 includes a bored disc-shaped main body part 666. The inner seat part 664 and the valve seat part 665 protrude in the same axial direction from the main body part 666.

The valve seat part 665 is a deformed seat having a petal shape and includes a plurality of valve seat constituent parts 671 having the same shape. Inner end portions of the valve seat constituent parts 671 in the radial direction of the valve seat member 651 are connected to the inner seat part 664, thereby forming a frame shape together with the inner seat part 664. The valve seat constituent parts 671 are disposed at regular intervals in the circumferential direction of the valve seat member 651. A passage hole 672 penetrating the main body part 666 in the axial direction is formed at inner positions of all the valve seat constituent parts 671.

A passage groove 675 traversing the inner seat part 664 in the radial direction is formed in the valve seat member 651 on the large diameter hole portion 662 side in the axial direction. The passage groove 675 also includes a space between the valve seat constituent parts 671 adjacent to each other in the circumferential direction of the valve seat member 651. The passage groove 675 allows the large diameter hole portion 662 to communicate with a first chamber 19.

The disc valve 652 is constituted by a plurality of discs. The disc valve 652 comes into contact with the valve seat part 665 to close a passage in the passage hole 672, and separates from the valve seat part 665 to open the passage in the passage hole 672. The deformation suppression part 653 is constituted by a plurality of discs. The deformation suppression part 653 suppresses deformation of the disc valve 652 in an opening direction beyond a predetermined amount by coming into contact with the disc valve 652. The deformation suppression part 653 suppresses deformation of the disc valve 61 in an opening direction beyond a predetermined amount by coming into contact with the disc valve 61.

The back pressure applying part 231S includes a case member 243S that is partially different from the case member 243. In the case member 243S, a fitting hole portion 271S into which the mounting shaft part 28S is fitted is formed at a center thereof in the radial direction. Also, in the case member 243S, the large diameter hole portion 272 and the passage groove 273 are not formed in an inner cylindrical part 263S corresponding to the inner cylindrical part 263.

The throttle flow path forming part 77S includes a throttle flow path 76C that allows the rod passage 75S of the piston rod 21S to communicate with a back pressure chamber 275.

In a compression stroke, the flow rate adjusting part 601 adjusts a damping force of a flow of the oil fluid flowing from a second chamber 20 to the first chamber 19 via a passage in the through hole 615 of the distal end member 611, the internal passage 635 in the passage forming member 631, a passage in the passage hole 602 of the distal end member 611, a passage in the passage hole 672 of the valve seat member 651, and a gap between the disc valve 652 and the valve seat part 665 generated at the time of opening by controlling a flow path area of the internal passage 635.

In the shock absorber 1S, passages in the passage groove 675 of the valve seat member 651 and the large diameter hole portion 662, the rod passage 75S of the piston rod 21S, the throttle flow path 76C of the throttle flow path forming part 77S, the back pressure chamber 275, and a gap between the hard valve 232 and a valve seat 265 of the case member 243S generated at the time of opening constitutes a second passage 141S that is parallel to first passages 131C and 132.

The second passage 141S includes the rod passage 75S of the piston rod 21S. The second passage 141S is provided in the piston rod 21S. The throttle flow path 76C and the back pressure applying part 231S are provided in the second passage 141S, and constitute a second damping force generation mechanism 145S that generates a damping force in cooperation with a first damping force generation mechanism 41C. The second damping force generation mechanism

145S includes a throttle flow path 76S. The case member 243S is fixed to the piston rod 21S and forms the back pressure chamber 275 that is a part of the second passage 141S.

Figure 31:
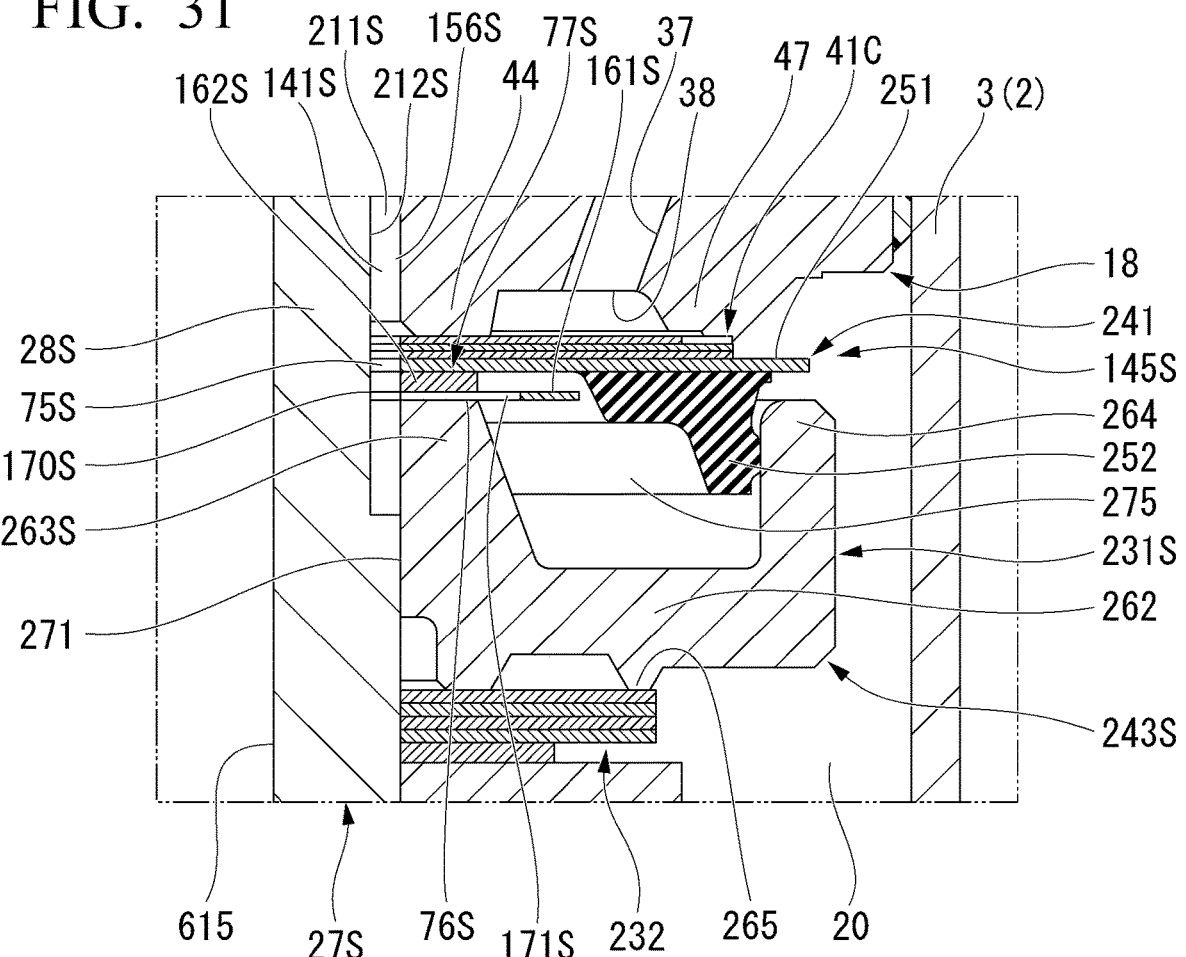
FIG. 31 is a partial cross-sectional view of a main part of the shock absorber according to the twelfth embodiment of the present invention.

As illustrated in FIG. 31, the throttle flow path forming part 77S includes a throttle disc 161S (throttle member, throttle valve) fitted on the mounting shaft part 28S of the piston rod 21S and in contact with a distal end surface of the inner cylindrical part 263S of the case member 243S, and a disc 162S fitted on the mounting shaft part 28S of the piston rod 21S and in contact with a side of the throttle disc 161S opposite to the inner cylindrical part 263S in the axial direction (thickness direction). The disc 162S is in contact with a disc 251 of a pilot disc 241 at a side opposite to the throttle disc 161S in the axial direction (thickness direction). The distal end surface of the inner cylindrical part 263S has a constant inner diameter over the entire circumference, a constant outer diameter over the entire circumference, and a constant radial width over the entire circumference.

Both the throttle disc 161S and the disc 162S have a bored disc shape fitted on the mounting shaft part 28S. A notch part 171S is formed in the throttle disc 161S. The notch part 171S extends radially outward from an inner circumferential end edge portion 170S fitted on the mounting shaft part 28S to a predetermined intermediate position in the radial direction. The notch part 171S also has a notch shape in which an outer circumferential side of the throttle disc 161S in the radial direction is wider than an inner circumferential side thereof. The throttle disc 161S has a constant outer diameter over the entire circumference. A plurality of notch parts 171S having the same shape are formed in the throttle disc 161S at regular intervals in the circumferential direction. All the notch parts 171S extend to an outer side of the distal end surface of the inner cylindrical part 263S in the radial direction of the throttle disc 161S. Therefore, the distal end surface of the inner cylindrical part 263S covers and closes a part of each notch part 171S on an inner side in the radial direction of the throttle disc 161S from a side opposite to the disc 162S in the axial direction for all the notch parts 171S of the throttle disc 161S.

The disc 162S has a constant inner diameter over the entire circumference, a constant outer diameter over the entire circumference, and a constant radial width over the entire circumference. The disc 162S has an inner diameter equal to a minimum inner diameter of the throttle disc 161S and an outer diameter smaller than an outer diameter of the throttle disc 161S. For all the notch parts 171S, the throttle disc 161S allows a part of each notch part 171S on an outer side in the radial direction of the throttle disc 161S to communicate with the back pressure chamber 275 on both sides in a thickness direction.

The throttle disc 161S is provided in the second damping force generation mechanism 145S including the throttle flow path 76S, and has the plurality of notch parts 171S at substantially regular intervals in the circumferential direction. The throttle disc 161S is a throttle valve that forms the throttle flow path 76S in the second passage 141S due to the notch parts 171S. The throttle disc 161S is provided on the piston 18 side which is one side of the second passage 141S with respect to the case member 243S. In the axial direction of the mounting shaft part 28S of the piston rod 21S, the throttle disc 161S, that is, the throttle flow path 76S, overlaps the groove part 211S in axial position. Thereby, the throttle flow path 76S communicates with the rod passage 75S.

Then, also in the twelfth embodiment, the throttle disc 161S has a relationship between the notch part 171S thereof and the groove part 211S set in the same manner as that in the throttle disc 161B of the third embodiment, and therefore, a flow path area of the throttle flow path 76S is formed to be constant regardless of an attachment position of the throttle disc 161S in the circumferential direction with respect to the mounting shaft part 28S of the piston rod 21S.

According to a first aspect of the embodiments described above, a shock absorber includes a cylinder in which a working fluid is sealed, a piston provided in the cylinder to be movable and partitioning the inside of the cylinder into a first chamber and a second chamber, a piston rod connected to the piston and extending to the outside of the cylinder, a first passage provided in the piston and through which the working fluid moves from a chamber on an upstream side to a chamber on a downstream side in the cylinder due to movement of the piston, a first damping force generation mechanism provided in the first passage to generate a damping force, a second passage provided in the piston rod, a fixing member fixed to the piston rod to form the second passage, and a second damping force generation mechanism provided in the second passage to generate a damping force. This shock absorber includes a throttle member provided in the second damping force generation mechanism, having a plurality of notch parts at substantially regular intervals in a circumferential direction to form a throttle flow path in the second passage due to the notch parts, and formed to have a flow path area of the throttle flow path that is constant regardless of an attachment position thereof in the circumferential direction. Thereby, stabilization in damping force performance can be achieved.

According to a second aspect, in the first aspect, in the throttle member, at least a part of the notch parts is closed and at least a part of the notch parts is open at a first predetermined position, and at least a part of the notch parts that has been closed at the first predetermined position is open and at least a part of the notch parts that has been open at the first predetermined position is closed at a second predetermined position which is a different rotation position from the first predetermined position.

According to a third aspect, in the first or second aspect, the throttle flow path formed of the notch parts has a closed flow path area and an open flow path area that are substantially the same.

According to a fourth aspect, in any one of the first to third aspects, the second passage provided in the piston rod has one or more first openings formed on a first side and opening to an outer diameter surface on the piston side, and a second opening formed on a second side, penetrating the inside of the piston rod, and opening to the fixing member side.

According to a fifth aspect, in any one of the first to third aspects, the second passage provided in the piston rod is provided in a groove part formed by notching an outer circumferential portion of the piston rod.

According to a sixth aspect, a shock absorber includes a cylinder in which a working fluid is sealed, a piston provided in the cylinder to be movable and partitioning the inside of the cylinder into a first chamber and a second chamber, a piston rod connected to the piston and extending to the outside of the cylinder, a first passage provided in the piston and through which the working fluid moves from a chamber on an upstream side to a chamber on a downstream side in the cylinder due to movement of the piston, a first damping force generation mechanism provided in the first passage to generate a damping force, a second passage provided in the piston rod, a fixing member fixed to the piston rod to form the second passage, and a second damping force generation mechanism provided in the second passage to generate a damping force. The second damping force generation mechanism includes a throttle valve provided on one side of the second passage and having a plurality of notch parts at regular intervals in a circumferential direction to form a throttle flow path in the second passage due to the notch parts. The number of the notch parts of the throttle valve is expressed as n=px provided that n is the number of the notch parts formed in the throttle valve, p is a natural number larger than 1, and x is a natural number larger than 0. The second passage provided in the piston rod includes a groove part formed by notching an outer circumferential portion of the piston rod. When d is a depth of the groove part and r is a radius of the piston rod at a position at which the throttle valve is disposed, $d=r-r\cdot\cos(360/2p)$. A minimum effective flow path area of the flow path formed of the throttle valve and the groove part is expressed as $a_e=a_1\cdot A(n/p)$ provided that $a_e$ is a minimum cross-sectional area of the flow path due to all the notch parts of the throttle valve, $a_1$ is a minimum cross-sectional area of the flow path due to one notch part of the throttle valve, and A is the number of grooves of the groove part of the piston rod. Thereby, stabilization in damping force performance can be achieved.

According to a seventh aspect, the shock absorber includes a cylinder in which a working fluid is sealed, a piston provided in the cylinder to be movable and partitioning the inside of the cylinder into a first chamber and a second chamber, a piston rod connected to the piston and extending to the outside of the cylinder, a first passage provided in the piston and through which the working fluid moves from a chamber on an upstream side to a chamber on a downstream side in the cylinder due to movement of the piston, a first damping force generation mechanism provided in the first passage to generate a damping force, a second passage provided in the piston rod, a fixing member fixed to the piston rod to form the second passage, and a second damping force generation mechanism provided in the second passage to generate a damping force. The second damping force generation mechanism includes a throttle valve provided on one side of the second passage and having a plurality of notch parts at regular intervals in a circumferential direction to form a throttle flow path in the second passage due to the notch parts. The number of the notch parts of the throttle valve is expressed as n=px provided that n is the number of the notch parts formed in the throttle valve, p is a natural number larger than 1, and x is a natural number larger than 0. The second passage provided in the piston rod has one or more first openings formed on a first side and opening to an outer diameter surface on the piston side, and a second opening formed on a second side, penetrating the inside of the piston rod, and opening to the fixing member side. When D is a diameter of the first opening and r is a radius of the piston rod at a position at which the throttle valve is disposed, $D=2r\cdot\sin(360/2p)$. A minimum effective flow path area of the flow path formed of the throttle valve and the first openings is expressed as $a_e=a_1\cdot B(n/p)$ provided that $a_e$ is a minimum cross-sectional area of the flow path due to all the notch parts of the throttle valve, $a_1$ is a minimum cross-sectional area of the flow path due to one notch part of the throttle valve, and B is the number of the first openings. Thereby, stabilization in damping force performance can be achieved.

According to an eighth aspect, in any one of the first to seventh aspects, the notch part has a notch shape in which an outer circumferential side is wider than an inner circumferential side.

INDUSTRIAL APPLICABILITY

According to the shock absorber described above, stabilization in damping force performance can be achieved.

REFERENCE SIGNS LIST 1, 1A to 1D, 1F, 1H, 1J, 1L, 1N, 1Q, 1S Shock absorber
2 Cylinder
18, 18J Piston
19 First chamber
Second chamber
21, 21A to 21D, 21F, 21H, 21J, 21L, 21N, 21Q, 21S Piston rod
28, 28A to 28D, 28F, 28H, 28J, 28L, 28N, 28Q, 28S Mounting shaft part
41, 41C, 41E, 41J, 42, 42D, 42J First damping force generation mechanism
76, 76A, 76C, 76Da, 76db, 76Ea, 76Eb, 76H, 76J, 76L, 76N, 76Q, 76S Throttle flow path
84, 84C Housing (fixing member)
131, 132, 131E, 131J, 132D, 132J First passage
141, 141A to 141F, 141H, 141J, 141L, 141N, 141Q, 141S Second passage
145, 145A to 145N, 145P to 145S Second damping force generation mechanism
156, 156A, 156B First opening
157, 157B Second opening
161, 161A, 161C, 161Da, 161db, 161Ea, 161Eb, 161L, 161N, 161S Throttle disc (throttle member, throttle valve)
161H Washer (throttle member, throttle valve)
171, 171A, 171C, 171Da, 171db, 171Ea, 171Eb, 171H, 171J, 171L, 171N, 171Q, 171S Notch part
211 to 211F, 211H, 211J, 211L, 211Q, 211S Groove part
243, 243D, 243E, 243S Case member (fixing member)
351Q Cap member (throttle member, throttle valve)
353, 353L Valve seat member (fixing member)
374J Support disc (throttle member, throttle valve)

The invention claimed is:

1. A shock absorber comprising:
a cylinder in which a working fluid is sealed;
a piston provided in the cylinder to be movable and partitioning an inside of the cylinder into a first chamber and a second chamber;
a piston rod connected to the piston and extending to an outside of the cylinder;
a first passage provided in the piston and through which the working fluid moves from a chamber on an upstream side to a chamber on a downstream side in the cylinder due to movement of the piston;
a first damping force generation mechanism provided in the first passage to generate a damping force;
a second passage provided in the piston rod;
a fixing member fixed to the piston rod to form the second passage; and
a second damping force generation mechanism provided in the second passage to generate a damping force, wherein
the second damping force generation mechanism includes a throttle valve provided on one side of the second passage and having a plurality of notch parts at regular intervals in a circumferential direction to form a throttle flow path in the second passage due to the notch parts,
a number of the notch parts of the throttle valve is expressed as n=px provided that n is the number of the notch parts formed in the throttle valve,
p is a natural number larger than 1, and
x is a natural number larger than 0,
the second passage provided in the piston rod includes a groove part formed by notching an outer circumferential portion of the piston rod,
d=r−r·cos (360/2p) is satisfied
provided that d is a depth of the groove part, and
r is a radius of the piston rod at a position at which the throttle valve is disposed, and
a minimum effective flow path area of a flow path formed of the throttle valve and the groove part is expressed as $a_1=a_1·A(n/p)$
provided that $a_e$ is a minimum cross-sectional area of the flow path due to all the notch parts of the throttle valve,
$a_1$ is a minimum cross-sectional area of the flow path due to one notch part of the throttle valve, and
A is a number of grooves of the groove part of the piston rod.

2. The shock absorber according to claim 1,
wherein the notch part has a notch shape in which an outer circumferential side is wider than an inner circumferential side.

3. The shock absorber according to claim 2,
wherein the notch parts have a hole shape communicating from one end to another end in an axial direction.

4. The shock absorber according to claim 1,
wherein the throttle flow path formed of the notch parts has a closed flow path area and an open flow path area which are substantially the same.

5. The shock absorber according to claim 1,
wherein the second passage provided in the piston rod has one or more first openings formed on a first side and opening to an outer diameter surface on the piston side, and a second opening formed on a second side, penetrating an inside of the piston rod, and opening to the fixing member side.

6. A shock absorber comprising:
a cylinder in which a working fluid is sealed;
a piston provided in the cylinder to be movable and partitioning an inside of the cylinder into a first chamber and a second chamber;
a piston rod connected to the piston and extending to an outside of the cylinder;
a first passage provided in the piston and through which the working fluid moves from a chamber on an upstream side to a chamber on a downstream side in the cylinder due to movement of the piston;
a first damping force generation mechanism provided in the first passage to generate a damping force;
a second passage provided in the piston rod;
a fixing member fixed to the piston rod to form the second passage; and
a second damping force generation mechanism provided in the second passage to generate a damping force, wherein
the second damping force generation mechanism includes a throttle valve provided on one side of the second passage and having a plurality of notch parts at regular intervals in a circumferential direction to form a throttle flow path in the second passage due to the notch parts,
a number of the notch parts of the throttle valve is expressed as n=px provided that n is the number of the notch parts formed in the throttle valve,
p is a natural number larger than 1, and
x is a natural number larger than 0, the second passage provided in the piston rod has one or more first openings formed on a first side and opening to an outer diameter surface on the piston side, and a second opening formed on a second side, penetrating the inside of the piston rod, and opening to the fixing member side, $D = 2r \cdot \sin(360/2p)$ is satisfied provided that D is a diameter of the first opening, and r is a radius of the piston rod at a position at which the throttle valve is disposed, and a minimum effective flow path area of a flow path formed of the throttle valve and the first openings is expressed as $a_e = a_1 \cdot B(n/p)$ provided that $a_e$ is a minimum cross-sectional area of the flow path due to all the notch parts of the throttle valve, $a_1$ is a minimum cross-sectional area of the flow path due to one notch part of the throttle valve, and B is the number of the first openings.

7. The shock absorber according to claim 6, wherein the notch part has a notch shape in which an outer circumferential side is wider than an inner circumferential side.

8. The shock absorber according to claim 6, wherein the notch parts have a hole shape communicating from one end to another end in an axial direction.

9. The shock absorber according to claim 6, wherein the throttle flow path formed of the notch parts has a closed flow path area and an open flow path area which are substantially the same.

10. The shock absorber according to claim 6, wherein the second passage provided in the piston rod has one or more first openings formed on a first side and opening to an outer diameter surface on the piston side, and a second opening formed on a second side, penetrating an inside of the piston rod, and opening to the fixing member side.

* * * * *